(12) United States Patent
Do

(10) Patent No.: US 7,830,619 B2
(45) Date of Patent: Nov. 9, 2010

(54) IMAGING LENS

(75) Inventor: Satoshi Do, 1-2-56 Miyado, Asaka-shi, 351-0031 Saitama (JP)

(73) Assignees: Satoshi Do, Saitama (JP); Milestone Co., Ltd., Tokyo (JP)

( * ) Notice: Subject to any disclaimer, the term of this patent is extended or adjusted under 35 U.S.C. 154(b) by 0 days.

(21) Appl. No.: 12/083,983

(22) PCT Filed: Aug. 29, 2007

(86) PCT No.: PCT/JP2007/066784
§ 371 (c)(1),
(2), (4) Date: Apr. 23, 2008

(87) PCT Pub. No.: WO2008/142807

PCT Pub. Date: Nov. 27, 2008

(65) Prior Publication Data

US 2010/0165486 A1 Jul. 1, 2010

(30) Foreign Application Priority Data

May 17, 2007 (JP) .............................. 2007-131924

(51) Int. Cl.
*G02B 3/08* (2006.01)

(52) U.S. Cl. ..................................... 359/741

(58) Field of Classification Search .................. 359/741
See application file for complete search history.

(56) References Cited

U.S. PATENT DOCUMENTS 3,524,699 A    8/1970 Mori 6,498,689 B2   12/2002 Katsuma
6,551,530 B2    4/2003 Koizumi et al.

(Continued)

FOREIGN PATENT DOCUMENTS

JP    2001-242308    9/2001

(Continued)

OTHER PUBLICATIONS

European International Search Report dated May 12, 2009.

(Continued)

*Primary Examiner*—William C Choi
(74) *Attorney, Agent, or Firm*—Venable LLP; James R. Burdett

(57) ABSTRACT

An imaging lens of which optical performance does not deteriorate even in a high temperature environment, various aberrations are well corrected, optical length is short, and back focus is sufficiently secured; the imaging lens comprising: an aperture stop S; and a junction type compound lens 14 having a positive refractive power, characterized in that the aperture stop and the compound lens are arranged in this sequence from an object side to an image side. The junction type compound lens comprises a first lens $L_1$, a second lens $L_2$ and a third lens $L_3$, arranged in this sequence from the object side to the image side. The first lens and the third lens are formed of a curable resin material, and the second lens is formed of a high softening temperature optical glass material. The first lens and the second lens are bonded with adhesive, and the second lens and the third lens are bonded with adhesive. The object side face of the first lens and the image side face of the third lens are aspherical.

19 Claims, 36 Drawing Sheets

U.S. PATENT DOCUMENTS

| | | | |
|---|---|---|---|
| 6,560,037 B2 | 5/2003 | Dou | |
| 6,862,804 B2 | 3/2005 | Nishio et al. | |
| 7,319,563 B2 * | 1/2008 | Yoshitsugu | 359/689 |
| 2002/0041450 A1 | 4/2002 | Katsuma | |
| 2003/0002174 A1 | 1/2003 | Dou | |
| 2006/0050399 A1 | 3/2006 | Nakagawa | |
| 2009/0279188 A1 | 11/2009 | Do | |

FOREIGN PATENT DOCUMENTS

| | | |
|---|---|---|
| JP | 2001-305309 | 10/2001 |
| JP | 2002-154169 | 5/2002 |
| JP | 2002-154170 | 5/2002 |
| JP | 2003-311757 | 11/2003 |
| JP | 2004-053834 | 2/2004 |
| JP | 2004-328474 | 11/2004 |
| JP | 2005-067999 | 3/2005 |
| JP | 2005-084273 | 3/2005 |
| JP | 2005 116144 | 4/2005 |
| JP | 2005-258329 | 9/2005 |
| JP | 2005-305938 | 11/2005 |
| JP | 2006-121079 | 5/2006 |
| JP | 2006-195053 | 7/2006 |
| JP | 2006-308669 | 11/2006 |
| JP | 2006-323365 | 11/2006 |
| JP | 3926380 B1 | 6/2007 |
| WO | PCT/JP2007/005667 | 3/2007 |

OTHER PUBLICATIONS

Chinese Office Action issued in Chinese Application No. 200780001204.5, dated May 11, 2010.

* cited by examiner

IMAGING LENS

TECHNICAL FIELD

The present invention relates to an imaging lens, and more particularly to an imaging lens that can be suitably mounted on a portable telephone or the like.

BACKGROUND ART

In a portable telephone with a built-in digital camera, an imaging lens is mounted on a printed circuit board. As a method for mounting an imaging lens on a printed circuit board, a reflow soldering processing is used. Hereafter the reflow soldering may simply be called "reflow". Reflow processing is a method for soldering an electronic component by placing a solder ball in advance at a location where an electronic component is connected, placing the electronic component there, heating to meld the solder ball, then cooling the solder down.

Generally in mass production steps, a reflow step for performing reflow processing is used as a method for mounting electronic elements or such components as an imaging lens on a printed circuit board. If the reflow step is used, the mounting cost of components on a printed circuit board can be decreased, and manufacturing quality can be maintained at a predetermined level.

In the reflow step of the manufacturing steps of a portable telephone comprising an imaging lens, not only are electronic components arranged at predetermined positions on a printed circuit board, but also the imaging lens itself or a socket for installing the imaging lens is disposed on the printed circuit board.

The imaging lens installed in portable telephones are largely made of plastic in order to decrease the manufacturing cost, and to insure lens performance. Therefore a heat resistant socket component is used for installing an imaging lens in order to prevent thermal deformation of the imaging lens in a high temperature environment, which makes it impossible to maintain optical performance thereof.

In other words, in the reflow step, a heat resistant socket component for installing an imaging lens is mounted on the printed circuit board of the portable telephone, so that the imaging lens is not exposed to high temperature in the reflow step (e.g. see Patent Documents 1 to 3). However, using a heat resistant socket component for installing an imaging lens makes the manufacturing steps complicated, and increases the manufacturing cost, including the cost of this heat resistant socket.

A recent demand is that the optical performance of an imaging lens installed in a portable telephone does not deteriorate even if the portable telephone itself is placed in a high temperature environment at 150° C. or higher, considering the case of the portable telephone being left in an automobile which temporarily becomes a high temperature environment. A conventional imaging lens made of plastic material cannot meet this demand.

In order to implement an imaging lens of which optical performance is maintained even in a high temperature environment, forming an imaging lens using a high softening temperature mold glass material is possible (e.g. see Patent Document 4). According to this, the deterioration of optical performance of an imaging lens in a high temperature environment can be avoided, but at the moment, an imaging lens made of mold glass material is not very popular, because the manufacturing cost is very high.

In addition to the above mentioned thermal characteristics, an imaging lens installed in a portable telephone must satisfy the following conditions related to optical characteristics. One condition is that the optical length, which is defined as a distance from an entrance plane at an object side to an image formation plane (also called "image sensing plane") of the imaging lens, must be short. In other words, when a lens is designed, the ratio of the optical length to the composite focal distance of the imaging lens must be minimized.

In the case of a portable telephone, for example, this optical length must at least be shorter than the thickness of the portable telephone unit. On the other hand, a back focus, which is defined as a distance from the outgoing plane at the image side to the image sensing plane of the imaging lens, should be as long as possible. In other words, when the lens is designed, the ratio of the back focus to the focal distance must be maximized. This is because such components as a filter and a cover glass must be inserted between the imaging lens and the image sensing plane.

In addition to this, it is naturally demanded for the imaging lens that various aberrations are corrected to be small enough that the distortion of the image is not visually recognized, and that the integration density of the image sensing elements in minimal units (also called "pixels"), which are arranged in a matrix on the light receiving plane of a CCD (Charge Coupled Device) image sensor, is sufficiently satisfied. In other words, various aberrations of the imaging lens must be well corrected. Hereafter an image, of which various aberrations are well corrected, may be called a "good image".

Patent Document 1: Japanese Patent Application Laid-Open No. 2006-121079 (U.S. Pat. No. 3,799,615)

Patent Document 2: Japanese Patent Application Laid-Open No. 2004-328474 (U.S. Pat. No. 3,915,733)

Patent Document 3: Japanese Patent Application Laid-Open No. 2004-063787 (U.S. Pat. No. 3,755,149)

Patent Document 4: Japanese Patent Application Laid-Open No. 2005-067999

DISCLOSURE OF THE INVENTION

Problems that the Invention is to Solve

With the foregoing in view, it is an object of the present invention to provide an imaging lens suitable for being installed in a portable telephone, and of which heat resistance is guaranteed, and optical performances does not deteriorate even in a high temperature environment of a reflow step, or even if the imaging lens is installed in a portable telephone and is temporarily placed in a high temperature environment inside an automobile.

It is another object of the present invention to provide an imaging lens of which optical length is short, and the back focus is as long as possible, and with which a good image is acquired.

MEANS FOR SOLVING THE PROBLEMS

To achieve the above objects, an imaging lens of this invention comprises an aperture stop and a junction type compound lens having a positive refractive power, wherein the aperture stop and the junction type compound lens are arranged in the sequence from the object side to the image side.

The junction type compound lens comprises a first lens, a second lens and a third lens arranged in this sequence from the object side to the image side, and the first lens and the third lens are formed of a curable resin material, the second lens is formed of a high softening temperature optical glass material, the first lens and the second lens are indirectly bonded, and the second lens and the third lens are indirectly bonded.

Or the junction type compound lens comprises a first lens, a second lens and a third lens arranged in the sequence from the object side to the image side, and the first lens, the second lens and the third lens are formed of a curable resin material, the first lens and the second lens are bonded, and the second lens and the third lens are bonded.

The curable resin material refers to both a thermo-setting resin material and a UV curable resin material. The high softening temperature optical glass material refers to such optical glass material as a high softening temperature mold glass material or boro-silicate glass.

The second lens formed of a curable resin material and the first lens or the third lens formed of a curable resin material are bonded as follows. A liquid type curable resin is contacted to the second lens formed of the curable resin material, and the first lens or the third lens is bonded to the second lens by solidifying, that is by curing, this curable resin. This bonding may be called "direct bonding" herein below. The second lens and the first lens or the third lens may be bonded by using an adhesive between the second lens and the first lens or the third lens. This bonding may be called "indirect bonding" herein below.

The second lens formed of a high softening temperature optical glass and the first lens or the third lens formed of a curable resin material are bonded by indirect bonding.

When the junction type compound lens is implemented by indirect bonding, whether it is the case of the second lens formed of a curable resin material or the case of the second lens formed of a high softening temperature optical glass, the reflection in the interface between the second lens and the first lens or the third lens can be decreased if the adhesive is selected so that the optical characteristics of the adhesive can be utilized, such as selecting an appropriate refractive index of the adhesive with respect to the refractive index of the second lens and the refractive index of the first or the third lens. If coating processing is performed on the surface of the second lens facing the first or the third lens, and these surfaces are bonded, whether the adhesive is used there or not, the reflection in the interface with the first lens (or third lens) can be decreased.

In the above mentioned imaging lens, it is preferable to set settings that satisfy the following conditions (1) to (4).

$$0 \leq |N_3 - N_2| \leq 0.1 \quad (1)$$

$$0 \leq |N_3 - N_4| \leq 0.1 \quad (2)$$

$$0 \leq |v_3 - v_2| \leq 30.0 \quad (3)$$

$$0 \leq |v_3 - v_4| \leq 30.0 \quad (4)$$

where
- $N_2$: refractive index of the first lens
- $N_3$: refractive index of the second lens
- $N_4$: refractive index of the third lens
- $v_2$: Abbe number of the first lens
- $v_3$: Abbe number of the second lens
- $v_4$: Abbe number of the third lens The second lens can be an optical-parallel plate. An optical-parallel plate normally is not referred to as a lens, but in the description of the present invention, an optical-parallel plate may be included in a lens description, regarding this as a special case where the radius of curvature of the lens surface is infinite.

When the second lens is an optical-parallel plate, the first lens can be a plano-convex lens where the object side face of the first lens is a convex surface facing the object side, and the third lens can be a plano-convex lens where the image side face of the third lens is a convex surface facing the image side.

If the second lens is an optical-parallel plate, the first lens can be a piano-concave lens where the object side face of the first lens is a concave surface facing the object side, and the third lens can be a piano-convex lens where the image side face of the third lens is a convex surface facing the image side.

The second lens can be a biconvex glass lens, the first lens can be a lens where the object side face of the first lens is a convex surface facing the object side, and the third lens can be a lens where the image side face of the third lens is a convex surface facing the image side.

If the second lens is a biconvex lens, the first lens can be a lens where the object side face of the first lens is a concave surface facing the object side, and the third lens can be a lens where the image side face of the third lens is a convex surface facing the image side.

The second lens can be a biconcave glass lens, the first lens can be a lens where the object side face of the first lens is a convex surface facing the object side, and the third lens can be a lens where the image side face of the third lens is a convex surface facing the image side.

If the second lens is a biconcave glass lens, the first lens can be a lens where the object side face of the first lens is a concave surface facing the object side, and the third lens can be a lens where the image side face of the third lens is a convex surface facing the image side.

To form the imaging lens of the present invention, it is preferable that the object side face of the first lens and the image side face of the third lens are aspheric.

If the junction type compound lens is formed by indirect bonding, it is preferable that at least one surface of the second lens is coated, and the first lens and the third lens are indirectly bonded.

It is preferable that the curable resin material is a transparent high hardness silicon resin. The high hardness silicon resin refers to a curable silicon resin which is sufficiently harder compared with the hardness of a plastic resin, and has sufficient hardness with which a geometric shape does not change during the manufacturing step of installing the imaging lens in a portable telephone, and during normal use after the imaging lens is installed in a portable telephone. "Transparent" indicates that the light absorption of visible light is small (transparent) enough to have no influence on practical use. In a product catalog of a company providing silicon resin, the phrase "transparent high hardness silicon resin" may be used for this high hardness silicon resin, which is transparent to visible light.

EFFECTS OF THE INVENTION

According to the imaging lens of the present invention, in the junction type compound lens constituting this imaging lens, the first and the third lens, which are formed of curable resin material, sandwich and are indirectly or directly bonded to the second lens, which is formed of a high softening temperature optical glass material, or the second lens which is formed of a curable resin material. Therefore the optical performance thereof is guaranteed in a high temperature environment in the reflow step, or in a high temperature environment when using the imaging lens. In other words, the second lens is formed of a high softening temperature optical glass material of which melting point is higher than the maximum ambient temperature in the design specifications of the junction type compound lens, so the optical performance thereof does not deteriorate even under a high temperature environment.

The high softening temperature optical glass material refers to an optical glass material of which softening temperature is higher than the temperature in the reflow processing and the maximum environmental temperature in the design specifications of the junction type compound lens. In the following description, the phrase "high softening temperature optical glass material" is used when the thermal characteristics of the optical glass material is discussed, and the simple phrase "optical glass" may be used when an optical characteristic is discussed.

The first lens and the third lens are indirectly bonded to the second lens, and curing processing is performed, so optical performance thereof does not deteriorate even under a high temperature environment. In other words, once the curable resin material, constituting the first and the third lenses, is cured and solidified, the heat resistance characteristic thereof is stable, and the optical performance thereof is maintained even at the highest ambient temperature under conditions of using the junction type compound lens.

If the second lens is formed using curable resin material, the following effect can be implemented. Compared with the case of forming the second lens using a high softening temperature optical glass material, the manufacturing accuracy of the thickness of the second lens is high. In other words, the manufacturing accuracy of the thickness of the second lens in the case of using high softening temperature optical glass material is about ±10 μm, while the manufacturing accuracy of the thickness thereof in the case of using curable resin material can be improved up to about ±3 μm. In this way, since the manufacturing accuracy of the thickness of the second lens can be increased, the imaging lens can be manufactured without deviating very much from various characteristics, such as aberrations, that are assumed in designing.

In order to indirectly bond the first and the third lenses sandwiching the second lens from both sides, an adhesive is used between the second lens and the first or third lens.

When the junction type compound lens is manufactured by indirect bonding, the first lens to the third lens are formed first, then an adhesive is coated on a surface of the second lens facing the first lens or the third lens, or on the surface of the first lens or the third lens facing the second lens, and both lenses are contacted. Coating processing may be performed on a surface of the second lens facing the first lens or the third lens, and both lenses are indirectly bonded.

When the indirect bonding is implemented, reflection in the interface between the second lens and the first lens or the third lens can be decreased if the adhesive is selected so that the optical characteristics of the adhesive can be utilized, such as selecting an appropriate refractive index of the adhesive with respect to the refractive index of the optical glass and the refractive index of the curable resin material. If the coating processing is performed on the surface of the second lens facing the first lens or the third lens, and these lenses are bonded, the reflection in the interface with the first lens (or the third lens) can be decreased.

The inventor of the present invention confirmed that good images can be acquired by satisfying the above Conditions (1) to (4) for the respective refractive index and Abbe number of the first lens, second lens and third lens when the imaging lens is mounted in a portable telephone, by simulation based on the ray tracking method and by creating a prototype, and evaluating the characteristics thereof.

The structural principle of the imaging lens of the present invention implements two roles: that is, aberration correction and image formation, by a single junction type compound lens of which optical characteristics, such as the refractive index, is as uniform as possible. In other words, it is preferable that the respective refractive index and the Abbe number of the first to third lenses, constituting the junction type compound lens of the imaging lens of the present invention, do not differ very much from each other. This means that it is ideal that the respective refractive index and Abbe number of the first to third lenses are the same as each other. In practical terms, however, it is extremely difficult to find a high softening temperature optical glass material constituting the second lens and a curable resin material constituting the first and third lenses of which refractive indexes and Abbe numbers are precisely the same.

Thereafter the inventor of the present invention checked, through various simulations and prototyping, the difference of the refractive indexes and Abbe numbers between the material of the second lens and the material of the first and the third lenses, which could generate good images. As a result, it was confirmed that good images can be acquired by constructing an imaging lens which satisfies the above Conditions (1) to (4).

In other words, if the difference between the refractive index $N_2$ of the first lens and the refractive index $N_3$ of the second lens, and the difference between the refractive index $N_3$ of the second lens and the refractive index $N_4$ of the third lens are within 0.1, then the distortion aberration, astigmatism aberration and chromatic/spherical aberration become sufficiently small enough to generate good images. If the difference between the Abbe number $v_2$ of the first lens and the Abbe number $v_3$ of the second lens, and the difference between the Abbe number $v_3$ of the second lens and the Abbe number $v_4$ of the third lens are within 30.0, then the value of the chromatic aberration can be small enough to generate good images, and the images can have sufficient contrast.

| EXPLANATION OF REFERENCE SYMBOLS | |
|---|---|
| 10 | Image sensing element |
| 12 | Cover glass |
| 14 | Junction type compound lens |
| 50, 52 | Adhesive |
| 60, 62 | Coating film |
| S | Aperture stop |
| $L_1$ | First lens |
| $L_2$ | Second lens |
| $L_3$ | Third lens |

BEST MODE FOR CARRYING OUT THE INVENTION

Embodiments of the present invention will now be described with reference to the drawings. Each drawing, however, simply illustrates one configuration example of the present invention, and roughly shows a cross-section of each composing element and positional relationship in order to assist in understanding the present invention, and does not limit the present invention to the illustrated example. In the following description, specific materials and conditions may be used, but these materials and conditions are merely examples of preferred embodiments, and therefore the present invention is not limited in any way by these materials and conditions.

Figure 1:
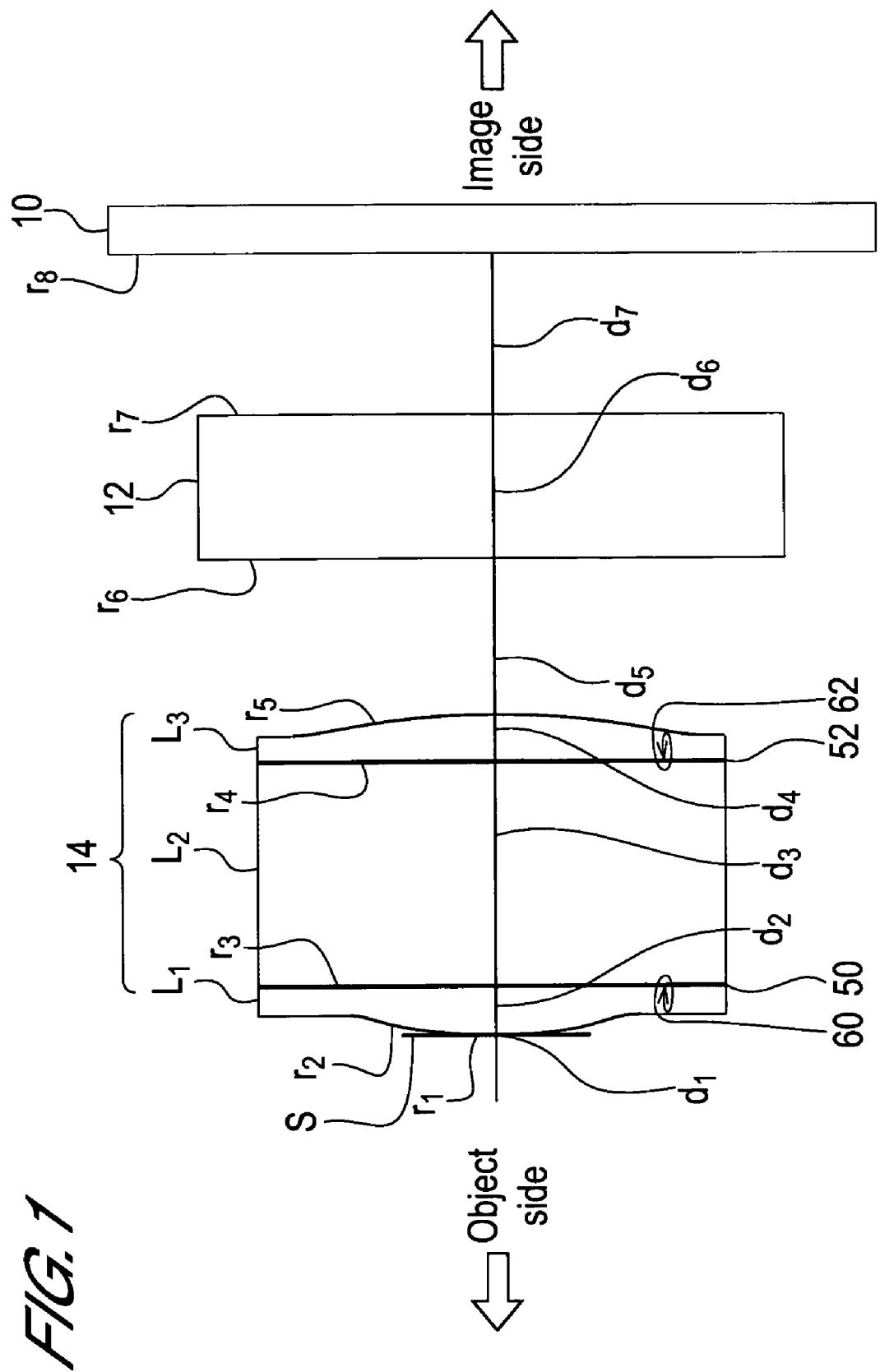
FIG. 1 is a cross-sectional view depicting an imaging lens according to the present invention.

FIG. 1 is a diagram depicting a configuration of an imaging lens of a present embodiment of the present invention. The symbols of the surface number ($r_i$ (i=1, 2, 3, ..., 8)) and the surface spacing ($d_i$ (i=1, 2, 3, ..., 7)) defined in FIG. 1 are omitted in FIG. 2, FIG. 6, FIG. 10, FIG. 14, FIG. 18, FIG. 22, FIG. 26, FIG. 30, FIG. 34, FIG. 38, FIG. 42 and FIG. 46, so that the drawing does not become complicated.

As FIG. 1 shows, a first, second and third lenses constituting a junction type compound lens 14 are denoted with $L_1$, $L_2$ and $L_3$ respectively, and an aperture stop disposed on a front face (front face $r_2$ of the first lens) of the junction type compound lens 14 is denoted with S. Within a range where no misunderstanding occurs, $r_i$ (i=1, 2, 3, ..., 8) may be used as a variable that indicates a value of a radius of curvature on an optical axis, or a symbol that identifies a lens, cover glass face or image sensing plane (e.g. $r_2$ is used to indicate the object side face of the first lens $L_1$ constituting the junction type compound lens 14, or $r_3$ is used to indicate the interface of the first lens $L_1$ and the second lens $L_2$ constituting the junction type compound lens 14). $r_3$ and $r_4$ are the interface/bonding surface of the first lens $L_1$ and the second lens $L_2$ and the interface/bonding surface of the second lens $L_2$ and the third lens $L_3$ respectively. Needless to say, the bonding surfaces of the first lens $L_1$ and the third lens $L_3$, to be directly or indirectly bonded to the second lens $L_2$, have a shape matching the bonding surface of the second lens $L_2$.

Figure 2:
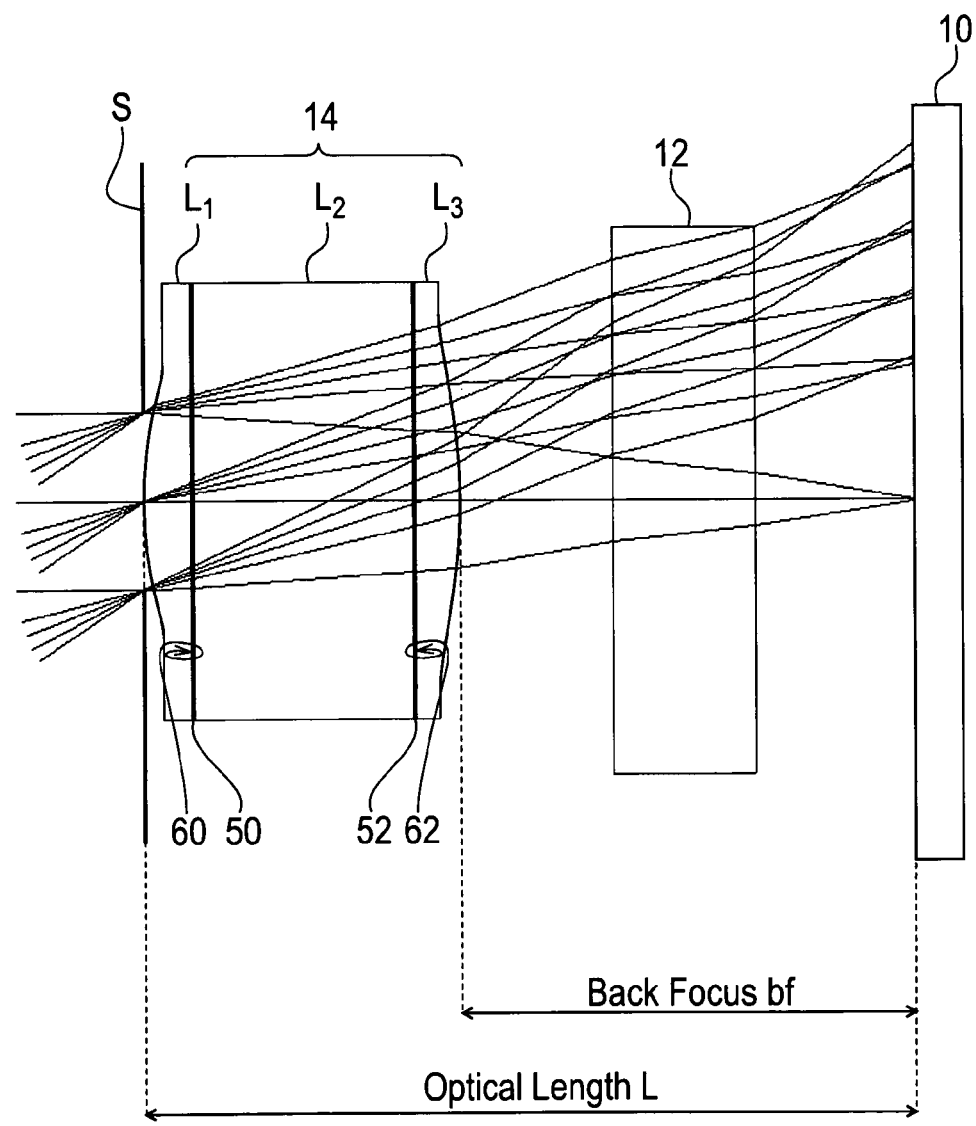
FIG. 2 is a cross-sectional view depicting an imaging lens according to Embodiment 1.
Figure 6:
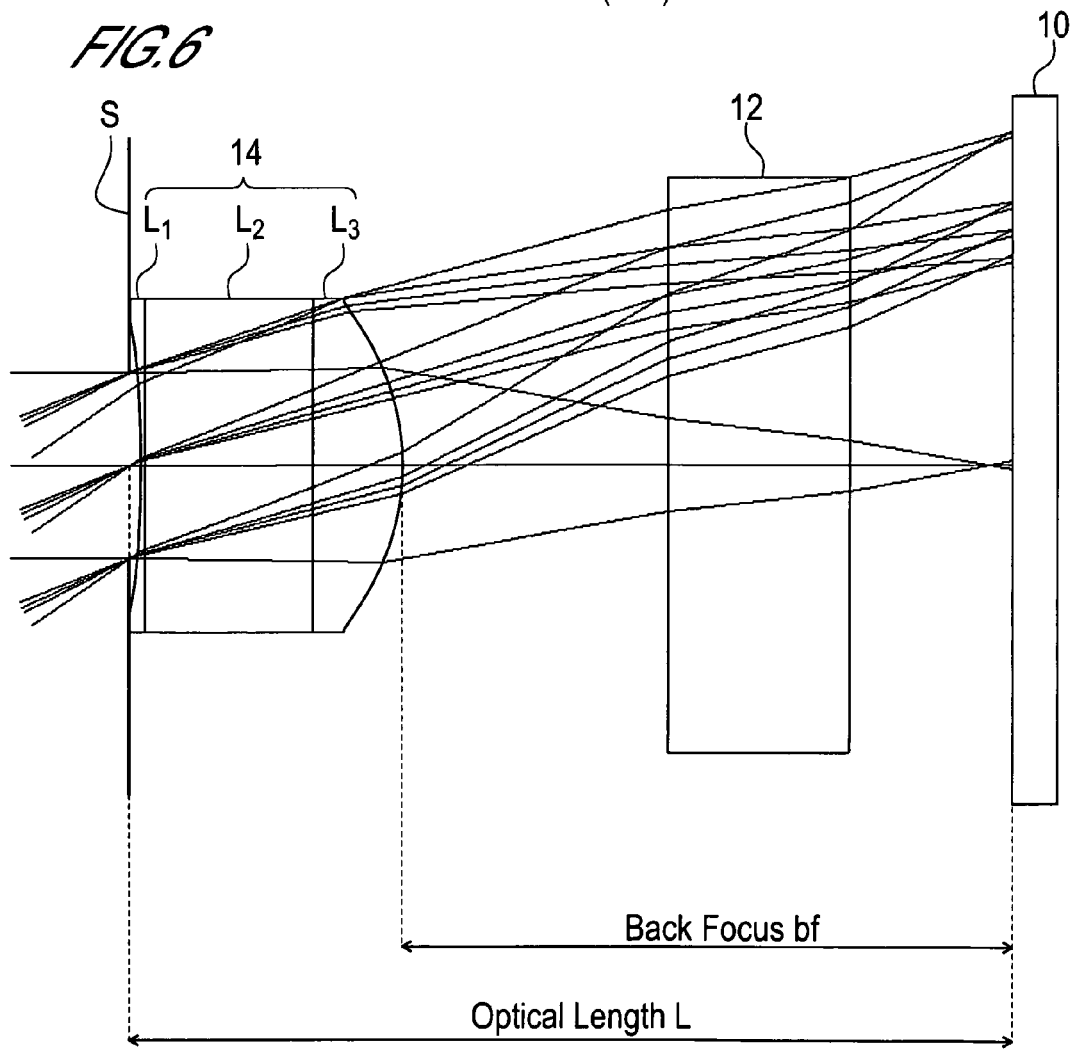
FIG. 6 is a cross-sectional view depicting an imaging lens according to Embodiment 2.

In FIG. 1 and FIG. 2, in the case of indirect bonding, adhesive 50 and adhesive 52 for indirect bonding exist on the interfaces indicated by $r_3$ and $r_4$ respectively. If coating processing has been performed on both sides or on one side of the second lens $L_2$, coating film 60 or coating film 62 exists. In order to indicate the presence of the adhesive 50 and adhesive 52 and the coating film 60 or coating film 62, the interfaces indicated by $r_3$ and $r_4$ are shown by bold lines. In FIG. 6, FIG.

10, FIG. 14, FIG. 18, FIG. 22, FIG. 26, FIG. 30, FIG. 34, FIG. 38, FIG. 42 and FIG. 46 as well, adhesive or coating film exists on the interfaces indicated by $r_3$ and $r_4$ in the case of indirect bonding, but are shown as thin lines, just like $r_2$, $r_5$, $r_6$ and $r_7$, and indications for adhesive 50 and adhesive 52 and coating film 60 or coating film 62 are omitted, so that the drawings do not become complicated. In the imaging lens of the present invention, the thickness of the adhesive is small enough not to affect the optical characteristics of the imaging lens, so the thickness of the adhesive is ignored even if the adhesive exists on the interfaces indicated by $r_3$ and $r_4$.

Table 1 to Table 12 show the specific values of the parameters, such as $r_i$ (i=1, 2, 3, ..., 8) and $d_i$ (i=1, 2, 3, ..., 7) shown in these drawings. The suffix i is added corresponding to an aperture stop surface, surface number of each lens and thickness of the lens, or the surface spacing of the lens sequentially from the object side to the image side.

$r_i$ is a radius of curvature on the optical axis on the i-th surface.

$d_i$ is a distance from the i-th surface to the (i+1)th surface.

$N_i$ is a refractive index of the material of the lens having the i-th surface and (i+1)th surface.

$v_i$ is an Abbe number of the material of the lens having the i-th surface and (i+1)th surface.

In FIG. 1, the aperture of the diaphragm is shown by a segment. This is because the intersection of the diaphragm surface and the optical axis must be clearly shown to define the distance from the lens surface to the diaphragm surface. In FIG. 2, FIG. 6, FIG. 10, FIG. 14, FIG. 18, FIG. 22, FIG. 26, FIG. 30, FIG. 34, FIG. 38, FIG. 42 and FIG. 46, which are cross-sectional views of the imaging lenses of Embodiment 1 to Embodiment 12 respectively, a main body of the diaphragm for shielding light is shown by the two lines of which the start point is the edge of the aperture, by opening the aperture of the diaphragm, which is unlike FIG. 1. This is because the status of the diaphragm must be shown by opening the aperture of the diaphragm in order to enter such a beam as a main beam.

The optical length L is a distance from the diaphragm S to the image sensing plane. The back focus bf is a distance from the image side surface of the third lens $L_3$ constituting the junction type compound lens 14 to the image sensing plane. Here the length from the image side face of the third lens $L_3$ to the image sensing plane, which is measured without a cover glass, is regarded as the back focus bf.

The aspherical data is shown in Table 1 to Table 12 respectively with surface numbers. The value $r_i$ (i=1, 2, 3, ..., 8) of the radius of curvature on the optical axis is a positive value if it is a convex surface to the object side, and is a negative value if it is convex to the image side.

Both surfaces ($r_3$ and $r_4$) when the second lens is an optical parallel plate, diaphragm S ($r_1$), and surfaces of the cover glass (or filter) ($r_6$ and $r_7$) are planes, so the radius of curvature is indicated as ∞. The image sensing plane ($r_8$) is a plane, so $r_8$=∞, but this is omitted in Table 1 to Table 12.

The aspherical surface used for this invention is given by the following expression.

$$Z = ch^2/[1+[1-(1+k)c^2h^2]^{+1/2}] + A_4h^4 + A_6h^6 + A_8h^8 + A_{10}h^{10}$$

where

Z: depth from the vertex of the surface to the contact surface c: curvature of the surface on the optical axis h: height from the optical axis k: cone constant $A_4$: aspherical surface coefficient of degree 4

$A_6$: aspherical surface coefficient of degree 6

$A_8$: aspherical surface coefficient of degree 8

$A_{10}$: aspherical surface coefficient of degree 10

In Table 1 to Table 12 of this description, the numeric value to indicate an aspherical surface coefficient is denoted by an exponent, and "e−1", for example, means "the −1th power of 10". The value indicated as the focal distance f is a focal distance of the junction type compound lens (composite focal distance of the lens system comprised of the first lens to the third lens). For each embodiment, the open F number (also called open F value), which is an index of the brightness of the lens, is indicated by Fno. The open F number refers to the F number when the diameter of the aperture stop is the maximum by design. The diagonal length 2Y of the square image surface is indicated as the image height. Y is a value half of the diagonal length of the square image surface.

Now the imaging lens according to Embodiment 1 to Embodiment 12 will be described with reference to FIG. 1 to FIG. 49.

The distortion aberration curves shown in FIG. 3, FIG. 7, FIG. 11, FIG. 15, FIG. 19, FIG. 23, FIG. 27, FIG. 31, FIG. 35, FIG. 39, FIG. 43 and FIG. 47 show the aberration (unsatisfactory quantity of the tangent condition is shown in the abscissa by percentage) with respect to the distance from the optical axis (shown in the ordinate by percentage with the maximum distance from the optical axis within the image surface as 100). The astigmatism aberration curves shown in FIG. 4, FIG. 8, FIG. 12, FIG. 16, FIG. 20 FIG. 24, FIG. 28, FIG. 32, FIG. 36, FIG. 40, FIG. 44 and FIG. 48 show the aberration quantity (mm units) in the abscissa with respect to the distance from the optical axis shown in the ordinate, just like the distortion aberration curves, and show the aberration quantities (mm units) on the meridional surface and the sagittal surface respectively.

The chromatic/spherical aberration curves in FIG. 5, FIG. 9, FIG. 13, FIG. 17, FIG. 21, FIG. 25, FIG. 29, FIG. 33, FIG. 37, FIG. 41, FIG. 45 and FIG. 49 show the aberration quantity (mm units) in the abscissa with respect to the entrance height h in the ordinate. The entrance height h in the ordinate is shown as a value converted into an F number. For example, in the case of a lens of which Fno is 2.8, the entrance height h=100% of the ordinate corresponds to F=2.8.

For the chromatic/spherical aberration curves, the aberration values with respect to the C-line (light of which wavelength is 656.3 nm), d-line (light of which wavelength is 587.6 nm), e-line (light of which wavelength is 546.1 nm), F-line (light of which wavelength is 486.1 nm) and g-line (light of which wavelength is 435.8 nm) are shown.

Table 1 to Table 12 show the list of the radius of curvature (mm units), lens surface spacing (mm units), refractive index of lens material, Abbe number of lens material, focal distance, F number and aspherical surface coefficient of composing lens of Embodiment 1 to Embodiment 12 respectively. The radius of curvature on the optical axis and the lens surface spacing of the composing lens are shown as values when the value of the composite focal distance f of the imaging lens is normalized to 1.00 mm.

In Embodiment 1 to Embodiment 11, a transparent high hardness silicon resin, which is a curable resin material, is used for the material of the first lens $L_1$ and the third lens $L_3$ constituting the junction type compound lens 14. Optical glass BK 7, which is a glass material, is used for the material of the second lens $L_2$. Here BK 7 is a name assigned by Schott Glass Co. to a group of borosilicate glass. Optical glass BK 7 is now manufactured by a plurality of manufacturers. The refractive index and the Abbe number of the commercially available optical glass BK 7 are somewhat different depending on the manufacturer and the manufacturing lot.

In Embodiment 12, the transparent high hardness silicon resin, which is a curable resin material, is used for the material of the first lens $L_1$ and the third lens $L_3$ constituting the junction type compound lens 14. A transparent high hardness silicon resin, which is a curable resin material, is also used for the material of the second lens $L_2$.

Both respective surfaces of the first lens $L_1$ and the third lens $L_3$ constituting the junction type compound lens 14 are aspherical.

As FIG. 1 shows, the imaging lens of the present invention comprises an aperture stop S, and a junction type compound lens 14 having a positive refractive power, where the aperture stop S and the junction type compound lens 14 are arranged in the sequence from an object side to an image side. The junction type compound lens 14 further comprises a first lens $L_1$, a second lens $L_2$ and a third lens $L_3$ arrayed in this sequence, from the object side to the image side.

In Embodiment 1 to Embodiment 11, the first lens $L_1$ and the second lens $L_2$ are indirectly bonded, and the second lens $L_2$ and the third lens $L_3$ are indirectly bonded. In Embodiment 12, the first lens $L_1$ and the second lens $L_2$ are indirectly or directly bonded, and the second lens $L_2$ and the third lens $L_3$ are indirectly or directly bonded.

A cover glass 12 is inserted between the junction type compound lens 14 and the image sensing element 10. A material of the cover glass is optical glass BK 7 (made by Hoya Corporation) of which refractive index is 1.5613 and the Abbe number is 64.0.

For the curable resin material, which is a material of the first lens $L_1$ and the third lens $L_3$, SMX-7852 made by Fuji Polymer Industries Co., Ltd, IVSM-4500 made by Toshiba Corporation, and SR-7010 made by Dow Corning Toray Co., Ltd. were used. In Embodiment 12, for the curable resin material, which is a material of the second lens $L_2$, a thermo-setting silicon resin Silplus® MHD, made by Nippon Steel Chemical Co., LTd. was used. The refractive indexes and the Abbe numbers of these thermo-setting silicon resins differ depending on the manufacturer, and also differ somewhat even if the product name is the same. In the following embodiment, a refractive index of a lens material is a value with respect to the d-line (light of which wavelength is 587.6 nm).

Epoxy adhesive can be used for an adhesive for indirect bonding. Specifically, a refractive index matching type optical adhesive (e.g. see <URL: http://keytech.ntt-at.co.jp/optic2/prd_1001.html> [searched on May 7, 2007] of NTT Advanced Technology Co.) can be used. This refractive index matching type optical adhesive has durability under heat, and even if the lens is temporarily placed in a high temperature environment, a form change, such as melting, does not occur, and the optical performance does not deteriorate. This refractive index matching type optical adhesive is transparent to visible light, and the refractive index thereof can be adjusted in the range of 1.33 to 1.70 at a ±0.005 accuracy. As mentioned later, for the first to the third lenses constituting the junction type compound lens used for the imaging lens of the present embodiment, a material of which refractive index is in a 1.33 to 1.70 range is used. Therefore this refractive index matching type optical adhesive can be manufactured with controlling the refractive index thereof to be a value close to all the refractive indexes of the first to the third lenses.

The adhesive to be used for indirect bonding is not limited to the above mentioned example of the refractive index matching type optical adhesive, but can be any adhesive which is transparent and which satisfies the conditions of the refractive index and heat resistance. A condition for the refractive index of the adhesive is that the refractive index of the adhesive is close to the refractive indexes of both of the two lenses to be bonded. A condition for the heat resistance is that even if the adhesive, which is solidified and is in a state of bonding of the two lenses, is placed in a high temperature environment in the reflow step or is placed in an environment which temporarily becomes high temperature, a form change, such as melting, does not occur, and optical performance thereof does not change.

Table 1 to Table 12 shows the value $r_i$ (i=1, 2, 3, ..., 8) of the radius of curvature on the optical axis, surface spacing $d_i$ (i=1, 2, 3, ..., 7) and refractive index, Abbe number and aspherical surface coefficient of the lens composing material of the imaging lens according to Embodiment 1 to Embodiment 12 respectively. The value $r_i$ of the radius of curvature on the optical axis, surface spacing $d_i$, and other values shown in Table 1 to Table 12 are indicated after normalizing the focal distance of the junction type compound lens 14 to 1.00 mm.

TABLE 1

Embodiment 1

| Radius of Curvature ($r_i$) | Interval ($d_i$) | Refractive Index ($N_i$) | Abbe Number ($v_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 1.029$ | | | | 4.460 | 4.243 | −1.609e+2 | 3.119e+3 | −2.393e+4 |
| | $d_2 = 0.0929$ | $N_2 = 1.51000$ | $v_2 = 56.0$ | | | | | |
| $r_3 = \infty$ | | | | | | | | |
| | $d_3 = 0.4343$ | $N_3 = 1.51680$ | $v_3 = 64.0$ | | | | | |
| $r_4 = \infty$ | | | | | | | | |
| | $d_4 = 0.0929$ | $N_4 = 1.51000$ | $v_4 = 56.0$ | | | | | |
| $r_5 = -0.807$ | | | | −8.000e+1 | −2.495 | 2.275e+1 | −7.433e+1 | 1.147e+2 |
| | $d_5 = 0.3000$ | | | | | | | |
| $r_6 = \infty$ | | | | | | | | |
| | $d_6 = 0.2788$ | $N_6 = 1.51633$ | $v_6 = 64.0$ | | | | | |
| $r_7 = \infty$ | | | | | | | | |
| | $d_7 = 0.3136$ | | | | | | | |

Focal Distance f = 1.00 mm
F-Number $F_{no}$ = 2.8
Image Height 2Y = 1.350 mm

TABLE 2

Embodiment 2

| Radius of Curvature ($r_i$) | Interval ($d_i$) | Refractive Index ($N_i$) | Abbe Number ($v_i$) | Aspherical Surface Coefficients |||||
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0196$ | | | | | | | |
| $r_2 = -5.734$ | | | | 3.331e+2 | −1.324 | 9.289e+1 | −2.729e+3 | 1.937e+4 |
| | $d_2 = 0.0096$ | $N_2 = 1.51000$ | $v_2 = 56.0$ | | | | | |
| $r_3 = \infty$ | | | | | | | | |
| | $d_3 = 0.3120$ | $N_3 = 1.51680$ | $v_3 = 64.0$ | | | | | |
| $r_4 = \infty$ | | | | | | | | |
| | $d_4 = 0.1680$ | $N_4 = 1.51000$ | $v_4 = 56.0$ | | | | | |
| $r_5 = -0.482$ | | | | 3.832e−1 | 3.212 | −5.795e+1 | 6.149e+2 | −1.863e+3 |
| | $d_5 = 0.5000$ | | | | | | | |
| $r_6 = \infty$ | | | | | | | | |
| | $d_6 = 0.3360$ | $N_6 = 1.51633$ | $v_6 = 64.0$ | | | | | |
| $r_7 = \infty$ | | | | | | | | |
| | $d_7 = 0.3068$ | | | | | | | |

Focal Distance f = 1.00 mm
F-Number $F_{no}$ = 2.8
Image Height 2Y = 1.260 mm

TABLE 3

Embodiment 3

| Radius of Curvature ($r_i$) | Interval ($d_i$) | Refractive Index ($N_i$) | Abbe Number ($v_i$) | Aspherical Surface Coefficients |||||
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.853$ | | | | 4.460 | 6.831 | −3.557e+2 | 9.474e+3 | −9.983e+4 |
| | $d_2 = 0.0793$ | $N_2 = 1.42000$ | $v_2 = 52.0$ | | | | | |
| $r_3 = \infty$ | | | | | | | | |
| | $d_3 = 0.3706$ | $N_3 = 1.51680$ | $v_3 = 64.0$ | | | | | |
| $r_4 = \infty$ | | | | | | | | |
| | $d_4 = 0.0793$ | $N_4 = 1.42000$ | $v_4 = 52.0$ | | | | | |
| $r_5 = -0.683$ | | | | −8.000e+1 | −4.017 | 5.031e+1 | −2.258e+2 | 4.785e+2 |
| | $d_5 = 0.3000$ | | | | | | | |
| $r_6 = \infty$ | | | | | | | | |
| | $d_6 = 0.2379$ | $N_6 = 1.51633$ | $v_6 = 64.0$ | | | | | |
| $r_7 = \infty$ | | | | | | | | |
| | $d_7 = 0.3681$ | | | | | | | |

Focal Distance f = 1.00 mm
F-Number $F_{no}$ = 3.0
Image Height 2Y = 1.352 mm

TABLE 4

Embodiment 4

| Radius of Curvature ($r_i$) | Interval ($d_i$) | Refractive Index ($N_i$) | Abbe Number ($v_i$) | Aspherical Surface Coefficients |||||
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 1.029$ | | | | 4.460 | 4.243 | −1.609e+2 | 3.119e+3 | −2.393e+4 |
| | $d_2 = 0.0929$ | $N_2 = 1.51000$ | $v_2 = 40.0$ | | | | | |
| $r_3 = \infty$ | | | | | | | | |
| | $d_3 = 0.4343$ | $N_3 = 1.51680$ | $v_3 = 64.0$ | | | | | |
| $r_4 = \infty$ | | | | | | | | |
| | $d_4 = 0.0929$ | $N_4 = 1.51000$ | $v_4 = 40.0$ | | | | | |
| $r_5 = -0.807$ | | | | −8.000e+1 | −2.495 | 2.275e+1 | −7.433e+1 | 1.147e+2 |
| | $d_5 = 0.3000$ | | | | | | | |

TABLE 4-continued

Embodiment 4

| Radius of Curvature ($r_i$) | Interval ($d_i$) | Refractive Index ($N_i$) | Abbe Number ($v_i$) | Aspherical Surface Coefficients | | | | |
|---|---|---|---|---|---|---|---|---|
| | | | | K | $A_4$ | $A_6$ | $A_8$ | $A_{10}$ |
| $r_6 = \infty$ | | | | | | | | |
| | $d_6 = 0.2788$ | $N_6 = 1.51633$ | $v_6 = 64.0$ | | | | | |
| $r_7 = \infty$ | | | | | | | | |
| | $d_7 = 0.3136$ | | | | | | | |

Focal Distance f = 1.00 mm
F-Number $F_{no}$ = 2.8
Image Height 2Y = 1.350 mm

TABLE 5

Embodiment 5

| Radius of Curvature ($r_i$) | Interval ($d_i$) | Refractive Index ($N_i$) | Abbe Number ($v_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 1.031$ | | | | 4.460 | 4.218 | $-1.593e+2$ | $3.076e+3$ | $-2.350e+4$ |
| | $d_2 = 0.0931$ | $N_2 = 1.51000$ | $v_2 = 56.0$ | | | | | |
| $r_3 = 4.008$ | | | | | | | | |
| | $d_3 = 0.4352$ | $N_3 = 1.51680$ | $v_3 = 64.0$ | | | | | |
| $r_4 = -4.008$ | | | | | | | | |
| | $d_4 = 0.0931$ | $N_4 = 1.51000$ | $v_4 = 56.0$ | | | | | |
| $r_5 = -0.808$ | | | | $-8.000e+1$ | $-2.480$ | $2.252e+1$ | $-7.330e+1$ | $1.126e+2$ |
| | $d_5 = 0.3000$ | | | | | | | |
| $r_6 = \infty$ | | | | | | | | |
| | $d_6 = 0.2794$ | $N_6 = 1.51633$ | $v_6 = 64.0$ | | | | | |
| $r_7 = \infty$ | | | | | | | | |
| | $d_7 = 0.3120$ | | | | | | | |

Focal Distance f = 1.00 mm
F-Number $F_{no}$ = 2.8
Image Height 2Y = 1.352 mm

TABLE 6

Embodiment 6

| Radius of Curvature ($r_i$) | Interval ($d_i$) | Refractive Index ($N_i$) | Abbe Number ($v_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0197$ | | | | | | | |
| $r_2 = -5.769$ | | | | $3.331e+2$ | $-1.300$ | $9.017e+1$ | $-2.618e+3$ | $1.836e+4$ |
| | $d_2 = 0.0097$ | $N_2 = 1.51000$ | $v_2 = 56.0$ | | | | | |
| $r_3 = 1.931$ | | | | | | | | |
| | $d_3 = 0.3139$ | $N_3 = 1.51680$ | $v_3 = 64.0$ | | | | | |
| $r_4 = -1.931$ | | | | | | | | |
| | $d_4 = 0.1690$ | $N_4 = 1.51000$ | $v_4 = 56.0$ | | | | | |
| $r_5 = -0.485$ | | | | $3.832e-1$ | $3.155$ | $-5.626e+1$ | $5.899e+2$ | $-1.766e+3$ |
| | $d_5 = 0.5000$ | | | | | | | |
| $r_6 = \infty$ | | | | | | | | |
| | $d_6 = 0.3380$ | $N_6 = 1.51633$ | $v_6 = 64.0$ | | | | | |
| $r_7 = \infty$ | | | | | | | | |
| | $d_7 = 0.3044$ | | | | | | | |

Focal Distance f = 1.00 mm
F-Number $F_{no}$ = 2.8
Image Height 2Y = 1.260 mm

TABLE 7

Embodiment 7

| Radius of Curvature ($r_i$) | Interval ($d_i$) | Refractive Index ($N_i$) | Abbe Number ($v_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 1.026$ | | | | 4.460 | 4.282 | −1.633e+2 | 3.185e+3 | −2.458e+4 |
| | $d_2 = 0.0926$ | $N_2 = 1.51000$ | $v_2 = 56.0$ | | | | | |
| $r_3 = -3.988$ | | | | | | | | |
| | $d_3 = 0.4330$ | $N_3 = 1.51680$ | $v_3 = 64.0$ | | | | | |
| $r_4 = 3.988$ | | | | | | | | |
| | $d_4 = 0.0926$ | $N_4 = 1.51000$ | $v_4 = 56.0$ | | | | | |
| $r_5 = -0.804$ | | | | −8.000e+1 | −2.518 | 2.309e+1 | −7.591e+1 | 1.178e+2 |
| | $d_5 = 0.3000$ | | | | | | | |
| $r_6 = \infty$ | | | | | | | | |
| | $d_6 = 0.2780$ | $N_6 = 1.51633$ | $v_6 = 64.0$ | | | | | |
| $r_7 = \infty$ | | | | | | | | |
| | $d_7 = 0.3145$ | | | | | | | |

Focal Distance f = 1.00 mm
F-Number $F_{no}$ = 2.8
Image Height 2Y = 1.352 mm

TABLE 8

Embodiment 8

| Radius of Curvature ($r_i$) | Interval ($d_i$) | Refractive Index ($N_i$) | Abbe Number ($v_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0195$ | | | | | | | |
| $r_2 = -5.705$ | | | | 3.331e+2 | −1.344 | 9.529e+1 | −2.828e+3 | 2.028e+4 |
| | $d_2 = 0.0478$ | $N_2 = 1.51000$ | $v_2 = 56.0$ | | | | | |
| $r_3 = -1.910$ | | | | | | | | |
| | $d_3 = 0.2245$ | $N_3 = 1.51680$ | $v_3 = 64.0$ | | | | | |
| $r_4 = 1.910$ | | | | | | | | |
| | $d_4 = 0.2149$ | $N_4 = 1.51000$ | $v_4 = 56.0$ | | | | | |
| $r_5 = -0.479$ | | | | 3.832e−1 | 3.261 | −5.945e+1 | 6.373e+2 | −1.951e+3 |
| | $d_5 = 0.5000$ | | | | | | | |
| $r_6 = \infty$ | | | | | | | | |
| | $d_6 = 0.3343$ | $N_6 = 1.51633$ | $v_6 = 64.0$ | | | | | |
| $r_7 = \infty$ | | | | | | | | |
| | $d_7 = 0.3099$ | | | | | | | |

Focal Distance f = 1.00 mm
F-Number $F_{no}$ = 2.8
Image Height 2Y = 1.254 mm

TABLE 9

Embodiment 9

| Radius of Curvature ($r_i$) | Interval ($d_i$) | Refractive Index ($N_i$) | Abbe Number ($v_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 1.064$ | | | | 4.460 | 3.837 | −1.360e+2 | 2.466e+3 | −1.769e+4 |
| | $d_2 = 0.0961$ | $N_2 = 1.53000$ | $v_2 = 35.0$ | | | | | |
| $r_3 = \infty$ | | | | | | | | |
| | $d_3 = 0.4491$ | $N_3 = 1.51680$ | $v_3 = 64.0$ | | | | | |
| $r_4 = \infty$ | | | | | | | | |
| | $d_4 = 0.0961$ | $N_4 = 1.53000$ | $v_4 = 35.0$ | | | | | |
| $r_5 = -0.834$ | | | | −8.000e+1 | −2.256 | 1.924e+1 | −5.877e+1 | 8.479e+1 |
| | $d_5 = 0.3102$ | | | | | | | |

TABLE 9-continued

Embodiment 9

| Radius of Curvature ($r_i$) | Interval ($d_i$) | Refractive Index ($N_i$) | Abbe Number ($v_i$) | Aspherical Surface Coefficients | | | | |
|---|---|---|---|---|---|---|---|---|
| | | | | K | $A_4$ | $A_6$ | $A_8$ | $A_{10}$ |
| $r_6 = \infty$ | | | | | | | | |
| | $d_6 = 0.2788$ | $N_6 = 1.51633$ | $v_6 = 64.0$ | | | | | |
| $r_7 = \infty$ | | | | | | | | |
| | $d_7 = 0.2959$ | | | | | | | |

Focal Distance f = 1.00 mm
F-Number $F_{no}$ = 2.8
Image Height 2Y = 1.352 mm

TABLE 10

Embodiment 10

| Radius of Curvature ($r_i$) | Interval ($d_i$) | Refractive Index ($N_i$) | Abbe Number ($v_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 1.059$ | | | | 4.460 | 3.898 | −1.396e+2 | 2.558e+3 | −1.854e+4 |
| | $d_2 = 0.0956$ | $N_2 = 1.53000$ | $v_2 = 35.0$ | | | | | |
| $r_3 = 4.115$ | | | | | | | | |
| | $d_3 = 0.4468$ | $N_3 = 1.51680$ | $v_3 = 64.0$ | | | | | |
| $r_4 = -4.115$ | | | | | | | | |
| | $d_4 = 0.0956$ | $N_4 = 1.53000$ | $v_4 = 35.0$ | | | | | |
| $r_5 = -0.830$ | | | | −8.000e+1 | −2.292 | 1.974e+1 | −6.096e+1 | 8.886e+1 |
| | $d_5 = 0.3080$ | | | | | | | |
| $r_6 = \infty$ | | | | | | | | |
| | $d_6 = 0.2794$ | $N_6 = 1.51633$ | $v_6 = 64.0$ | | | | | |
| $r_7 = \infty$ | | | | | | | | |
| | $d_7 = 0.2988$ | | | | | | | |

Focal Distance f = 1.00 mm
F-Number $F_{no}$ = 2.8
Image Height 2Y = 1.352 mm

TABLE 11

Embodiment 11

| Radius of Curvature ($r_i$) | Interval ($d_i$) | Refractive Index ($N_i$) | Abbe Number ($v_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 1.070$ | | | | 4.460 | 3.776 | −1.325e+2 | 2.376e+3 | −1.687e+4 |
| | $d_2 = 0.0966$ | $N_2 = 1.53000$ | $v_2 = 35.0$ | | | | | |
| $r_3 = -4.158$ | | | | | | | | |
| | $d_3 = 0.4515$ | $N_3 = 1.51680$ | $v_3 = 64.0$ | | | | | |
| $r_4 = 4.158$ | | | | | | | | |
| | $d_4 = 0.0966$ | $N_4 = 1.53000$ | $v_4 = 35.0$ | | | | | |
| $r_5 = -0.839$ | | | | −8.000e+1 | −2.220 | 1.873e+1 | −5.663e+1 | 8.084e+1 |
| | $d_5 = 0.3128$ | | | | | | | |
| $r_6 = \infty$ | | | | | | | | |
| | $d_6 = 0.2780$ | $N_6 = 1.51633$ | $v_6 = 64.0$ | | | | | |
| $r_7 = \infty$ | | | | | | | | |
| | $d_7 = 0.2929$ | | | | | | | |

Focal Distance f = 1.00 mm
F-Number $F_{no}$ = 2.8
Image Height 2Y = 1.352 mm

TABLE 12

Embodiment 12

| Radius of Curvature ($r_i$) | Interval ($d_i$) | Refractive Index ($N_i$) | Abbe Number ($v_i$) | K | $A_4$ | $A_6$ | $A_8$ | $A_{10}$ |
|---|---|---|---|---|---|---|---|---|
| $r_1 = \infty$ | | | | | | | | |
| | $d_1 = 0.0000$ | | | | | | | |
| $r_2 = 1.0279$ | | | | 4.460 | 4.256 | −1.617e+2 | 3.141e+3 | −2.414e+4 |
| | $d_2 = 0.0928$ | $N_2 = 1.51000$ | $v_2 = 56.0$ | | | | | |
| $r_3 = \infty$ | | | | | | | | |
| | $d_3 = 0.4339$ | $N_3 = 1.51100$ | $v_3 = 36.0$ | | | | | |
| $r_4 = \infty$ | | | | | | | | |
| | $d_4 = 0.0928$ | $N_4 = 1.51000$ | $v_4 = 56.0$ | | | | | |
| $r_5 = -0.8059$ | | | | −8.000e+1 | −2.503 | 2.286e+1 | −7.486e+1 | 1.157e+2 |
| | $d_5 = 0.1127$ | | | | | | | |
| $r_6 = \infty$ | | | | | | | | |
| | $d_6 = 0.2785$ | $N_6 = 1.51633$ | $v_6 = 64.0$ | | | | | |
| $r_7 = \infty$ | | | | | | | | |
| | $d_7 = 0.5000$ | | | | | | | |

Focal Distance f = 1.00 mm
F-Number $F_{no}$ = 2.8
Image Height 2Y = 1.352 mm

The junction type compound lens 14 used for Embodiment 1 to Embodiment 11 is manufactured by indirectly bonding lenses. This indirect bonding is implemented by an adhesive between lenses. In this case, the first lens $L_1$ to the third lens $L_3$ are formed first, then adhesive is coated on the surface of the second lens $L_2$ facing the first lens $L_1$, or the third lens $L_3$, or on the surface of the first lens $L_1$, or the third lens $L_3$, facing the second lens $L_2$, and lenses are contacted.

Coating could be performed at least on one surface of the second lens $L_2$ facing the first lens $L_1$, or the third lens $L_3$, then the lenses are bonded. In this case, indirect bonding or direct bonding, to be mentioned below, could be performed after coating processing.

The junction type compound lens 14 used for Embodiment 12 is manufactured by directly bonding or indirectly bonding lenses.

To manufacture the junction type compound lens by direct bonding, the following steps are performed (for details, see U.S. Pat. No. 3,926,380).

A die for forming the first lens $L_1$, that can bond to the second lens $L_2$, is prepared. This die is a cylinder where the side wall of the inner face is cylindrical, and the bottom face is a curve shape, the same as the object side face of the first lens $L_1$. A transparent curable silicon resin, which is a liquid state before curing, is injected into the die, and thermo-curing processing or UV curing processing is performed to form the first lens $L_1$, and the first lens $L_1$ is bonded to the second lens $L_2$.

Then a die for forming the third lens $L_3$, which is bonded to the above compound lens where the first lens $L_1$ and the second lens $L_2$ are bonded, is prepared. The bottom face of this die is a shape the same as the image side face of the third lens $L_3$. A transparent curable silicon resin, which is in a liquid state before curing, is injected into the die, thermo-curing processing or UV curing processing is performed to form the third lens $L_3$, and the third lens $L_3$ is bonded to the second lens $L_2$, where the first lens $L_1$ is bonded. Thus the junction type compound lens 14 is formed.

In the above mentioned manufacturing steps of the junction type compound lens 14, if the first lens $L_1$ and the third lens $L_3$ are formed by thermo-setting resin, a temperature control device, for increasing the temperature of the dies and controlling processing, is required. If the first lens $L_1$ and the third lens $L_3$ are formed by a UV curable resin, the manufacturing device for the junction type compound lens 14 is designed so that ultra violet can be irradiated onto the UV curable resin from an area above the die.

Embodiment 1

In the lens system of Embodiment 1, the first lens $L_1$ and the third lens $L_3$ are formed of transparent high hardness silicon resin SMX-7852 (made by Fuji Polymer Industries Co., Ltd.), and the second lens $L_2$ is formed of optical glass BK 7 (made by Ohara Inc.).

(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$1.51000.
(D) The Abbe number $v_2$ of the first lens $L_1$ is $v_2$=56.0.
(E) The Abbe number $v_3$ of the second lens $L_2$ is $v_3$=64.0.
(F) The Abbe number $v_4$ of the third lens $L_3$ is $v_4$=56.0.

Therefore $|N_3-N_2|=|N_3-N_4|=0.00680$, which satisfies the following Conditions (1) and (2). Also $|v_3-v_2|=|v_3-v_4|=8.0$, which satisfies the following Conditions (3) and (4).

Conditions (1) and (2) refer to the conditions given by the following Expression (1) and (2). The conditions (3) and (4) refer to the conditions given by the following Expressions (3) and (4).

$$0 \leq |N_3-N_2| \leq 0.1 \quad (1)$$

$$0 \leq |N_3-N_4| \leq 0.1 \quad (2)$$

$$0 \leq |v_3-v_2| \leq 30.0 \quad (3)$$

$$0 \leq |v_3-v_4| \leq 30.0 \quad (4)$$

Conditions (1) to (4) refer to conditions given by Expression (1) to (4) respectively, which is the same for the description herein below (description on Embodiment 2 to Embodiment 12).

FIG. 2 is a cross-sectional view of the imaging lens of Embodiment 1. As FIG. 2 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 1. The F number Fno is 2.8.

As Table 1 shows, $r_3=\infty$ and $r_4=\infty$ so the second lens $L_2$ is an optical parallel plate. Since $r_2$ is a positive value and $r_5$ is a negative value, the first lens $L_1$ is a plano-convex lens where the object side face of this first lens $L_1$ is a convex surface facing the object side, and the third lens $L_3$ is a piano-convex lens where the image side face of this third lens $L_3$ is a convex surface facing the image side. The junction type compound lens 14 has a positive refractive power.

In Embodiment 1, the optical length L with respect to the focal distance f=1.00 mm is sufficiently short, 1.513 mm, and the back focus bf is sufficiently long, 0.798 mm.

Figure 3:
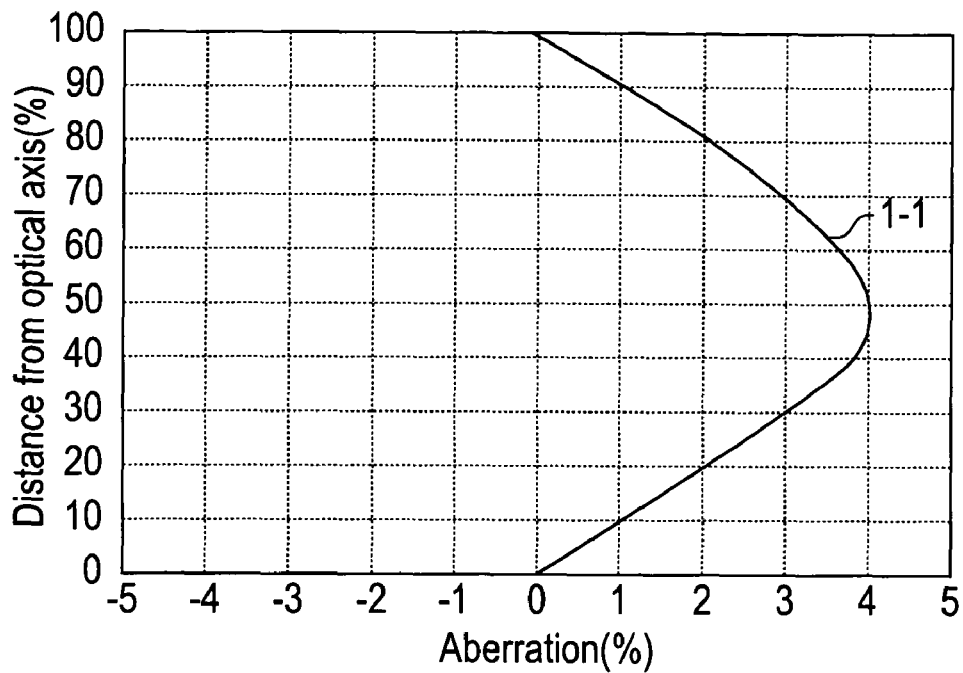
FIG. 3 is a diagram depicting the distortion aberration of the imaging lens of Embodiment 1.
Figure 4:
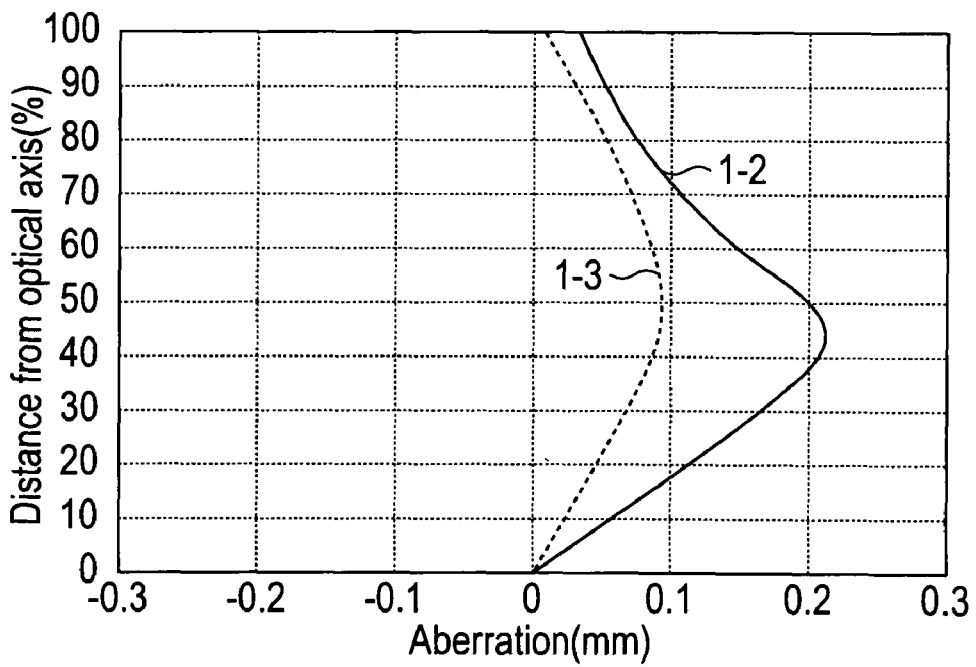
FIG. 4 is a diagram depicting the astigmatism aberration of the imaging lens of Embodiment 1.
Figure 5:
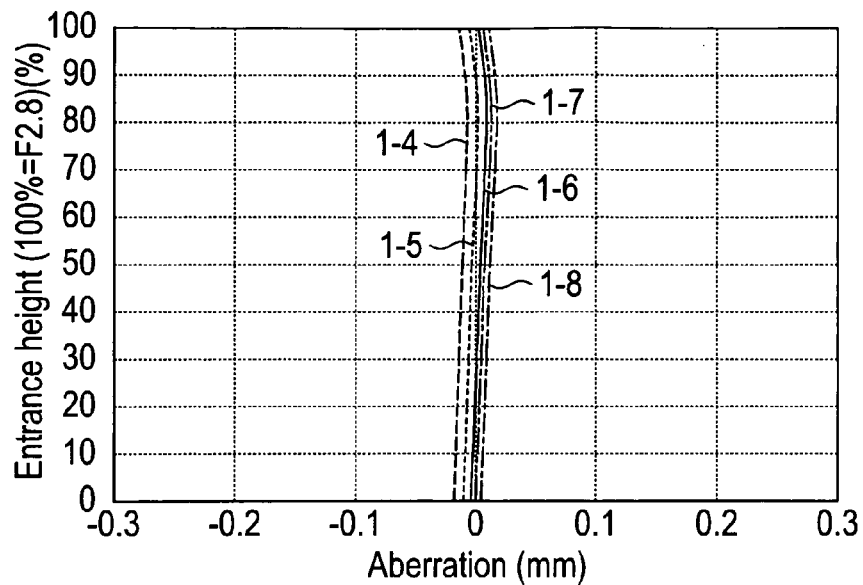
FIG. 5 is a diagram depicting the chromatic/spherical aberration of the imaging lens of Embodiment 1.

FIG. 3 shows a graph of the distortion aberration curve 1-1, FIG. 4 shows a graph of the astigmatism aberration curve (aberration curve 1-2 on the meridional surface and aberration curve 1-3 on the sagittal surface), and FIG. 5 shows a graph of a chromatic/spherical aberration curve (aberration curve 1-4 on g-line, aberration curve 1-5 on F-line, aberration curve 1-6 on e-line, aberration curve 1-7 on d-line and aberration curve 1-8 on C-line).

The ordinates of the aberration curves in FIG. 3 and FIG. 4 show the image height by a % of the distance from the optical axis. In FIG. 3 and FIG. 4, 100% corresponds to 0.675 mm. The ordinate of the aberration curve in FIG. 5 shows the entrance height h (F number), and the maximum thereof corresponds to 2.8. The abscissa of FIG. 3 shows the aberration (%), and the abscissas of FIG. 4 and FIG. 5 show the value of the aberration.

For the distortion aberration, the absolute value of the aberration is 4.0%, which is the maximum, at the position of image height 50% (image height 0.338 mm), and the absolute value of the aberration is within 4.0% in a range where the image height is 0.675 mm or less.

For the astigmatism aberration, the absolute value of the aberration of the meridional surface is 0.21 mm, which is the maximum, at the position of the image height 45% (image height 0.304 mm), and the absolute value of the aberration is within 0.21 mm in a range where the image height is 0.675 mm or less.

For the chromatic/spherical aberration, the absolute value of the aberration curve 1-8 on the C-line is 0.0177 mm, which is the maximum, at 85% of the entrance height h and the absolute value of the aberration is within 0.0177 mm.

Therefore according to the imaging lens of Embodiment 1, good images are acquired.

Embodiment 2

In the lens system of Embodiment 2, the first lens $L_1$ and the third lens $L_3$ are formed of transparent high hardness silicon resin SMX-7852 (made by Fuji Polymer Industries Co., Ltd.), and the second lens $L_2$ is formed of optical glass BK 7 (made by Ohara Inc.).
(A) The refractive index $N_2$ of the first lens $L_1$ is $N_2=1.51000$.
(B) The refractive index $N_3$ of the second lens $L_2$ is $N_3=1.51680$.
(C) The refractive index $N_4$ of the third lens $L_3$ is $N_4=1.51000$.
(D) The Abbe number $v_2$ of the first lens $L_1$ is $v_2=56.0$.
(E) The Abbe number $v_3$ of the second lens $L_2$ is $v_3=64.0$.
(F) The Abbe number $v_4$ of the third lens $L_3$ is $v_4=56.0$.

Therefore $|N_3-N_2|=|N_3-N_4|=0.00680$, which satisfies the following Conditions (1) and (2). Also $|v_3-v_2|=|v_3-v_4|=8.0$, which satisfies the following Conditions (3) and (4).

FIG. 6 shows a cross-sectional view of the imaging lens of Embodiment 2. As FIG. 6 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 2. The F number Fno is 2.8.

As Table 2 shows, $r_3=\infty$ and $r_4=\infty$, so the second lens $L_2$ is an optical parallel plate. Since $r_2$ is a negative value and $r_5$ is a negative value, the first lens $L_1$ is a plano-concave lens where the object side face of this first lens $L_1$ is a concave surface facing the object side, and the third lens $L_3$ is a plano-convex lens where the image side face of this third lens $L_3$ is a convex surface facing the image side. The junction type compound lens 14 has a positive refractive power.

In Embodiment 2, the optical length L with respect to the focal distance f=1.00 mm is sufficiently short, 1.653 mm, and the back focus bf is sufficiently long, 1.029 mm.

Figure 7:
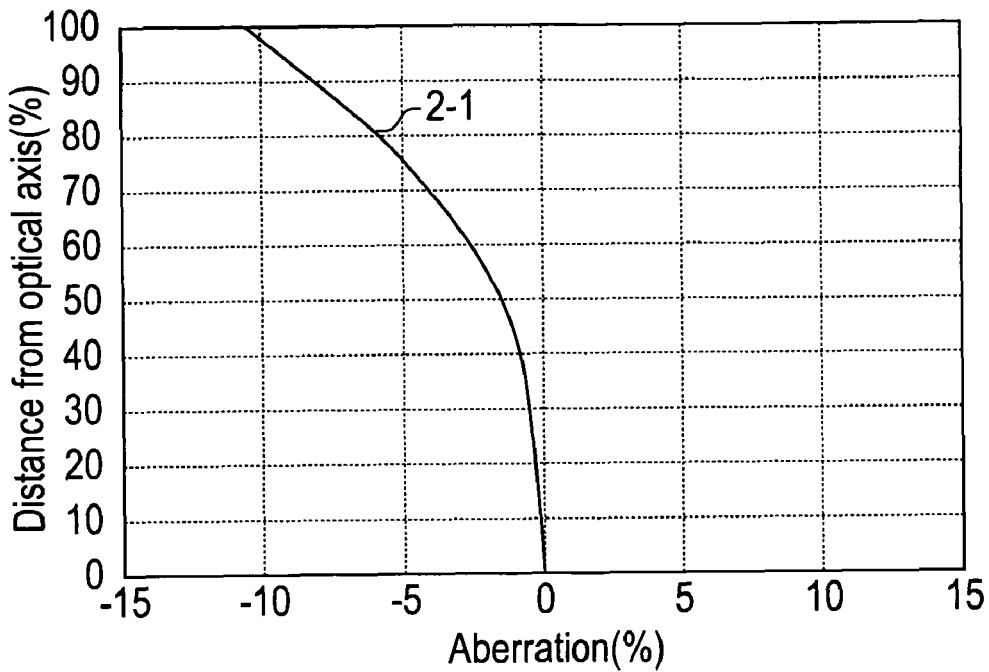
FIG. 7 is a diagram depicting the distortion aberration of the imaging lens of Embodiment 2.
Figure 8:
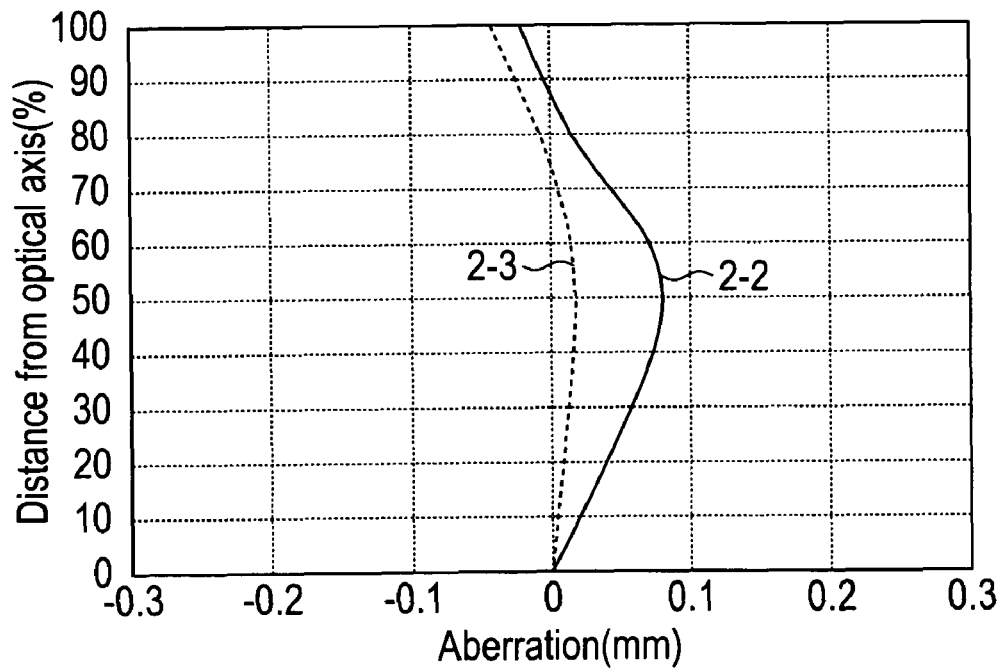
FIG. 8 is a diagram depicting the astigmatism aberration of the imaging lens of Embodiment 2.
Figure 9:
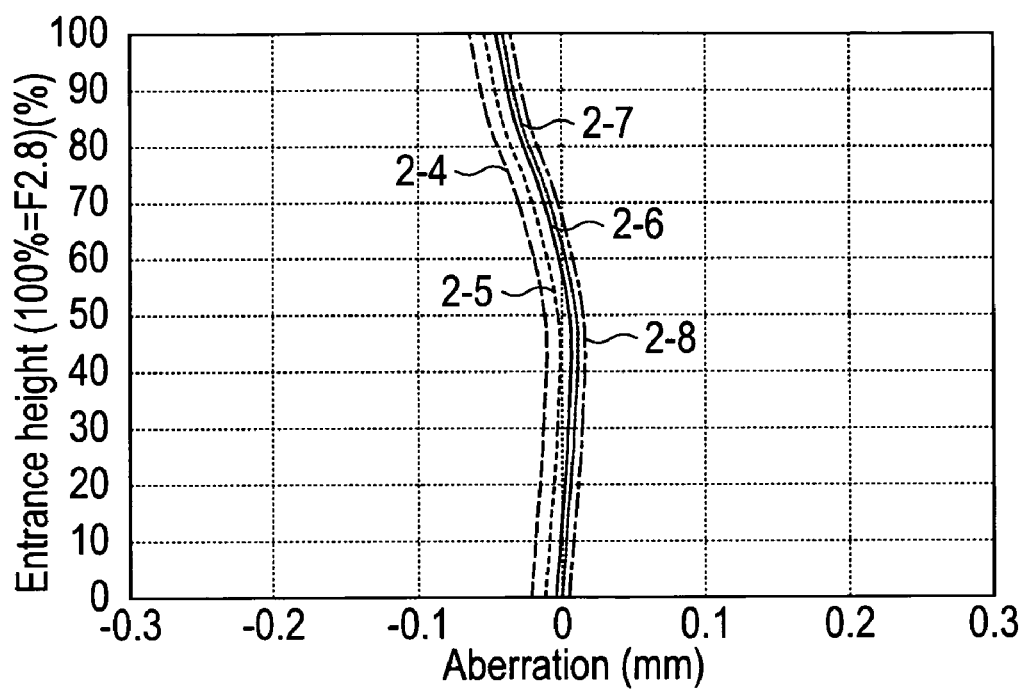
FIG. 9 is a diagram depicting the chromatic/spherical aberration of the imaging lens of Embodiment 2.

FIG. 7 shows a graph of the distortion aberration curve 2-1, FIG. 8 shows a graph of the astigmatism aberration curve (aberration curve 2-2 on the meridional surface and aberration curve 2-3 on the sagittal surface), and FIG. 9 shows a graph of the chromatic/spherical aberration curve (aberration curve 2-4 on g-line, aberration curve 2-5 on F-line, aberration curve 2-6 on e-line, aberration curve 2-7 on d-line and aberration curve 2-8 on C-line).

The ordinates of the aberration curves in FIG. 7 and FIG. 8 show the image height by a % of the distance from the optical axis. In FIG. 7 and FIG. 8, 100% corresponds to 0.630 mm. The ordinate of the aberration curve in FIG. 9 shows the entrance height h (F number), and the maximum thereof corresponds to 2.8. The abscissa of FIG. 7 shows the aberration (%), and the abscissas of FIG. 8 and FIG. 9 show the value of the aberration.

For the distortion aberration, the absolute value of the aberration is 10.5%, which is the maximum, at the position of image height 100% (image height 0.630 mm), and the absolute value of the aberration is within 10.5% in a range where the image height is 0.630 mm or less.

For the astigmatism aberration, the absolute value of the aberration on the meridional surface is 0.08 mm, which is the maximum, at the position of the image height 50% (image height 0.315 mm), and the absolute value of the aberration is within 0.08 mm in a range where the image height is 0.630 mm or less.

For the chromatic/spherical aberration, the absolute value of the aberration curve 2-4 on the g-line is 0.0639 mm, which is the maximum, at 100% of the entrance height h, and the absolute value of the aberration is within 0.0639 mm.

Therefore according to the imaging lens of Embodiment 2, good images are acquired.

Embodiment 3

In the lens system of Embodiment 3, the first lens $L_1$ and the third lens $L_3$ are formed of transparent high hardness silicon resin IVSM-4500 (made by Toshiba Corporation), and the second lens $L_2$ is formed of optical glass BK 7 (made by Ohara Inc.).
(A) The refractive index $N_2$ of the first lens $L_1$ is $N_2=1.42000$.
(B) The refractive index $N_3$ of the second lens $L_2$ is $N_3=1.51680$.
(C) The refractive index $N_4$ of the third lens $L_3$ is $N_4=1.42000$.
(D) The Abbe number $v_2$ of the first lens $L_1$ is $v_2=52.0$.
(E) The Abbe number $v_3$ of the second lens $L_2$ is $v_3=64.0$.
(F) The Abbe number $v_4$ of the third lens $L_3$ is $v_4=52.0$.

Therefore $|N_3-N_2|=|N_3-N_4|=0.09680$, which satisfies the following Conditions (1) and (2). Also $|v_3-v_2|=|v_3-v_4|=12.0$, which satisfies the following Conditions (3) and (4).

Figure 10:
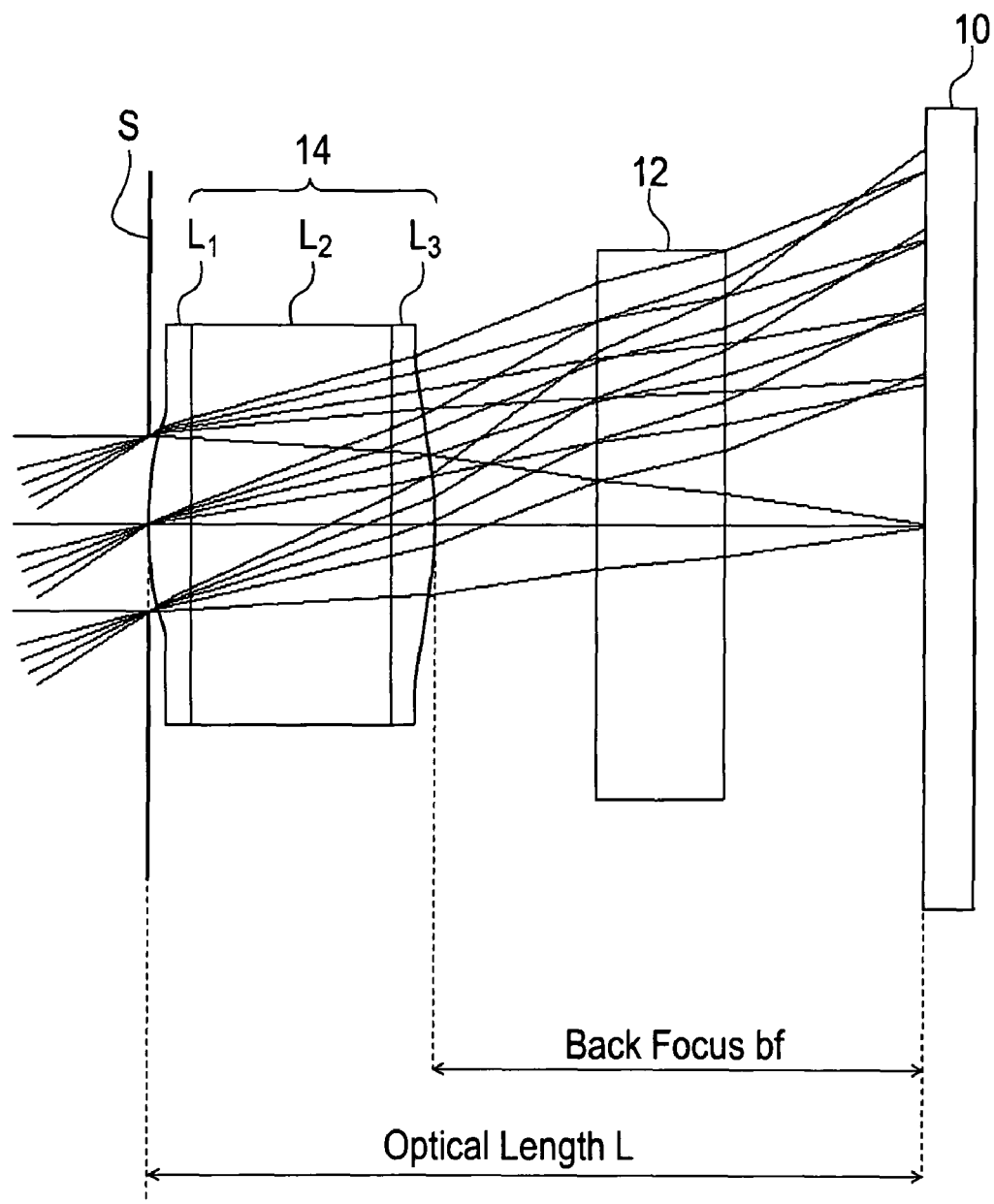
FIG. 10 is a cross-sectional view depicting an imaging lens according to Embodiment 3.

FIG. 10 shows a cross-sectional view of the imaging lens of Embodiment 3. As FIG. 10 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 3. The F number Fno is 3.0.

As Table 3 shows, $r_3=\infty$ and $r_4=\infty$, so the second lens $L_2$ is an optical parallel plate. Since $r_2$ is a positive value and $r_5$ is a negative value, the first lens $L_1$ is a plano-convex lens where the object side face of this first lens $L_1$ is a convex surface facing the object side, and the third lens $L_3$ is a piano-convex lens where the image side face of this third lens $L_3$ is a convex surface facing the image side. The junction type compound lens 14 has a positive refractive power.

In Embodiment 3, the optical length L with respect to the focal distance f=1.00 mm is sufficiently short, 1.435 mm, and the back focus bf is sufficiently long, 0.825 mm.

Figure 11:
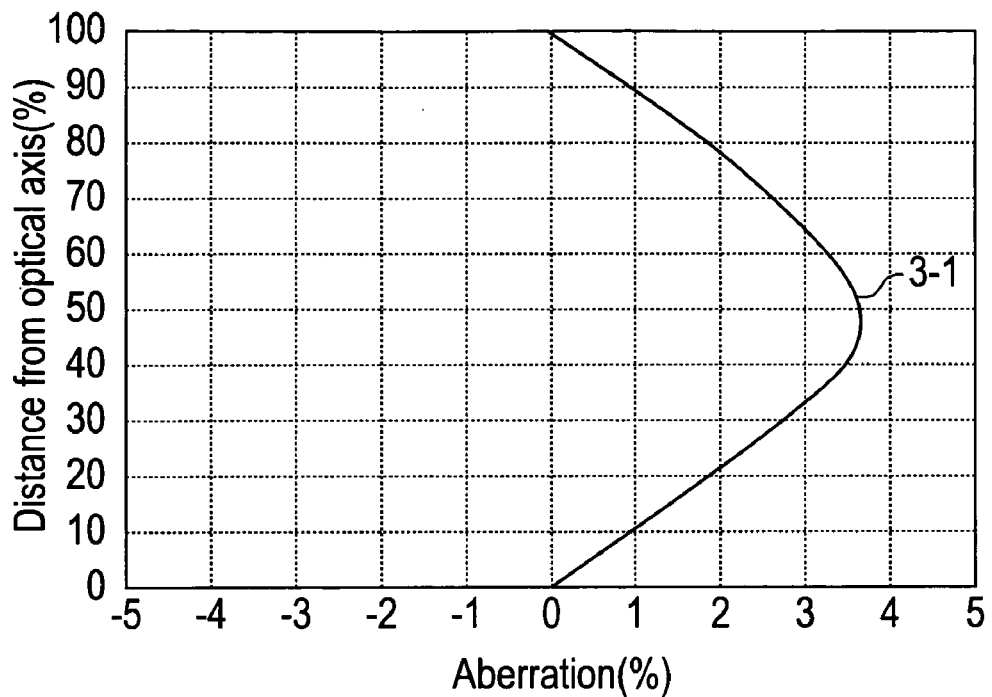
FIG. 11 is a diagram depicting the distortion aberration of the imaging lens of Embodiment 3.
Figure 12:
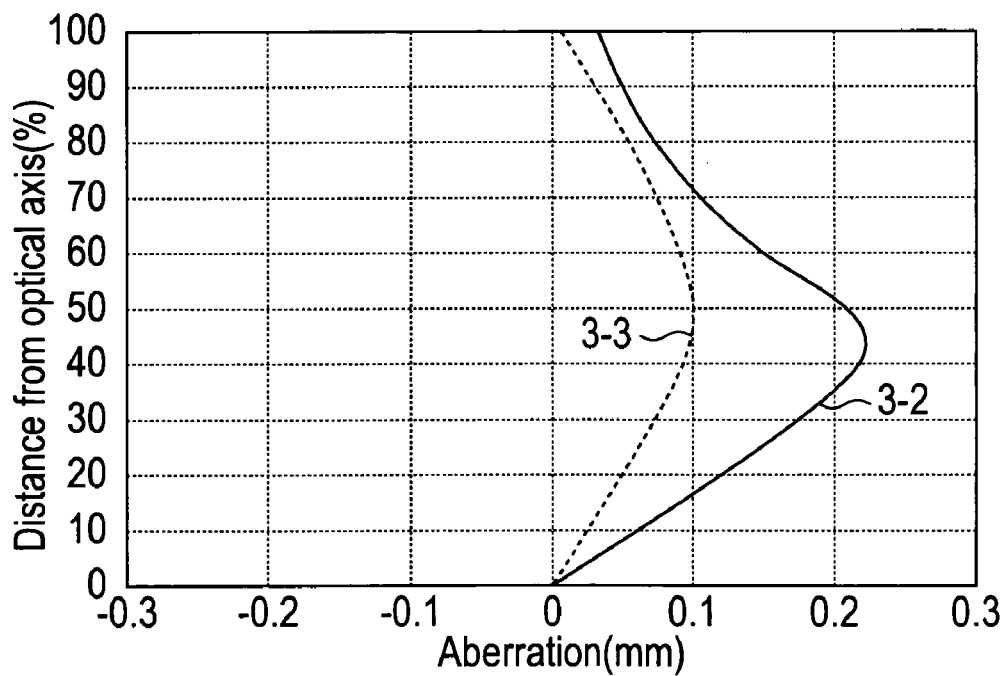
FIG. 12 is a diagram depicting the astigmatism aberration of the imaging lens of Embodiment 3.
Figure 13:
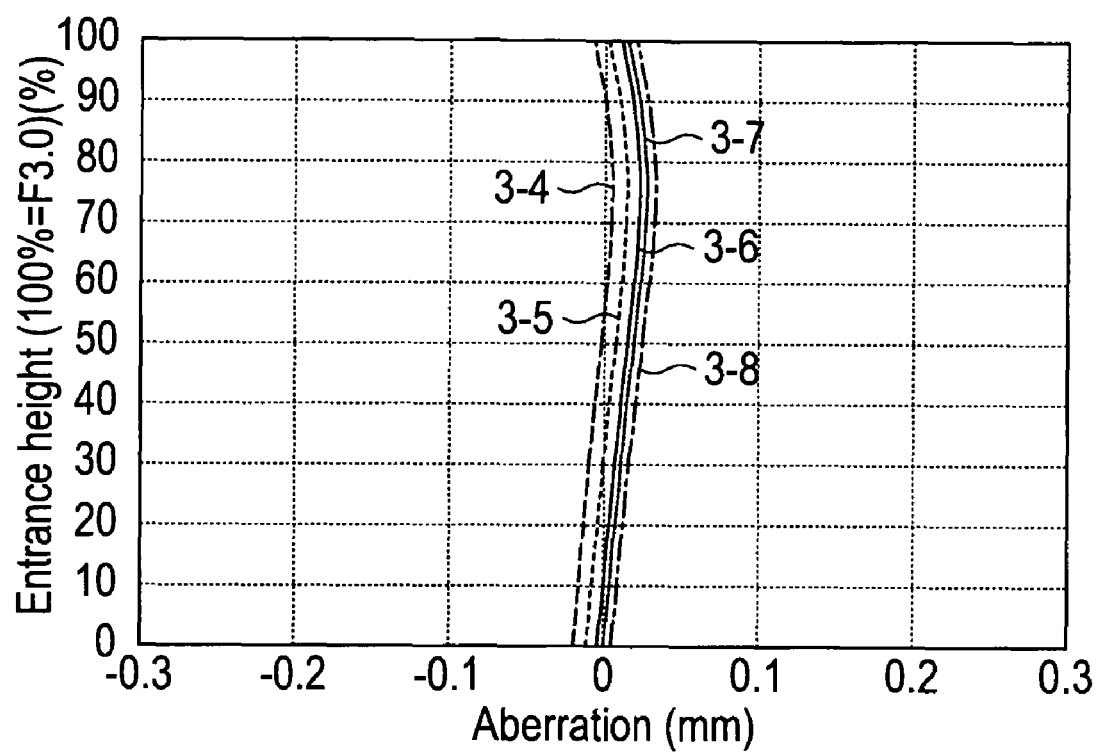
FIG. 13 is a diagram depicting the chromatic/spherical aberration of the imaging lens of Embodiment 3.

FIG. 11 shows a graph of the distortion aberration curve 3-1, FIG. 12 shows a graph of the astigmatism aberration curve (aberration curve 3-2 on the meridional surface and aberration curve 3-3 on the sagittal surface), surface FIG. 13 shows a graph of a chromatic/spherical aberration curve (aberration curve 3-4 on g-line, aberration curve 3-5 on F-line, aberration curve 3-6 on e-line, aberration curve 3-7 on d-line and aberration curve 3-8 on C-line).

The ordinates of the aberration curves in FIG. 11 and FIG. 12 show the image height by a % of the distance from the optical axis. In FIG. 11 and FIG. 12, 100% corresponds to 0.676 mm. The ordinate of the aberration curve in FIG. 13 shows the entrance height h (F number), and the maximum thereof corresponds to 3.0. The abscissa of FIG. 11 shows the aberration (%), and the abscissas of FIG. 12 and FIG. 13 show the value of the aberration.

For the distortion aberration, the absolute value of the aberration is 3.7%, which is the maximum, at the position of image height 50% (image height 0.338 mm), and the absolute value of the aberration is within 3.7% in a range where the image height is 0.676 mm or less.

For the astigmatism aberration, the absolute value of the aberration on the meridional surface is 0.22 mm, which is the maximum, at the position of the image height 45% (image height 0.304 mm), and the absolute value of the aberration is within 0.22 mm in a range where the image height is 0.676 mm or less.

For the chromatic/spherical aberration, the absolute value of the aberration curve 3-8 on the C-line is 0.0322 mm, which is the maximum, at 70% of the entrance height h, and the absolute value of the aberration is within 0.0322 mm.

Therefore according to the imaging lens of Embodiment 3, good images are acquired.

Embodiment 4

In the lens system of Embodiment 4, the first lens $L_1$ and the third lens $L_3$ are formed of transparent high hardness silicon resin SMX-7852 (made by Fuji Polymer Industries Co., Ltd.), and the second lens $L_2$ is formed of optical glass BK 7 (made by Ohara Inc.).
(A) The refractive index $N_2$ of the first lens $L_1$ is $N_2=1.51000$.
(B) The refractive index $N_3$ of the second lens $L_2$ is $N_3=1.51680$.
(C) The refractive index $N_4$ of the third lens $L_3$ is $N_4=1.51000$.
(D) The Abbe number $v_2$ of the first lens $L_1$ is $v_2=40.0$.
(E) The Abbe number $v_3$ of the second lens $L_2$ is $v_3=64.0$.
(F) The Abbe number $v_4$ of the third lens $L_3$ is $v_4=40.0$.

Therefore $|N_3-N_2|=|N_3-N_4|=0.00680$, which satisfies the following Conditions (1) and (2). Also $|v_3-v_2|=|v_3-v_4|=24.0$, which satisfies the following Conditions (3) and (4).

Figure 14:
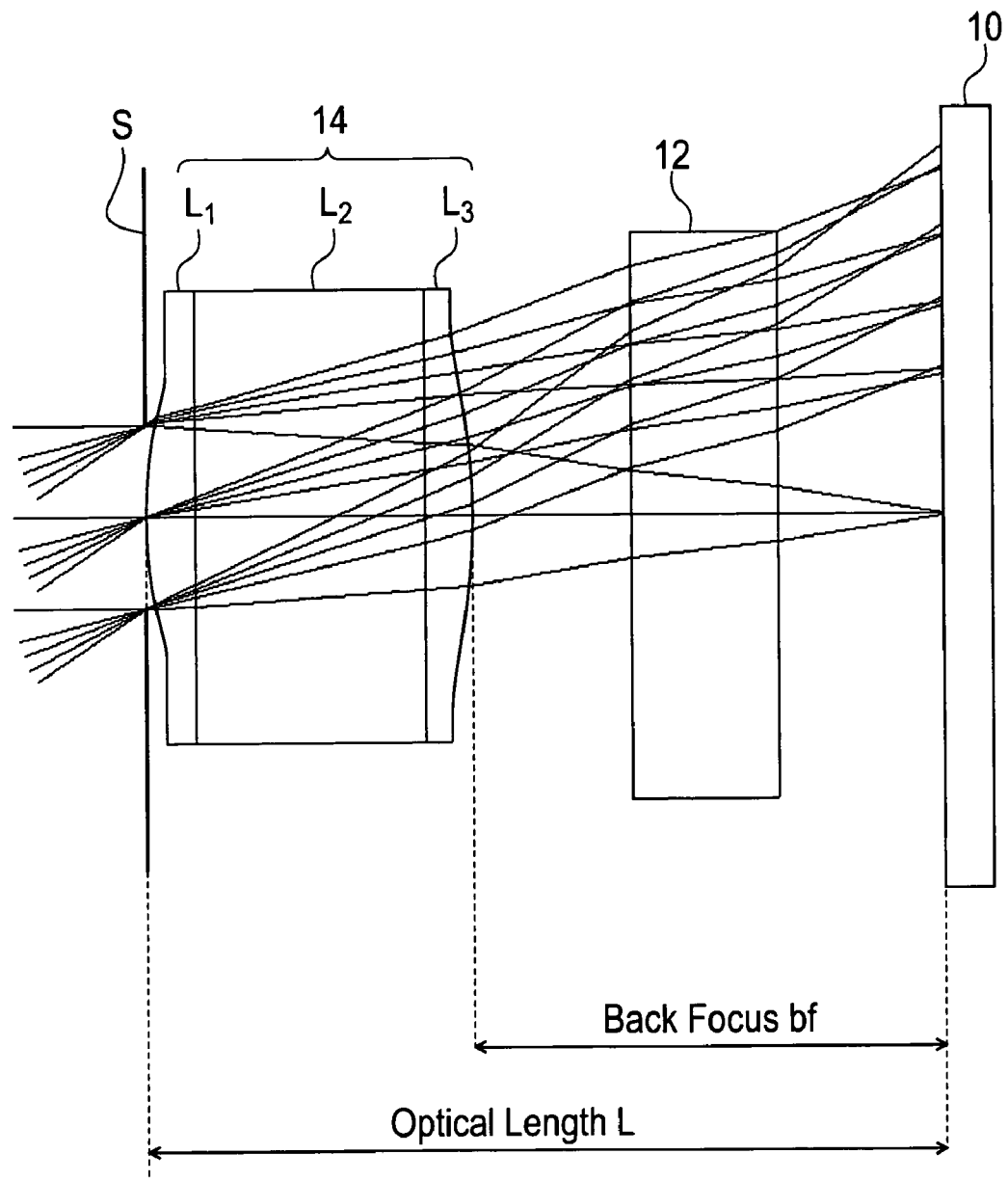
FIG. 14 is a cross-sectional view depicting an imaging lens according to Embodiment 4.

FIG. 14 shows a cross-sectional view of the imaging lens of Embodiment 4. As FIG. 14 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 4. The F number Fno is 2.8.

As Table 4 shows, $r_3=\infty$ and $r_4=\infty$, so the second lens $L_2$ is an optical parallel plate. Since $r_2$ is a positive value and $r_5$ is a negative value, the first lens $L_1$ is a plano-convex lens where the object side face of this first lens $L_1$ is a convex surface facing the object side, and the third lens $L_3$ is a piano-convex lens where the image side face of this third lens $L_3$ is a convex surface facing the image side. The junction type compound lens 14 has a positive refractive power.

In Embodiment 4, the optical length L with respect to the focal distance f=1.00 mm is sufficiently short, 1.513 mm, and the back focus bf is sufficiently long, 0.798 mm.

Figure 15:
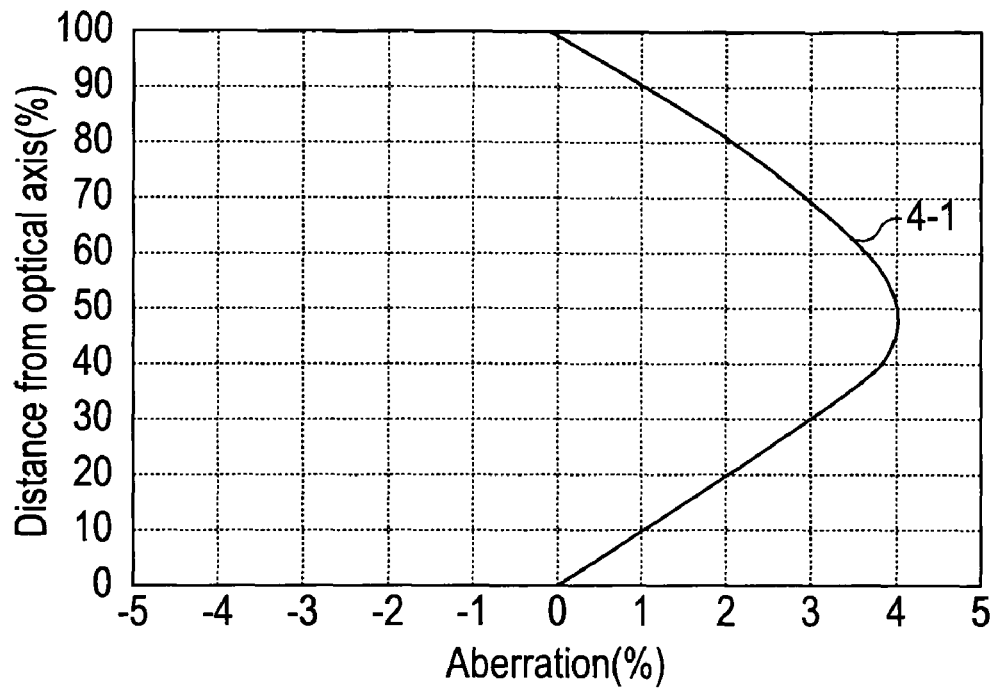
FIG. 15 is a diagram depicting the distortion aberration of the imaging lens of Embodiment 4.
Figure 16:
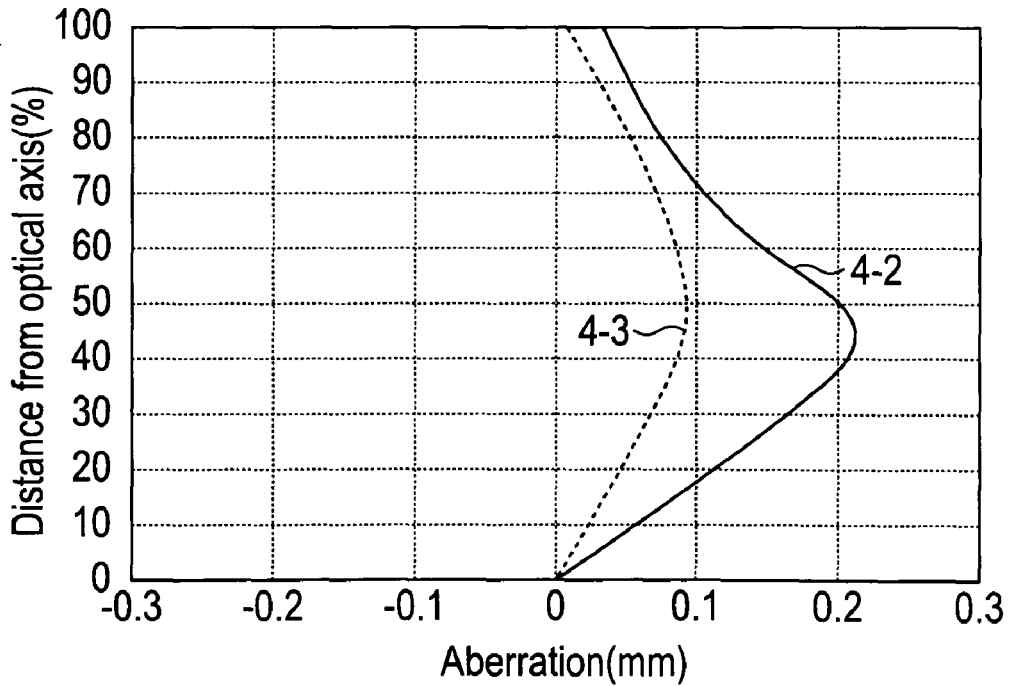
FIG. 16 is a diagram depicting the astigmatism aberration of the imaging lens of Embodiment 4.
Figure 17:
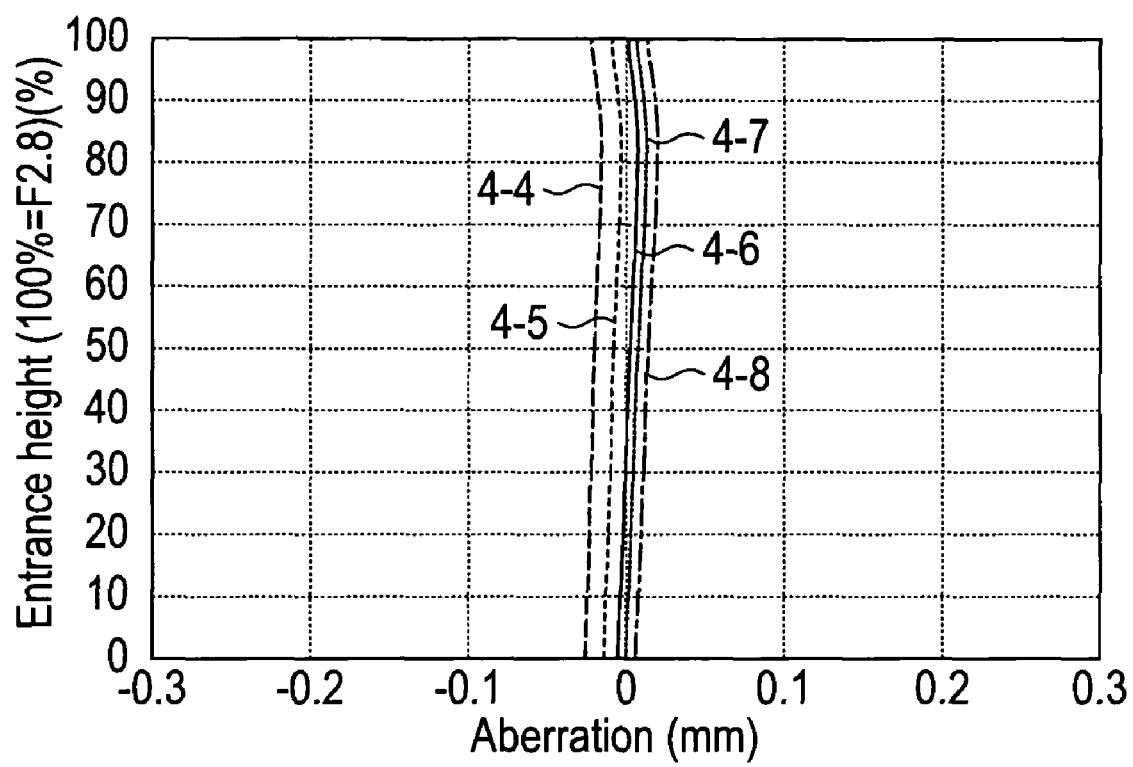
FIG. 17 is a diagram depicting the chromatic/spherical aberration of the imaging lens of Embodiment 4.

FIG. 15 shows a graph of the distortion aberration curve 4-1, FIG. 16 shows a graph of the astigmatism aberration curve (aberration curve 4-2 on the meridional surface and aberration curve 4-3 on the sagittal surface), and FIG. 17 shows a graph of a chromatic/spherical aberration curve (aberration curve 4-4 on g-line, aberration curve 4-5 on F-line, aberration curve 4-6 on e-line, aberration curve 4-7 on d-line and aberration curve 4-8 on C-line).

The ordinates of the aberration curves in FIG. 15 and FIG. 16 show the image height by a % of the distance from the optical axis. In FIG. 15 and FIG. 16, 100% corresponds to 0.675 mm. The ordinate of the aberration curve in FIG. 17 shows the entrance height h (F number), and the maximum thereof corresponds to 2.8. The abscissa of FIG. 15 shows the aberration (%), and the abscissas of FIG. 16 and FIG. 17 show the value of the aberration.

For the distortion aberration, the absolute value of the aberration is 4.0%, which is the maximum, at the position of image height 50% (image height 0.338 mm), and the absolute value of the aberration is within 4.0% in a range where the image height is 0.675 mm or less.

For the astigmatism aberration, the absolute value of the aberration on the meridional surface is 0.21 mm, which is the maximum, at the position of the image height 45% (image height 0.304 mm), and the absolute value of the aberration is within 0.21 mm in a range where the image height is 0.675 mm or less.

For the chromatic/spherical aberration, the absolute value of the aberration curve 4-4 on the g-line is 0.0260 mm, which is the maximum, at 0% of the entrance height h (lens center), and the absolute value of the aberration is within 0.0260 mm.

Therefore according to the imaging lens of Embodiment 4, good images are acquired.

Embodiment 5

In the lens system of Embodiment 5, the first lens $L_1$ and the third lens $L_3$ are formed of transparent high hardness silicon resin SMX-7852 (made by Fuji Polymer Industries Co., Ltd.), and the second lens $L_2$ is formed of optical glass BK 7 (made by Ohara Inc.).
(A) The refractive index $N_2$ of the first lens $L_1$ is $N_2=1.51000$.
(B) The refractive index $N_3$ of the second lens $L_2$ is $N_3=1.51680$.
(C) The refractive index $N_4$ of the third lens $L_3$ is $N_4=1.51000$.
(D) The Abbe number $v_2$ of the first lens $L_1$ is $v_2=56.0$.

(E) The Abbe number $v_3$ of the second lens $L_2$ is $v_3$=64.0.
(F) The Abbe number $v_4$ of the third lens $L_3$ is $v_4$=56.0.

Therefore $|N_3-N_2|=|N_3-N_4|$=0.00680, which satisfies the following Conditions (1) and (2). Also $|v_3-v_2|=|v_3-v_4|$=8.0, which satisfies the following Conditions (3) and (4).

Figure 18:
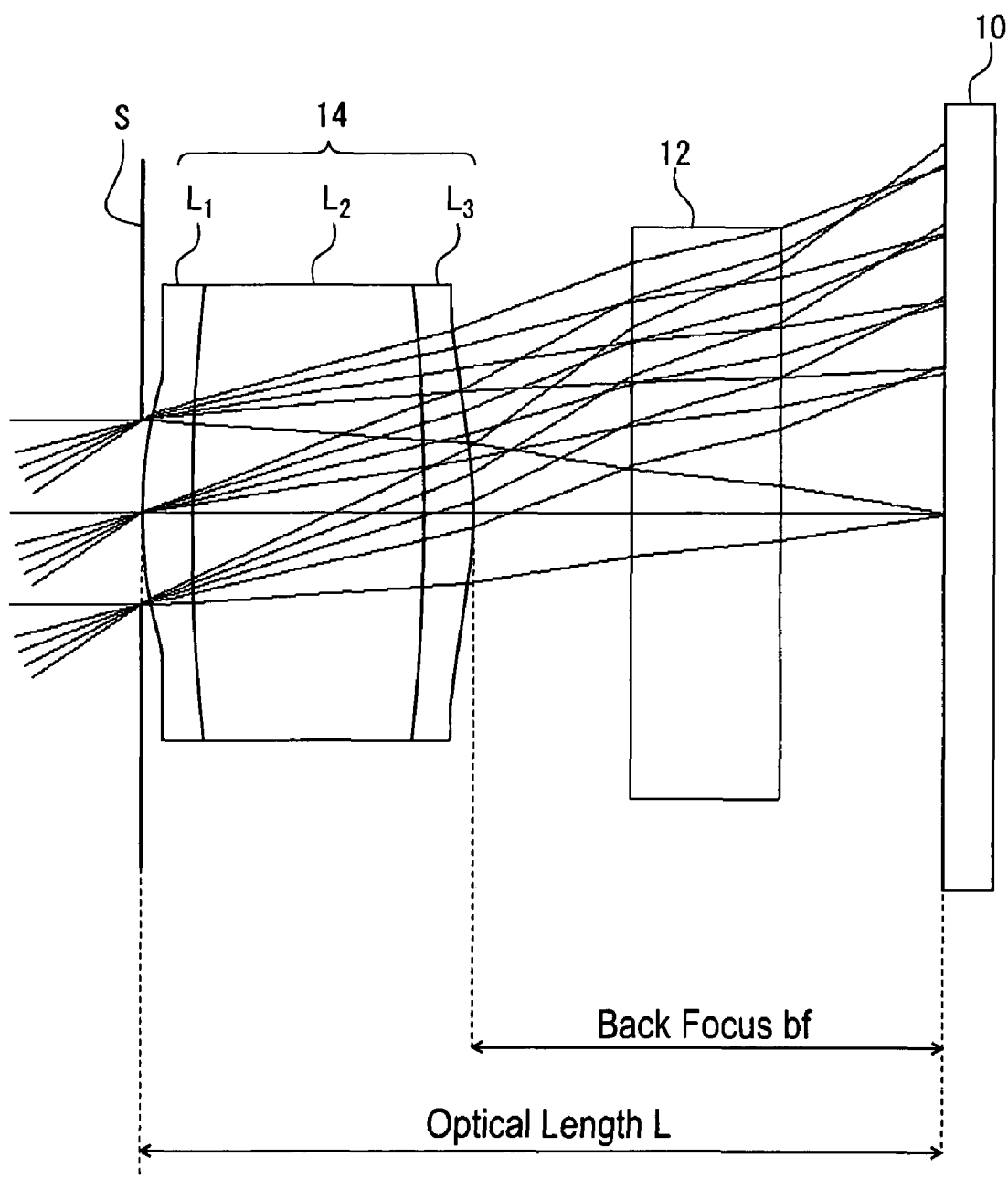
FIG. 18 is a cross-sectional view depicting an imaging lens according to Embodiment 5.

FIG. 18 shows a cross-sectional view of the imaging lens of Embodiment 5. As FIG. 18 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 5. The F number Fno is 2.8.

As Table 5 shows, $r_3$ is a positive value and $r_4$ is a negative value, so the second lens $L_2$ is a biconvex glass lens. Since $r_2$ is a positive value and $r_5$ is a negative value, the first lens $L_1$ is a lens where the object side face of this first lens $L_1$ is a convex surface facing the object side, and the third lens $L_3$ is a lens where the image side face of this third lens $L_3$ is a convex surface facing the image side. The junction type compound lens 14 has a positive refractive power.

In Embodiment 5, the optical length L with respect to the focal distance f=1.00 mm is sufficiently short, 1.513 mm, and the back focus bf is sufficiently long, 0.796 mm.

Figure 19:
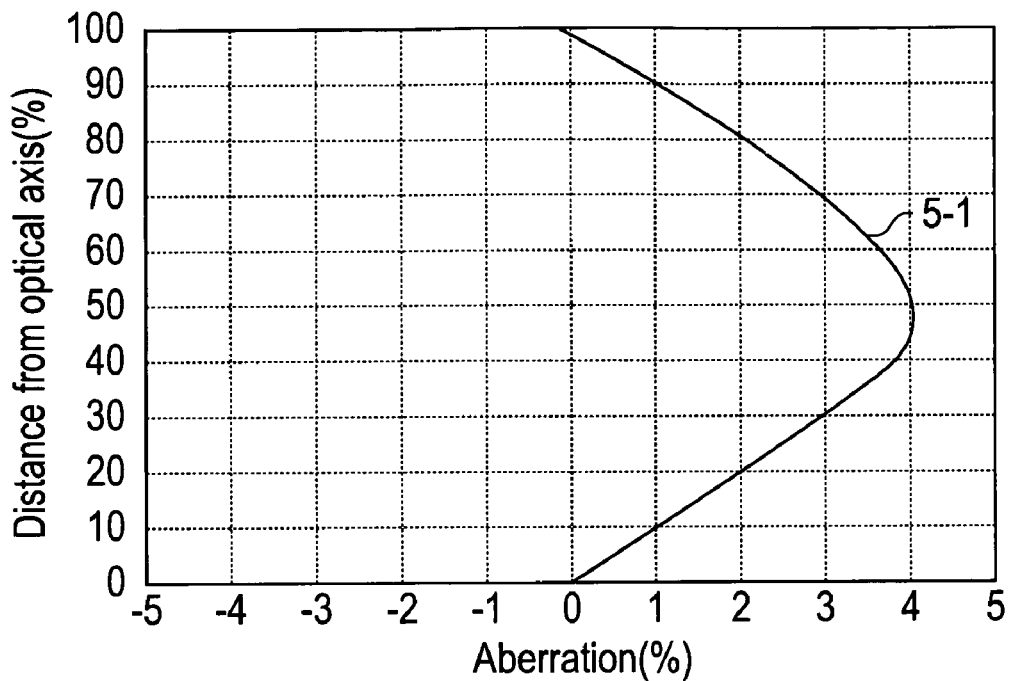
FIG. 19 is a diagram depicting the distortion aberration of the imaging lens of Embodiment 5.
Figure 20:
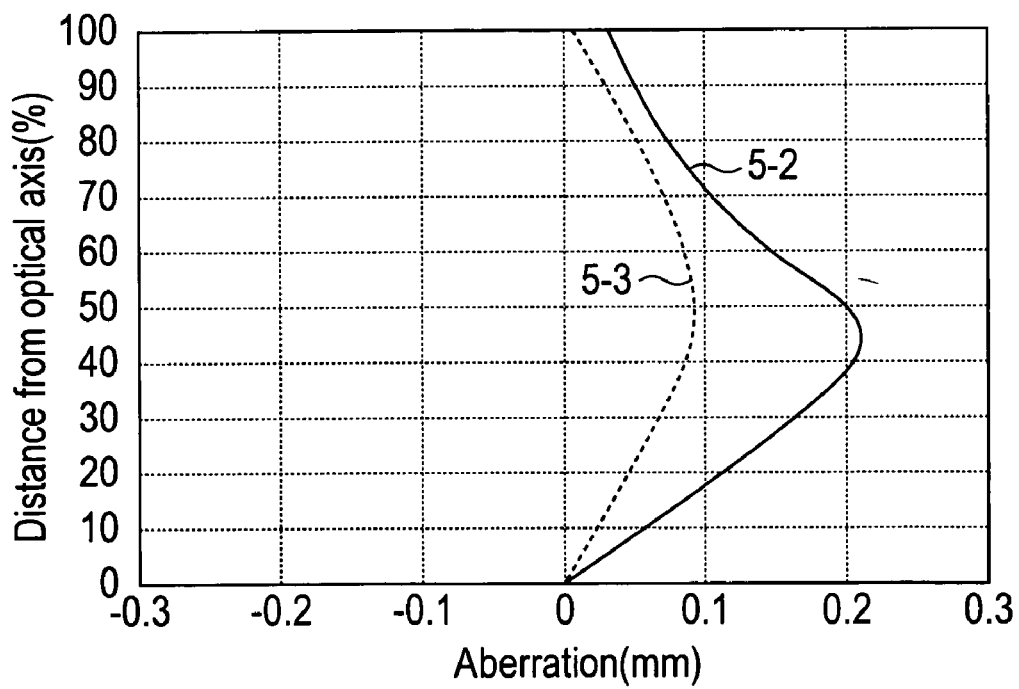
FIG. 20 is a diagram depicting the astigmatism aberration of the imaging lens of Embodiment 5.
Figure 21:
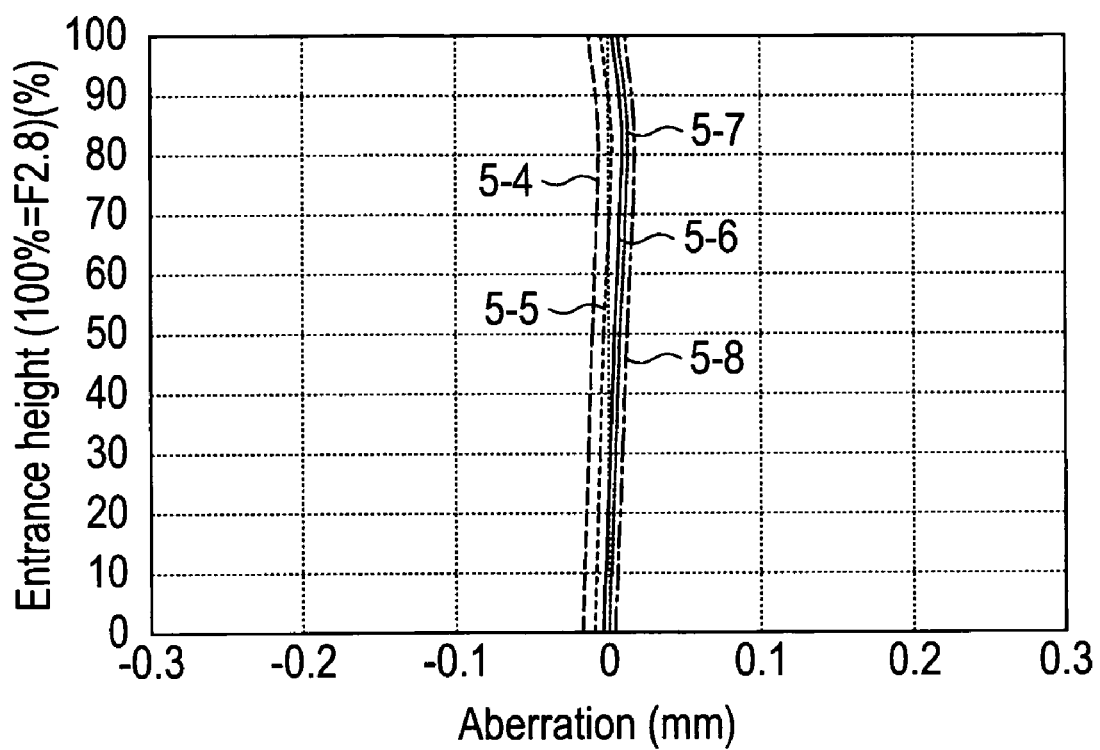
FIG. 21 is a diagram depicting the chromatic/spherical aberration of the imaging lens of Embodiment 5.

FIG. 19 shows a graph of the distortion aberration curve 5-1, FIG. 20 shows a graph of the astigmatism aberration curve (aberration curve 5-2 on the meridional surface and aberration curve 5-3 on the sagittal surface), and FIG. 21 shows a graph of a chromatic/spherical aberration curve (aberration curve 5-4 on g-line, aberration curve 5-5 on F-line, aberration curve 5-6 on e-line, aberration curve 5-7 on d-line and aberration curve 5-8 on C-line).

The ordinates of the aberration curves in FIG. 19 and FIG. 20 show the image height by a % of the distance from the optical axis. In FIG. 19 and FIG. 20, 100% corresponds to 0.676 mm. The ordinate of the aberration curve in FIG. 21 shows the entrance height h (F number), and the maximum thereof corresponds to 2.8. The abscissa of FIG. 19 shows the aberration (%), and the abscissas of FIG. 20 and FIG. 21 show the value of the aberration.

For the distortion aberration, the absolute value of the aberration is 4.1%, which is the maximum, at the position of image height 48% (image height 0.324 mm), and the absolute value of the aberration is within 4.1% in a range where the image height is 0.676 mm or less.

For the astigmatism aberration, the absolute value of the aberration on the meridional surface is 0.21 mm, which is the maximum, at the position of the image height 45% (image height 0.304 mm), and the absolute value of the aberration is within 0.21 mm in a range where the image height is 0.676 mm or less.

For the chromatic/spherical aberration, the absolute value of the aberration curve 5-8 on the C-line is 0.0174 mm, which is the maximum, at 85% of the entrance height h, and the absolute value of the aberration is within 0.0174 mm.

Therefore according to the imaging lens of Embodiment 5, good images are acquired.

Embodiment 6

In the lens system of Embodiment 6, the first lens $L_1$ and the third lens $L_3$ are formed of transparent high hardness silicon resin SMX-7852 (made by Fuji Polymer Industries Co., Ltd.), and the second lens $L_2$ is formed of optical glass BK 7 (made by Ohara Inc.).
(A) The refractive index $N_2$ of the first lens $L_1$ is $N_2$=1.51000.
(B) The refractive index $N_3$ of the second lens $L_2$ is $N_3$=1.51680.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=64.0.
(F) The Abbe number $v_4$ of the third lens $L_3$ is $v_4$=56.0.

Therefore $|N_3-N_2|=|N_3-N_4|$=0.00680, which satisfies the following Conditions (1) and (2). Also $|v_3-v_2|=|v_3-v_4|$=8.0, which satisfies the following Conditions (3) and (4).

Figure 22:
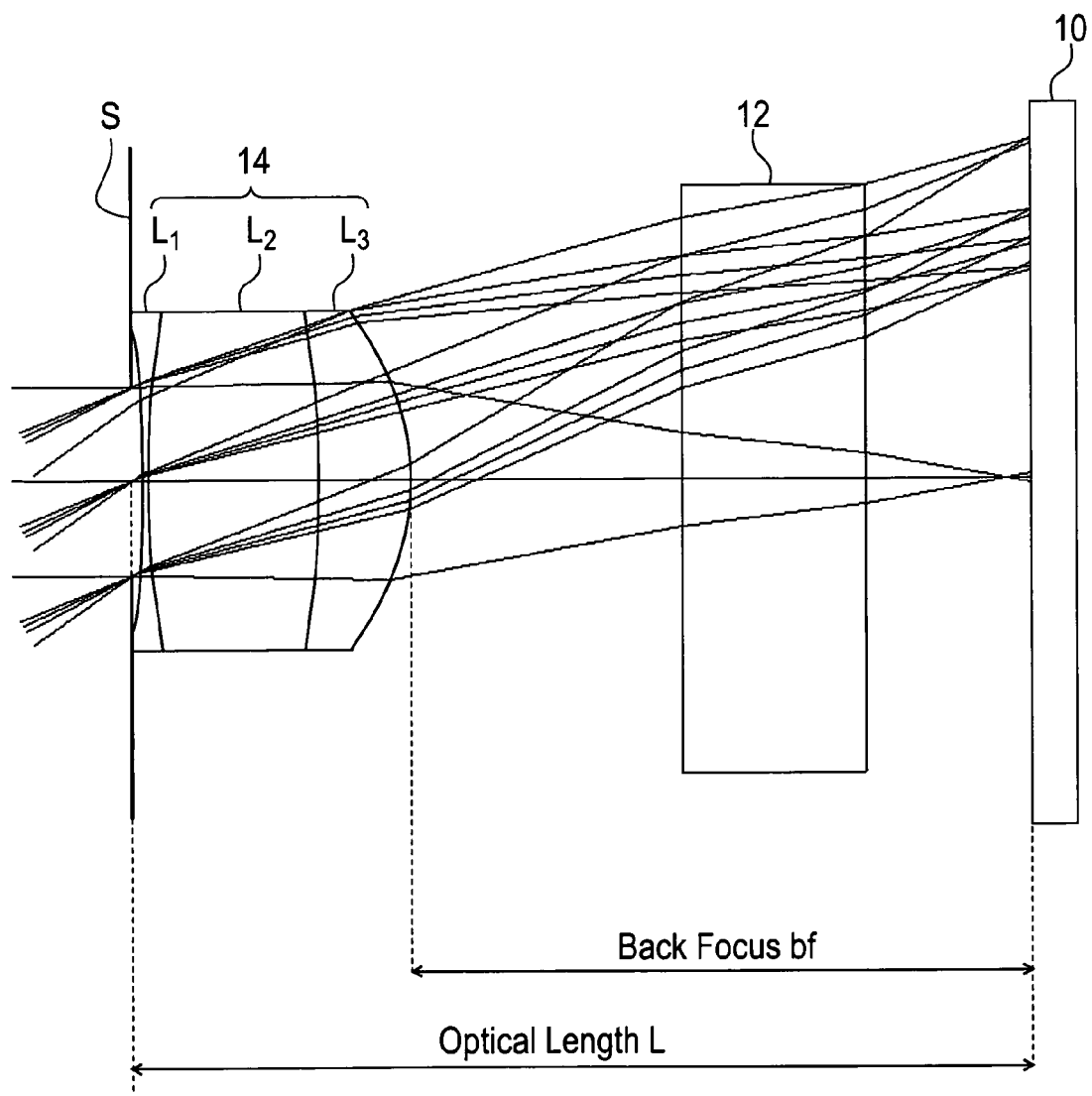
FIG. 22 is a cross-sectional view depicting an imaging lens according to Embodiment 6.

FIG. 22 shows a cross-sectional view of the imaging lens of Embodiment 6. As FIG. 22 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 6. The F number Fno is 2.8.

As Table 6 shows, $r_3$ is a positive value and $r_4$ is a negative value, so the second lens $L_2$ is a biconvex glass lens. Since $r_2$ is a negative value and $r_5$ is also a negative value, the first lens $L_1$ is a lens where the object side face of this first lens $L_1$ is a concave surface facing the object side, and the third lens $L_3$ is a lens where the image side face of this third lens $L_3$ is a convex surface facing the image side. The junction type compound lens 14 has a positive refractive power.

In Embodiment 6, the optical length L with respect to the focal distance f=1.00 mm is sufficiently short, 1.656 mm, and the back focus bf is sufficiently long, 1.028 mm.

Figure 23:
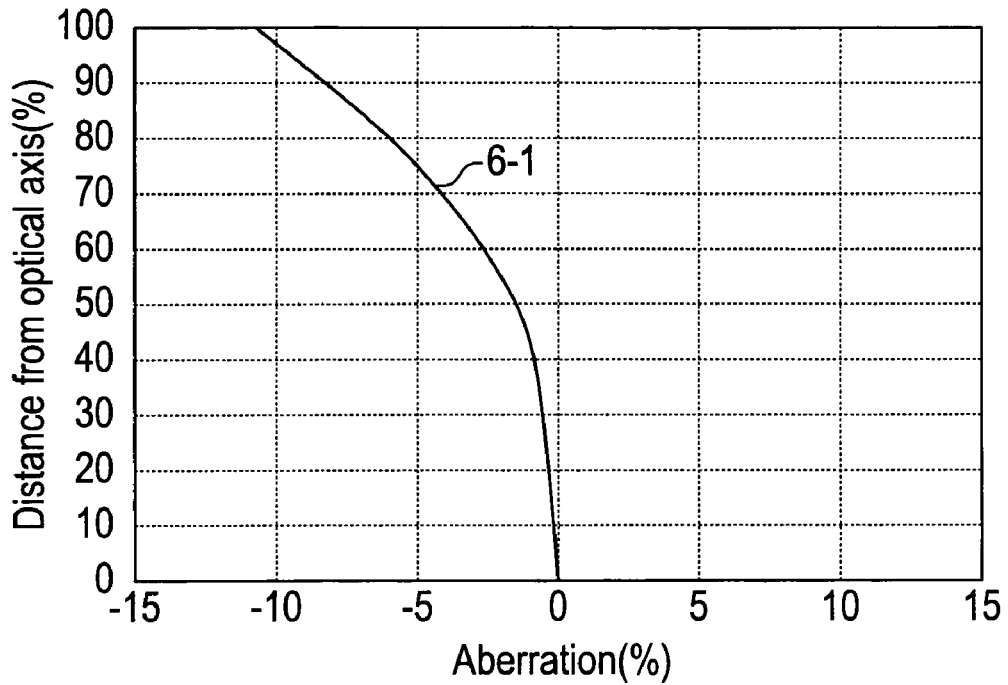
FIG. 23 is a diagram depicting the distortion aberration of the imaging lens of Embodiment 6.
Figure 24:
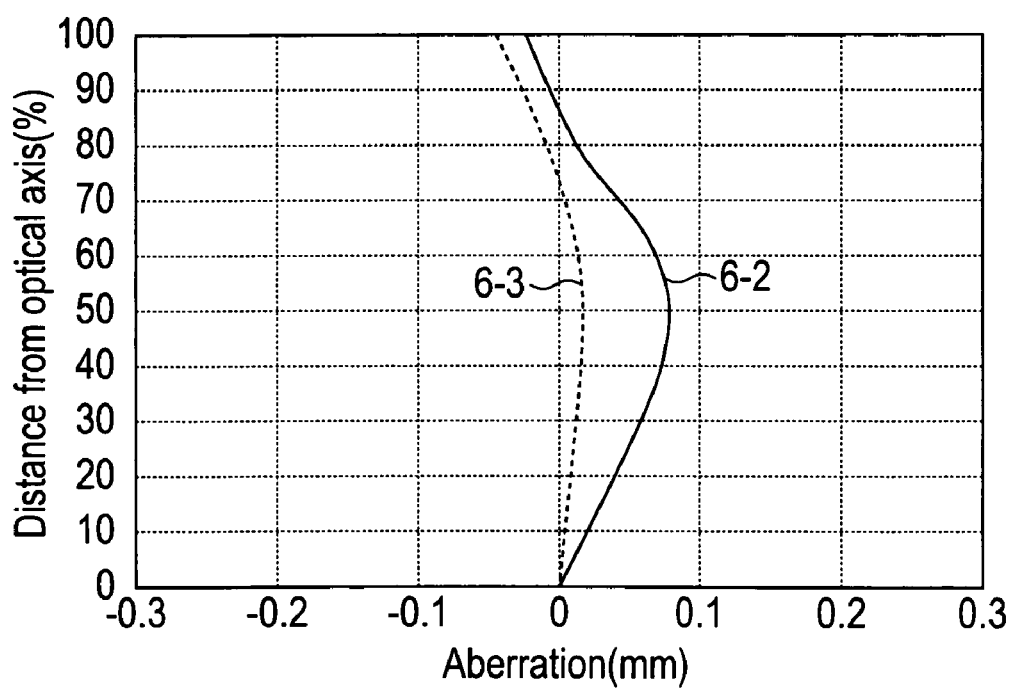
FIG. 24 is a diagram depicting the astigmatism aberration of the imaging lens of Embodiment 6.
Figure 25:
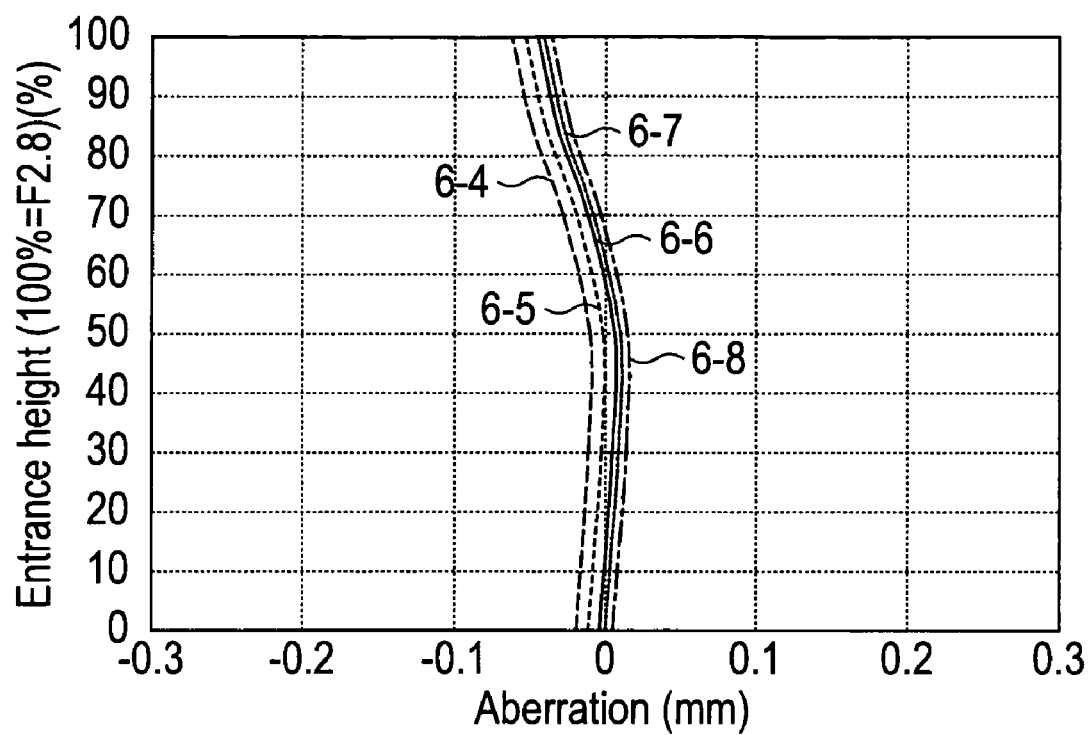
FIG. 25 is a diagram depicting the chromatic/spherical aberration of the imaging lens of Embodiment 6.

FIG. 23 shows a graph of the distortion aberration curve 6-1, FIG. 24 shows a graph of the astigmatism aberration curve (aberration curve 6-2 on the meridional surface and aberration curve 6-3 on the sagittal surface), and FIG. 25 shows a graph of a chromatic/spherical aberration curve (aberration curve 6-4 on g-line, aberration curve 6-5 on F-line, aberration curve 6-6 on e-line, aberration curve 6-7 on d-line and aberration curve 6-8 on C-line).

The ordinates of the aberration curves in FIG. 23 and FIG. 24 show the image height by a % of the distance from the optical axis. In FIG. 23 and FIG. 24, 100% corresponds to 0.634 mm. The ordinate of the aberration curve in FIG. 25 shows the entrance height h (F number), and the maximum thereof corresponds to 2.8. The abscissa of FIG. 23 shows the aberration (%), and the abscissas of FIG. 24 and FIG. 25 show the value of the aberration.

For the distortion aberration, the absolute value of the aberration is 10.7%, which is the maximum, at the position of image height 100% (image height 0.634 mm), and the absolute value of the aberration is within 10.7% in a range where the image height is 0.634 mm or less.

For the astigmatism aberration, the absolute value of the aberration on the meridional surface is 0.076 mm, which is the maximum, at the position of the image height 50% (image height 0.317 mm), and the absolute value of the aberration is within 0.076 mm in a range where the image height is 0.634 mm or less.

For the chromatic/spherical aberration, the absolute value of the aberration curve 6-4 on the g-line is 0.0623 mm, which is the maximum, at 100% of the entrance height h, and the absolute value of the aberration is within 0.0623 mm.

Therefore according to the imaging lens of Embodiment 6, good images are acquired.

Embodiment 7

In the lens system of Embodiment 7, the first lens $L_1$ and the third lens $L_3$ are formed of transparent high hardness silicon resin SMX-7852 (made by Fuji Polymer Industries Co., Ltd.), and the second lens $L_2$ is formed of optical glass BK 7 (made by Ohara Inc.).

(A) The refractive index $N_2$ of the first lens $L_1$ is $N_2=1.51000$.
(B) The refractive index $N_3$ of the second lens $L_2$ is $N_3=1.51680$.
(C) The refractive index $N_4$ of the third lens $L_3$ is $N_4=1.51000$.
(D) The Abbe number $v_2$ of the first lens $L_1$ is $v_2=56.0$.
(E) The Abbe number $v_3$ of the second lens $L_2$ is $v_3=64.0$.
(F) The Abbe number $v_4$ of the third lens $L_3$ is $v_4=56.0$.

Therefore $|N_3-N_2|=|N_3-N_4|=0.00680$, which satisfies the following Conditions (1) and (2). Also $|v_3-v_2|=|v_3-v_4|=8.0$, which satisfies the following Conditions (3) and (4).

Figure 26:
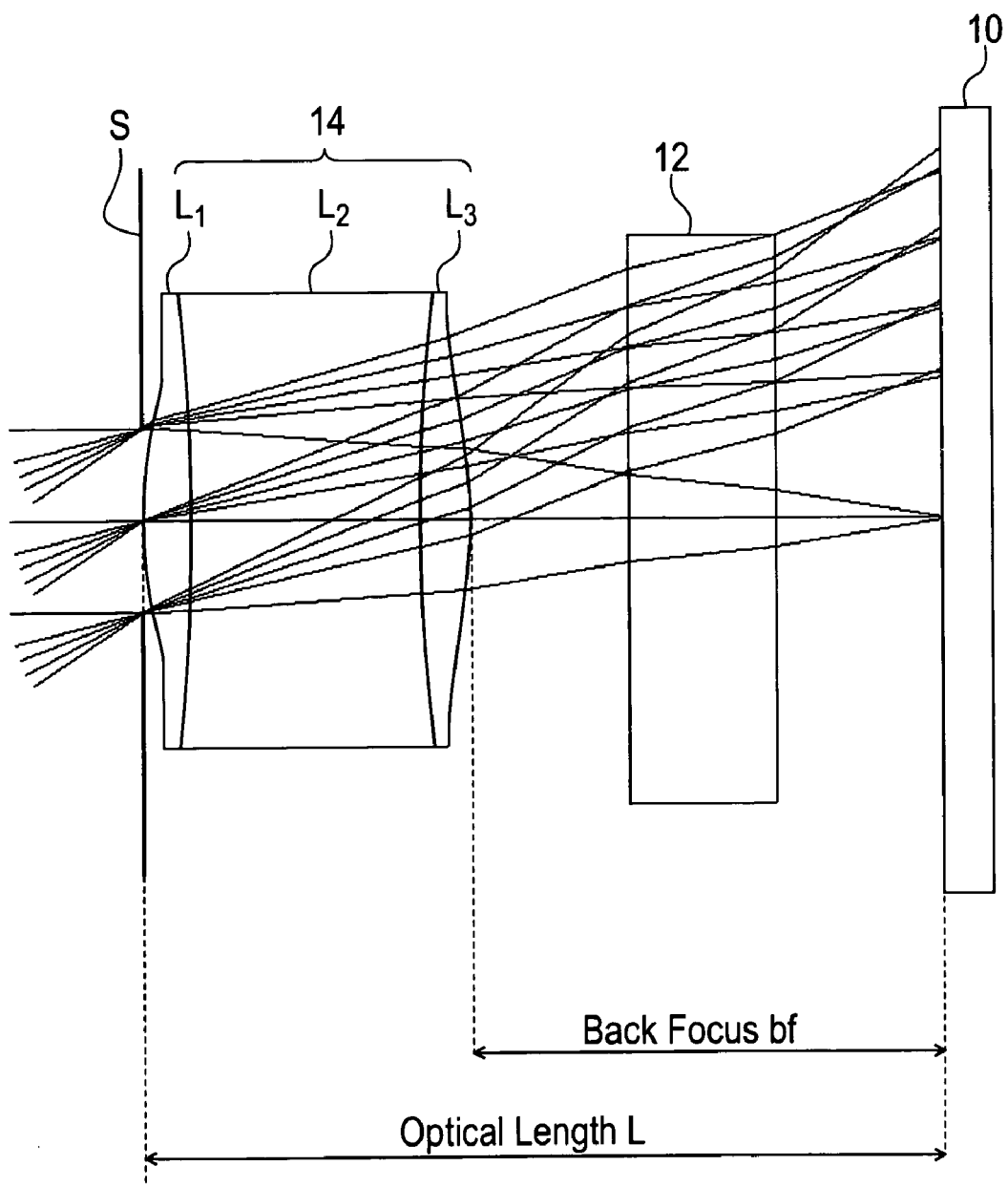
FIG. 26 is a cross-sectional view depicting an imaging lens according to Embodiment 7.

FIG. 26 shows a cross-sectional view of the imaging lens of Embodiment 7. As FIG. 26 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 7. The F number Fno is 2.8.

As Table 7 shows, $r_3$ is a negative value and $r_4$ is a positive value, so the second lens $L_2$ is a bi-concave glass lens. Since $r_2$ is a positive value and $r_5$ is a negative value, the first lens $L_1$ is a lens where the object side face of this first lens $L_1$ is a convex surface facing the object side, and the third lens $L_3$ is a lens where the image side face of this third lens $L_3$ is a convex surface facing the image side. The junction type compound lens 14 has a positive refractive power.

In Embodiment 7, the optical length L with respect to the focal distance f=1.00 mm is sufficiently short, 1.510 mm, and the back focus bf is sufficiently long, 0.798 mm.

Figure 27:
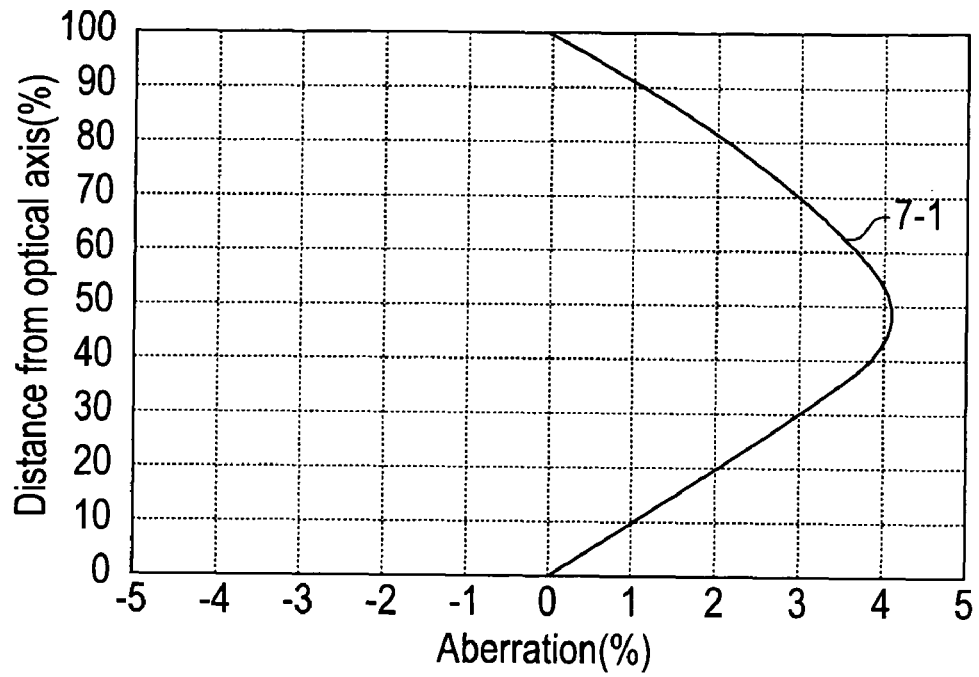
FIG. 27 is a diagram depicting the distortion aberration of the imaging lens of Embodiment 7.
Figure 28:
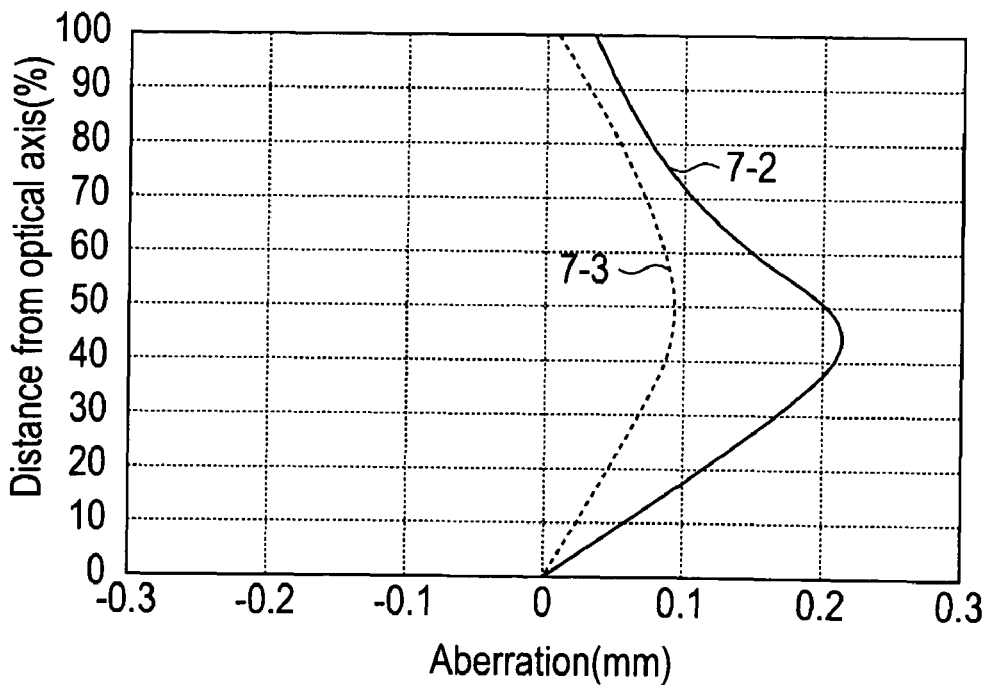
FIG. 28 is a diagram depicting the astigmatism aberration of the imaging lens of Embodiment 7.
Figure 29:
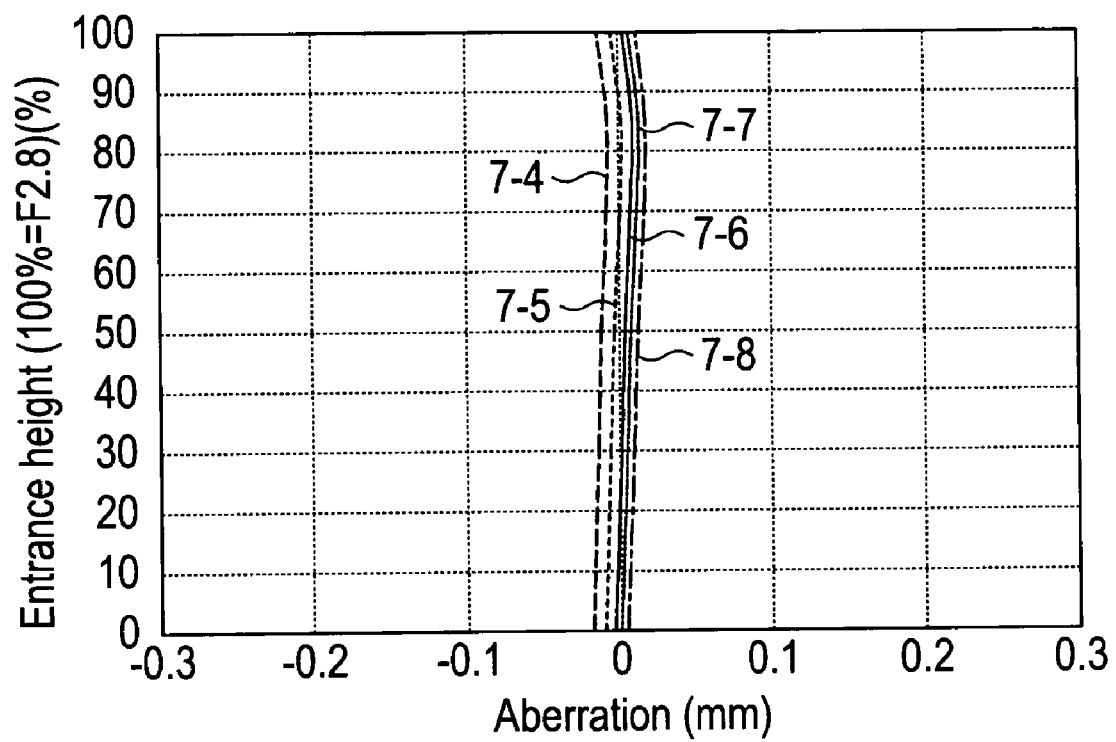
FIG. 29 is a diagram depicting the chromatic/spherical aberration of the imaging lens of Embodiment 7.

FIG. 27 shows a graph of the distortion aberration curve 7-1, FIG. 28 shows a graph of the astigmatism aberration curve (aberration curve 7-2 on the meridional surface and aberration curve 7-3 on the sagittal surface), and FIG. 29 shows a graph of a chromatic/spherical aberration curve (aberration curve 7-4 on g-line, aberration curve 7-5 on F-line, aberration curve 7-6 on e-line, aberration curve 7-7 on d-line and aberration curve 7-8 on C-line).

The ordinates of the aberration curves in FIG. 27 and FIG. 28 show the image height by a % of the distance from the optical axis. In FIG. 27 and FIG. 28, 100% corresponds to 0.676 mm. The ordinate of the aberration curve in FIG. 29 shows the entrance height h (F number), and the maximum thereof corresponds to 2.8. The abscissa of FIG. 27 shows the aberration (%), and the abscissas of FIG. 28 and FIG. 29 show the value of the aberration.

For the distortion aberration, the absolute value of the aberration is 4.1%, which is the maximum, at the position of image height 50% (image height 0.338 mm), and the absolute value of the aberration is within 4.1% in a range where the image height is 0.676 mm or less.

For the astigmatism aberration, the absolute value of the aberration on the meridional surface is 0.212 mm, which is the maximum, at the position of the image height 45% (image height 0.304 mm), and the absolute value of the aberration is within 0.212 mm in a range where the image height is 0.676 mm or less.

For the chromatic/spherical aberration, the absolute value of the aberration curve 7-8 on the C-line is 0.0185 mm, which is the maximum, at 85% of the entrance height h, and the absolute value of the aberration is within 0.0185 mm.

Therefore according to the imaging lens of Embodiment 7, good images are acquired.

Embodiment 8

In the lens system of Embodiment 8, the first lens $L_1$ and the third lens $L_3$ are formed of transparent high hardness silicon resin SMX-7852 (made by Fuji Polymer Industries Co., Ltd.), and the second lens $L_2$ is formed of optical glass BK 7 (made by Ohara Inc.).

(A) The refractive index $N_2$ of the first lens $L_1$ is $N_2=1.51000$.
(B) The refractive index $N_3$ of the second lens $L_2$ is $N_3=1.51680$.
(C) The refractive index $N_4$ of the third lens $L_3$ is $N_4=1.51000$.
(D) The Abbe number $v_2$ of the first lens $L_1$ is $v_2=56.0$.
(E) The Abbe number $v_3$ of the second lens $L_2$ is $v_3=64.0$.
(F) The Abbe number $v_4$ of the third lens $L_3$ is $v_4=56.0$.

Therefore $|N_3-N_2|=|N_3-N_4|=0.00680$, which satisfies the following Conditions (1) and (2). Also $|v_3-v_2|=|v_3-v_4|=8.0$, which satisfies the following Conditions (3) and (4).

Figure 30:
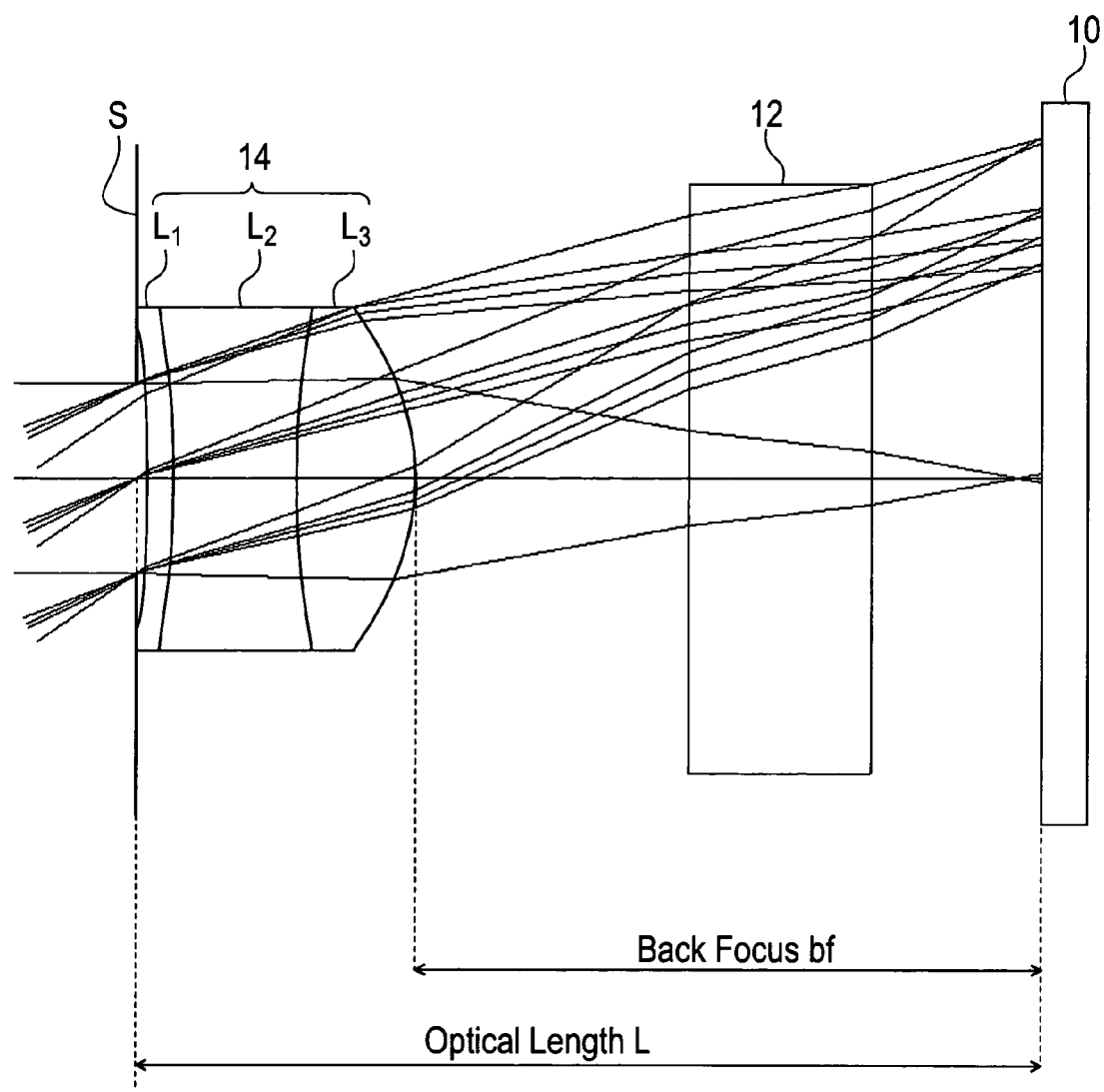
FIG. 30 is a cross-sectional view depicting an imaging lens according to Embodiment 8.

FIG. 30 shows a cross-sectional view of the imaging lens of Embodiment 8. As FIG. 30 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 8. The F number Fno is 2.8.

As Table 8 shows, $r_3$ is a negative value and $r_4$ is a positive value, so the second lens $L_2$ is a biconcave glass lens. Since $r_2$ is a negative value and $r_5$ is also a negative value, the first lens $L_1$ is a lens where the object side face of this first lens $L_1$ is a concave surface facing the object side, and the third lens $L_3$ is a lens where the image side face of this third lens $L_3$ is a convex surface facing the image side. The junction type compound lens 14 has a positive refractive power.

In Embodiment 8, the optical length L with respect to the focal distance f=1.00 mm is sufficiently short, 1.650 mm, and the back focus bf is sufficiently long, 1.030 mm.

Figure 31:
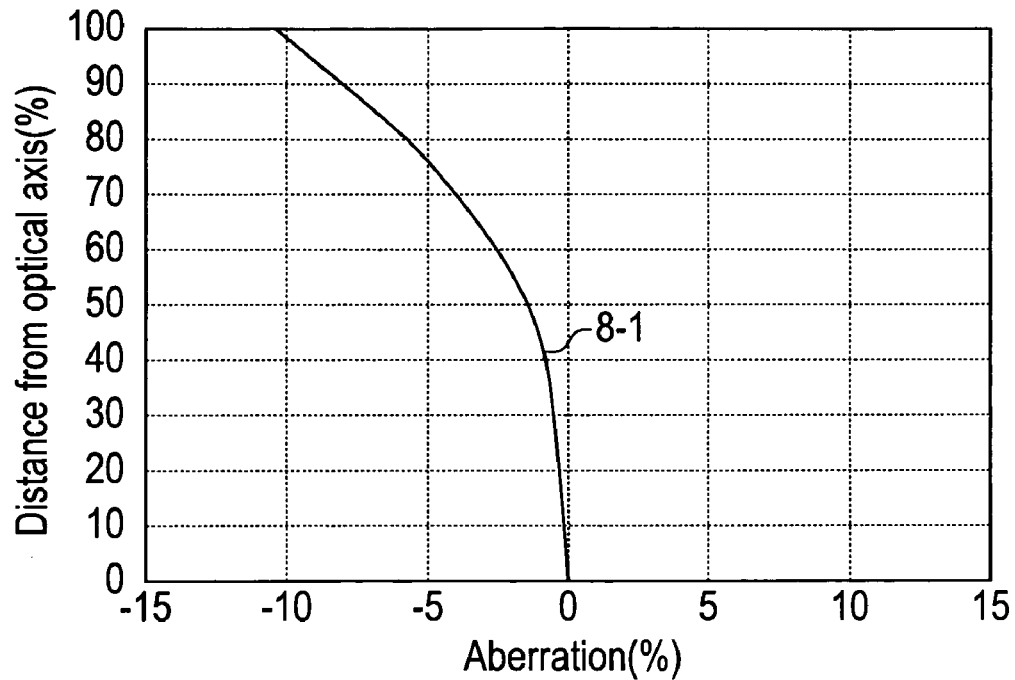
FIG. 31 is a diagram depicting the distortion aberration of the imaging lens of Embodiment 8.
Figure 32:
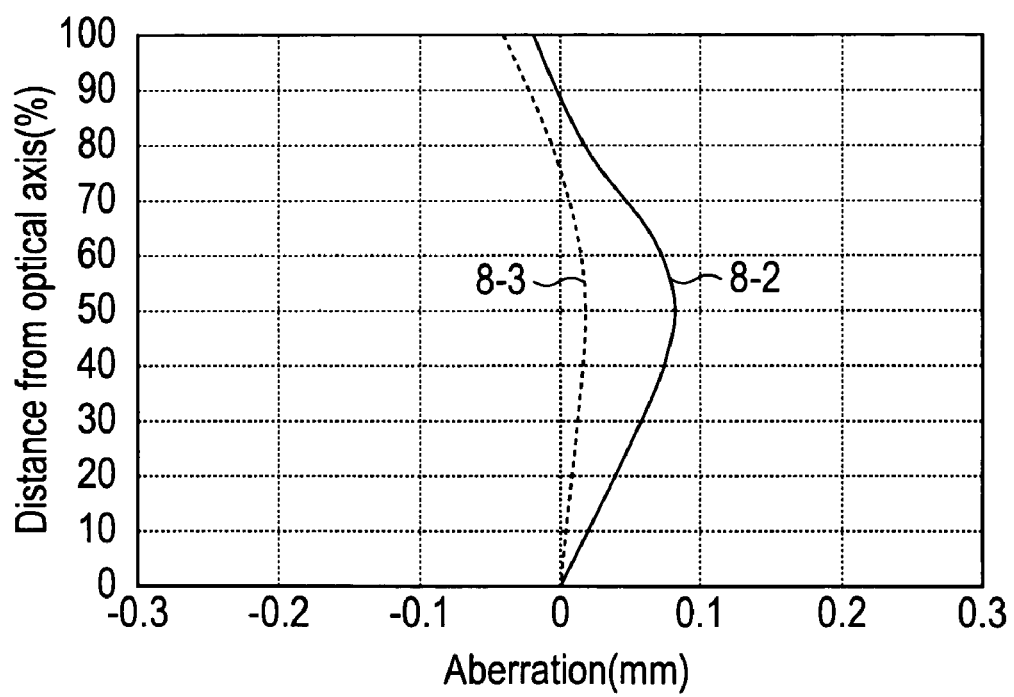
FIG. 32 is a diagram depicting the astigmatism aberration of the imaging lens of Embodiment 8.
Figure 33:
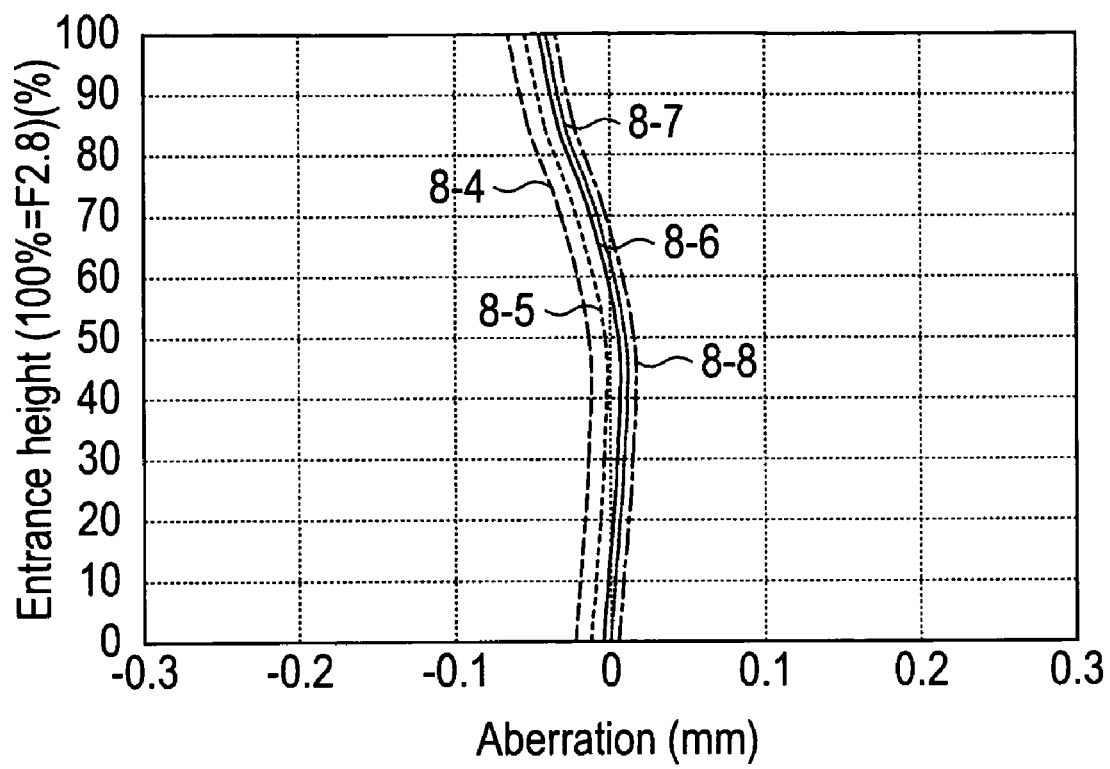
FIG. 33 is a diagram depicting the chromatic/spherical aberration of the imaging lens of Embodiment 8.

FIG. 31 shows a graph of the distortion aberration curve 8-1, FIG. 32 shows a graph of the astigmatism aberration curve (aberration curve 8-2 on the meridional surface and aberration curve 8-3 on the sagittal surface), and FIG. 33 shows a graph of a chromatic/spherical aberration curve (aberration curve 8-4 on g-line, aberration curve 8-5 on F-line, aberration curve 8-6 on e-line, aberration curve 8-7 on d-line and aberration curve 8-8 on C-line).

The ordinates of the aberration curves in FIG. 31 and FIG. 32 show the image height by a % of the distance from the optical axis. In FIG. 31 and FIG. 32, 100% corresponds to 0.627 mm. The ordinate of the aberration curve in FIG. 33 shows the entrance height h (F number), and the maximum thereof corresponds to 2.8. The abscissa of FIG. 31 shows the aberration (%), and the abscissas of FIG. 32 and FIG. 33 show the value of the aberration.

For the distortion aberration, the absolute value of the aberration is 10.4%, which is the maximum, at the position of image height 100% (image height 0.627 mm), and the absolute value of the aberration is within 10.4% in a range where the image height is 0.627 mm or less.

For the astigmatism aberration, the absolute value of the aberration on the meridional surface is 0.082 mm, which is the maximum, at the position of the image height 50% (image height 0.314 mm), and the absolute value of the aberration is within 0.082 mm in a range where the image height is 0.627 mm or less.

For the chromatic/spherical aberration, the absolute value of the aberration curve 8-4 on the g-line is 0.0661 mm, which is the maximum, at 100% of the entrance height h, and the absolute value of the aberration is within 0.0661 mm.

Therefore according to the imaging lens of Embodiment 8, good images are acquired.

Embodiment 9

In the lens system of Embodiment 9, the first lens $L_1$ and the third lens $L_3$ are formed of a transparent high hardness silicon resin SR-7010 (made by Dow Corning Torey Co., Ltd.), and the second lens $L_2$ is formed of optical glass BK 7 (made by Ohara Inc.).
(A) The refractive index $N_2$ of the first lens $L_1$ is $N_2$=1.53000.
(B) The refractive index $N_3$ of the second lens $L_2$ is $N_3$=1.51680.
(C) The refractive index $N_4$ of the third lens $L_3$ is $N_4$=1.53000.
(D) The Abbe number $v_2$ of the first lens $L_1$ is $v_2$=35.0.
(E) The Abbe number $v_3$ of the second lens $L_2$ is $v_3$=64.0.
(F) The Abbe number $v_4$ of the third lens $L_3$ is $v_4$=35.0.

Therefore $|N_3-N_2|=|N_3-N_4|=0.0312$, which satisfies the following Conditions (1) and (2). Also $|v_3-v_2|=|v_3-v_4|=29.0$, which satisfies the following Conditions (3) and (4).

Figure 34:
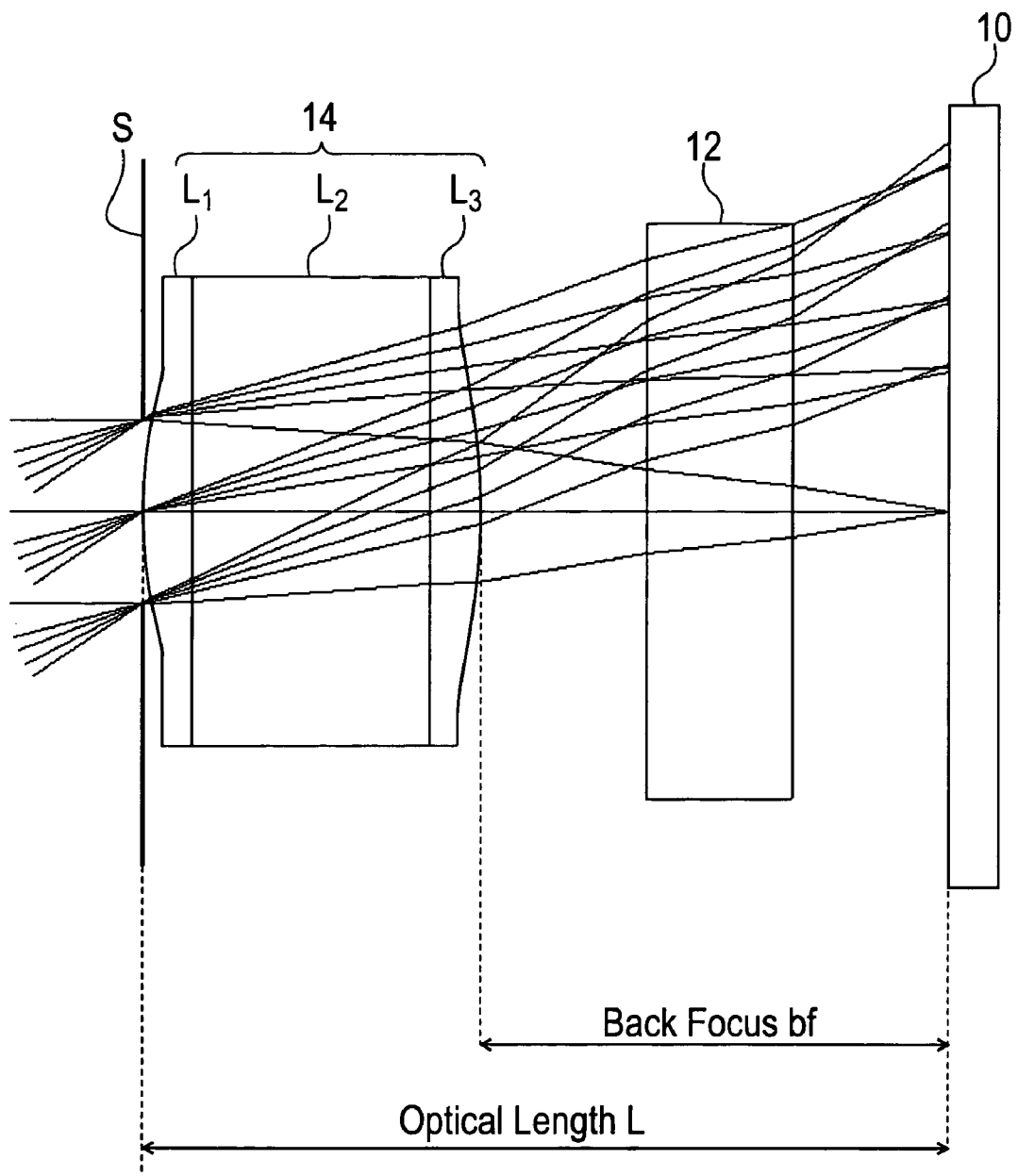
FIG. 34 is a cross-sectional view depicting an imaging lens according to Embodiment 9.

FIG. 34 shows a cross-sectional view of the imaging lens of Embodiment 9. As FIG. 34 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 9. The F number Fno is 2.8.

As Table 9 shows, $r_3=\infty$ and $r_4=\infty$, so the second lens $L_2$ is an optical parallel plate. Since $r_2$ is a positive value and $r_5$ is a negative value, the first lens $L_1$ is a plano-convex lens where the object side face of this first lens $L_1$ is a convex surface facing the object side, and the third lens $L_3$ is a plano-convex lens where the image side face of this third lens $L_3$ is a convex surface facing the image side. The junction type compound lens 14 has a positive refractive power.

In Embodiment 9, the optical length L with respect to the focal distance f=1.00 mm is sufficiently short, 1.526 mm, and the back focus bf is sufficiently long, 0.790 mm.

Figure 35:
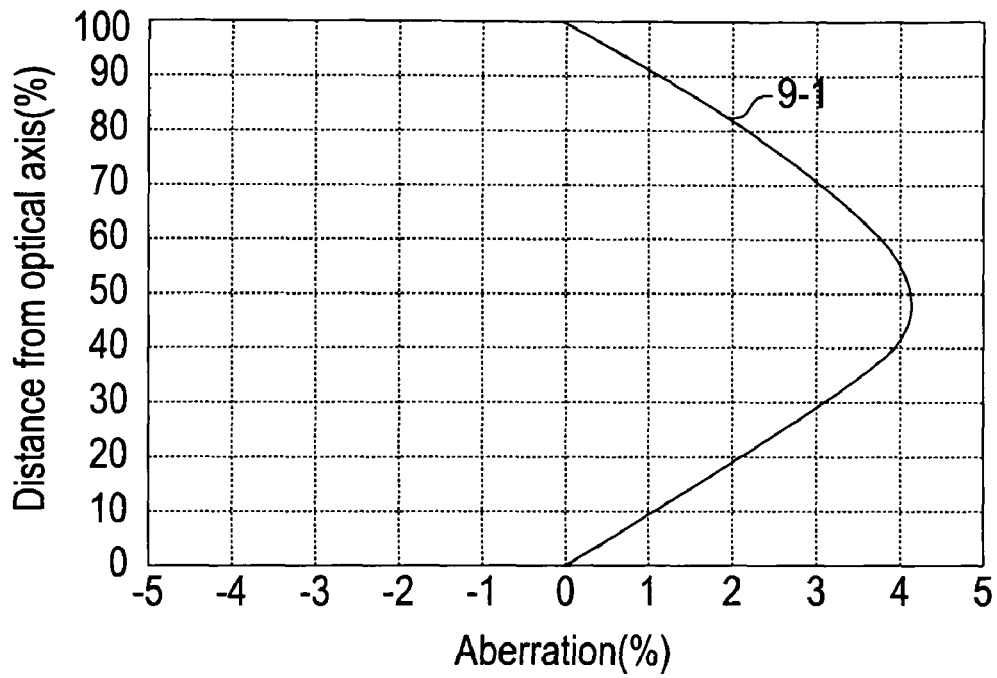
FIG. 35 is a diagram depicting the distortion aberration of the imaging lens of Embodiment 9.
Figure 36:
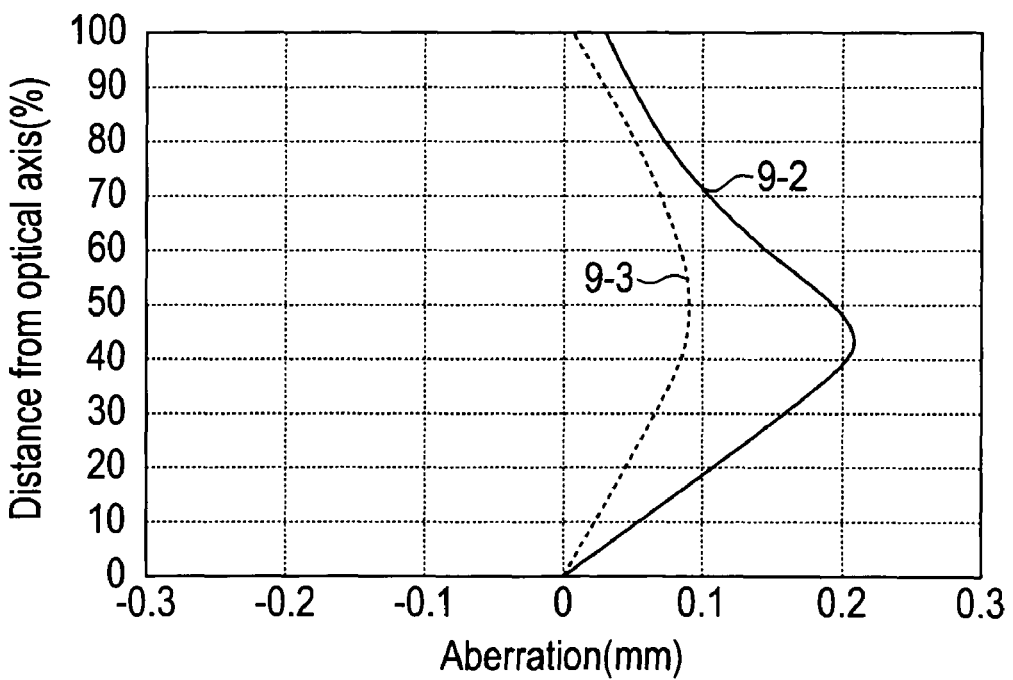
FIG. 36 is a diagram depicting the astigmatism aberration of the imaging lens of Embodiment 9.
Figure 37:
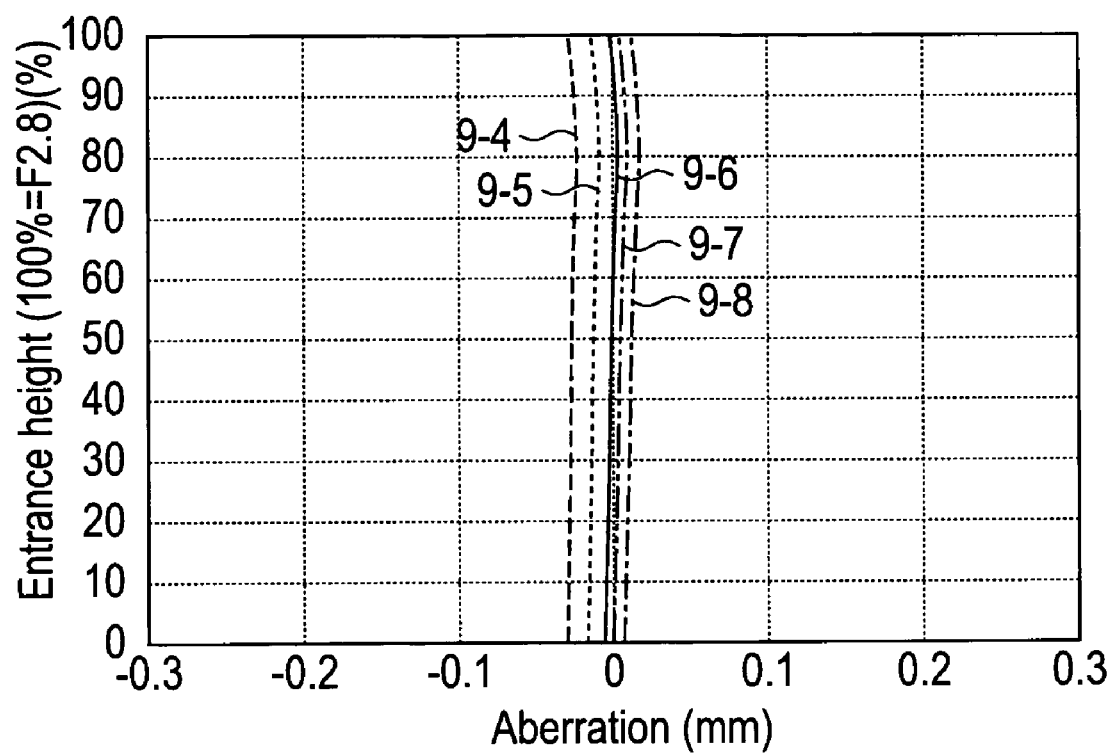
FIG. 37 is a diagram depicting the chromatic/spherical aberration of the imaging lens of Embodiment 9.

FIG. 35 shows a graph of the distortion aberration curve 9-1, FIG. 36 shows a graph of the astigmatism aberration curve (aberration curve 9-2 on the meridional surface and aberration curve 9-3 on the sagittal surface), and FIG. 37 shows a graph of a chromatic/spherical aberration curve (aberration curve 9-4 on g-line, aberration curve 9-5 on F-line, aberration curve 9-6 on e-line, aberration curve 9-7 on d-line and aberration curve 9-8 on C-line).

The ordinates of the aberration curves in FIG. 35 and FIG. 36 show the image height by a % of the distance from the optical axis. In FIG. 35 and FIG. 36, 100% corresponds to 0.676 mm. The ordinate of the aberration curve in FIG. 37 shows the entrance height h (F number), and the maximum thereof corresponds to 2.8. The abscissa of FIG. 35 shows the aberration (%), and the abscissas of FIG. 36 and FIG. 37 show the value of the aberration.

For the distortion aberration, the absolute value of the aberration is 4.1%, which is the maximum, at the position of image height 50% (image height 0.338 mm), and the absolute value of the aberration is within 4.1% in a range where the image height is 0.676 mm or less.

For the astigmatism aberration, the absolute value of the aberration on the meridional surface is 0.206 mm, which is the maximum, at the position of the image height 45% (image height 0.304 mm), and the absolute value of the aberration is within 0.206 mm in a range where the image height is 0.676 mm or less.

For the chromatic/spherical aberration, the absolute value of the aberration curve 9-4 on the g-line is 0.0299 mm, which is the maximum, at 0% of the entrance height h (lens center), and the absolute value of the aberration is within 0.0299 mm.

Therefore according to the imaging lens of Embodiment 9, good images are acquired.

Embodiment 10

In the lens system of Embodiment 10, the first lens $L_1$ and the third lens $L_3$ are formed of a transparent high hardness silicon resin SR-7010 (Dow Corning Torey Co., Ltd.), and the second lens $L_2$ is formed of optical glass BK 7 (made by Ohara Inc.).
(A) The refractive index $N_2$ of the first lens $L_1$ is $N_2$=1.53000.
(B) The refractive index $N_3$ of the second lens $L_2$ is $N_3$=1.51680.
(C) The refractive index $N_4$ of the third lens $L_3$ is $N_4$=1.53000.
(D) The Abbe number $v_2$ of the first lens $L_1$ is $v_2$=35.0.
(E) The Abbe number $v_3$ of the second lens $L_2$ is $v_3$=64.0.
(F) The Abbe number $v_4$ of the third lens $L_3$ is $v_4$=35.0.

Therefore $|N_3-N_2|=|N_3-N_4|=0.0132$, which satisfies the following Conditions (1) and (2). Also $|v_3-v_2|=|v_3-v_4|=29.0$, which satisfies the following Conditions (3) and (4).

Figure 38:
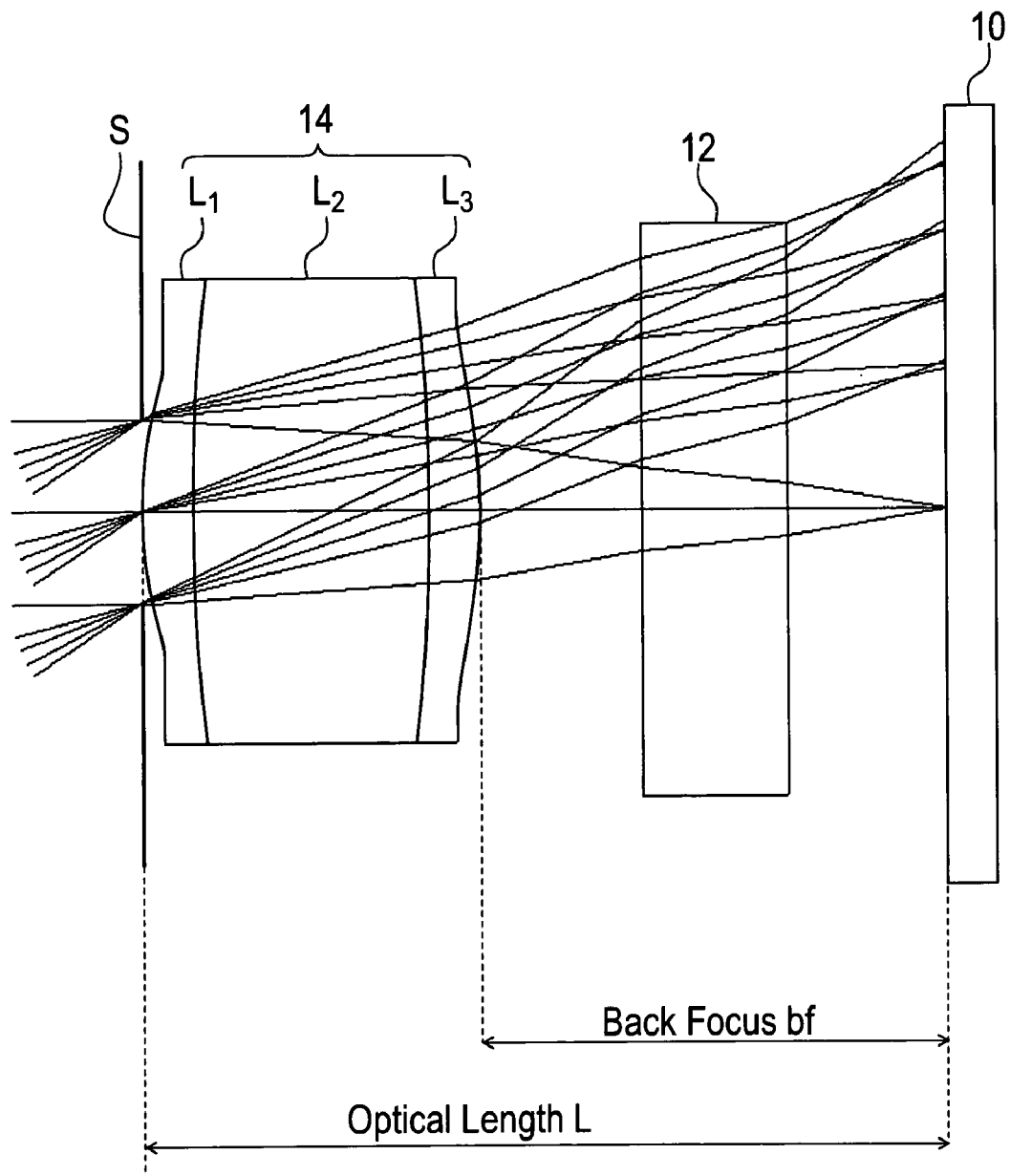
FIG. 38 is a cross-sectional view depicting an imaging lens according to Embodiment 10.

FIG. 38 shows a cross-sectional view of the imaging lens of Embodiment 10. As FIG. 38 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 10. The F number Fno is 2.8.

As Table 10 shows, $r_3$ is a positive value and $r_4$ is a negative value, so the second lens $L_2$ is a biconvex glass lens. Since $r_2$ is a positive value and $r_5$ is a negative value, the first lens $L_1$ is a lens where the object side face of this first lens $L_1$ is a convex surface facing the object side, and the third lens $L_3$ is a lens where the image side face of this third lens $L_3$ is a convex surface facing the image side. The junction type compound lens 14 has a positive refractive power.

In Embodiment 10, the optical length L with respect to the focal distance f=1.00 mm is sufficiently short, 1.524 mm, and the back focus bf is sufficiently long, 0.791 mm.

Figure 39:
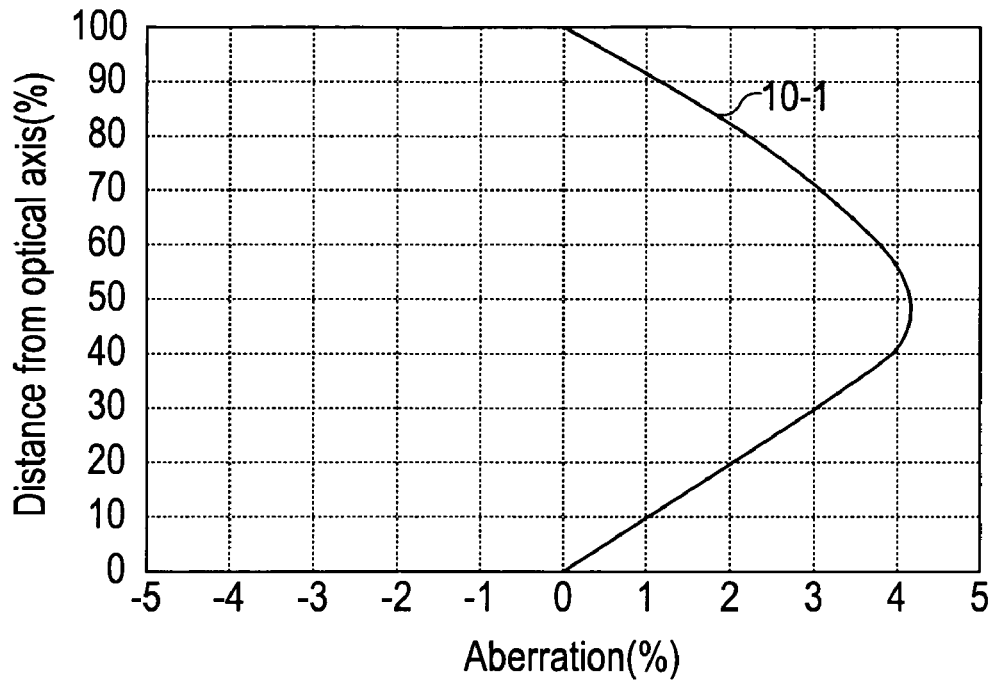
FIG. 39 is a diagram depicting the distortion aberration of the imaging lens of Embodiment 10.
Figure 40:
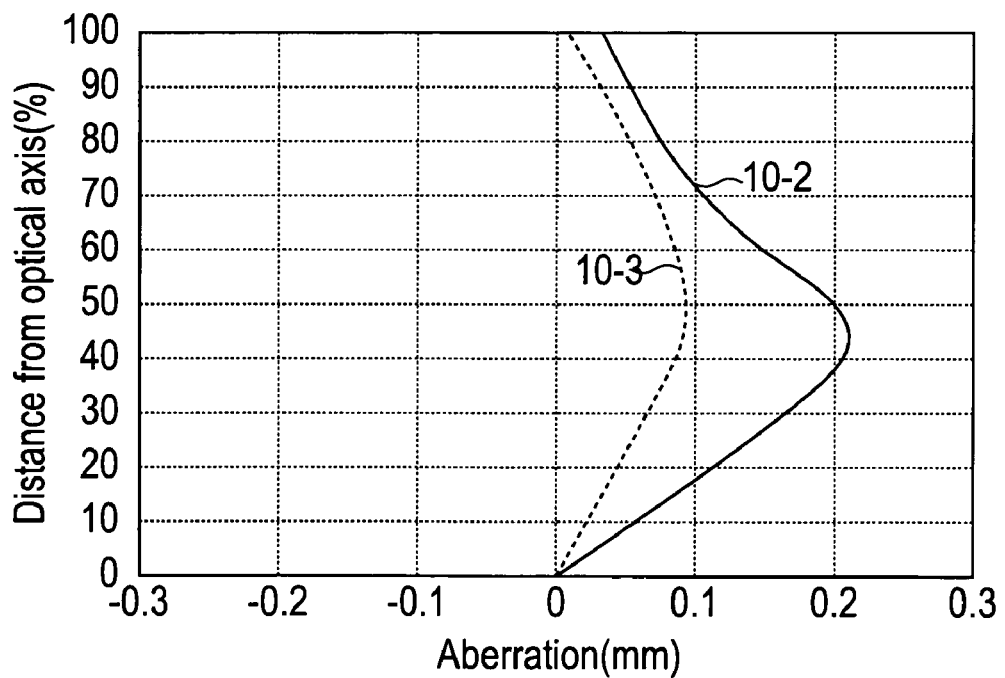
FIG. 40 is a diagram depicting the astigmatism aberration of the imaging lens of Embodiment 10.
Figure 41:
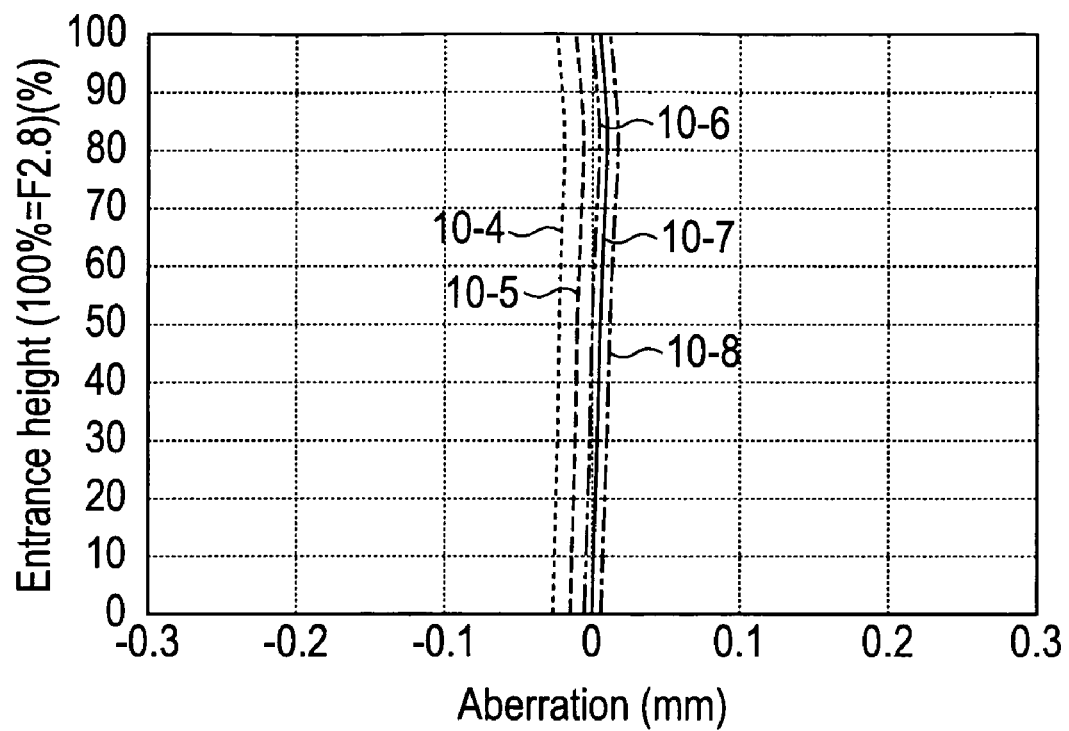
FIG. 41 is a diagram depicting the chromatic/spherical aberration of the imaging lens of Embodiment 10.

FIG. 39 shows a graph of the distortion aberration curve 10-1, FIG. 40 shows a graph of the astigmatism aberration curve (aberration curve 10-2 on the meridional surface and aberration curve 10-3 on the sagittal surface), and FIG. 41 shows a graph of a chromatic/spherical aberration curve (aberration curve 10-4 on g-line, aberration curve 10-5 on F-line, aberration curve 10-6 on e-line, aberration curve 10-7 on d-line and aberration curve 10-8 on C-line).

The ordinates of the aberration curves in FIG. 39 and FIG. 40 show the image height by a % of the distance from the optical axis. In FIG. 39 and FIG. 40, 100% corresponds to 0.676 mm. The ordinate of the aberration curve in FIG. 41 shows the entrance height h (F number), and the maximum thereof corresponds to 2.8. The abscissa of FIG. 39 shows the aberration (%), and the abscissas of FIG. 40 and FIG. 41 show the value of the aberration.

For the distortion aberration, the absolute value of the aberration is 4.1%, which is the maximum, at the position of image height 50% (image height 0.338 mm), and the absolute value of the aberration is within 4.1% in a range where the image height is 0.676 mm or less.

For the astigmatism aberration, the absolute value of the aberration on the meridional surface is 0.212 mm, which is the maximum, at the position of the image height 45% (image height 0.304 mm), and the absolute value of the aberration is within 0.212 mm in a range where the image height is 0.676 mm or less.

For the chromatic/spherical aberration, the absolute value of the aberration curve 10-4 on the g-line is 0.0265 mm, which is the maximum, at 0% of the entrance height h (lens center), and the absolute value of the aberration is within 0.0265 mm.

Therefore according to the imaging lens of Embodiment 10, good images are acquired.

Embodiment 11

In the lens system of Embodiment 11, the first lens $L_1$ and the third lens $L_3$ are formed of a transparent high hardness silicon resin SR-7010 (Dow Corning Torey Co., Ltd.), and the second lens $L_2$ is formed of optical glass BK 7 (made by Ohara Inc.).
(A) The refractive index $N_2$ of the first lens $L_1$ is $N_2$=1.53000.
(B) The refractive index $N_3$ of the second lens $L_2$ is $N_3$=1.51680.
(C) The refractive index $N_4$ of the third lens $L_3$ is $N_4$=1.53000.
(D) The Abbe number $v_2$ of the first lens $L_1$ is $v_2$=35.0.
(E) The Abbe number $v_3$ of the second lens $L_2$ is $v_3$=64.0.
(F) The Abbe number $v_4$ of the third lens $L_3$ is $v_4$=35.0.

Therefore $|N_3-N_2|=|N_3-N_4|=0.0132$, which satisfies the following Conditions (1) and (2). Also $|v_3-v_2|=|v_3-v_4|=29.0$, which satisfies the following Conditions (3) and (4).

Figure 42:
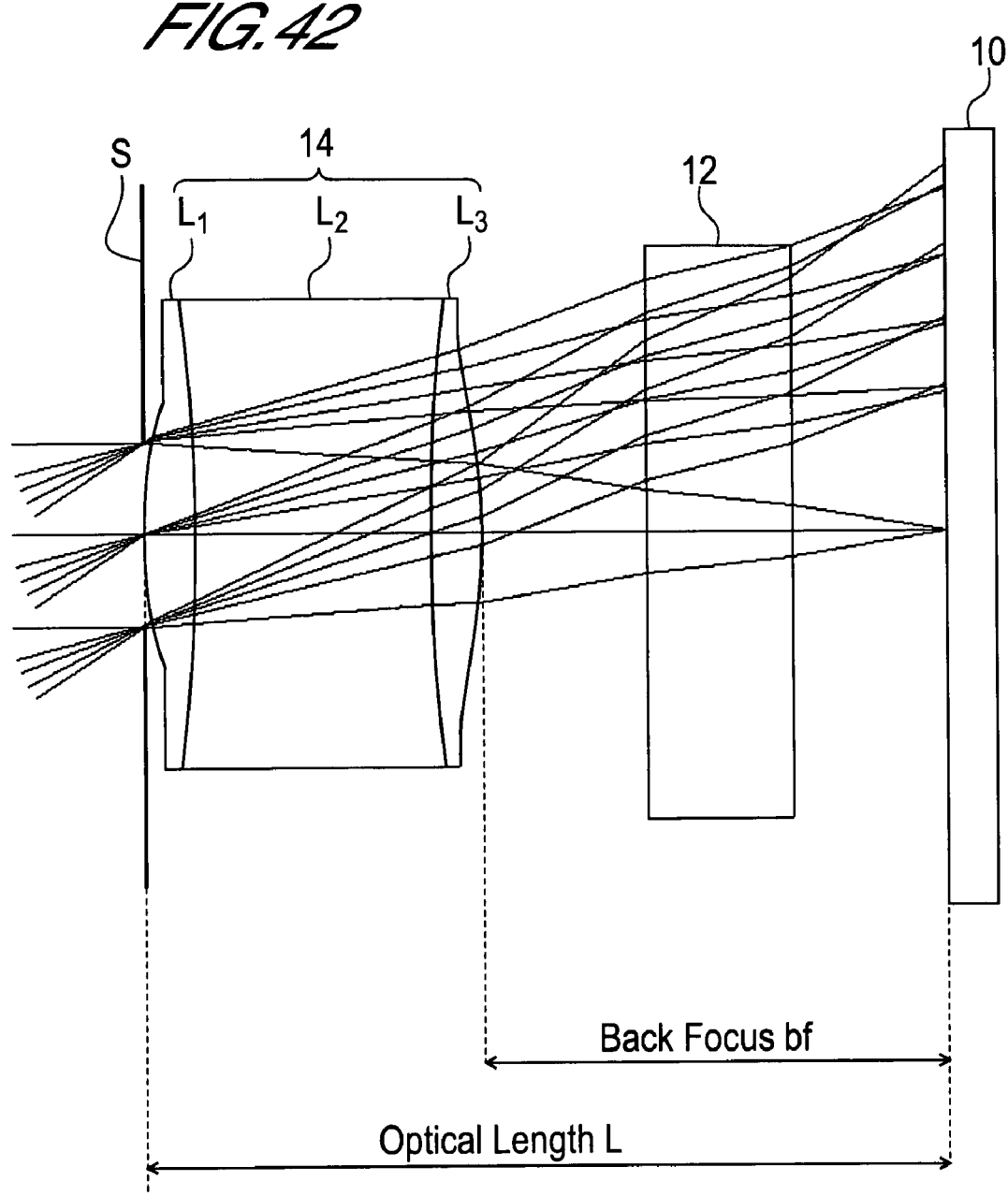
FIG. 42 is a cross-sectional view depicting an imaging lens according to Embodiment 11.

FIG. 42 shows a cross-sectional view of the imaging lens of Embodiment 11. As FIG. 42 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 11. The F number Fno is 2.8.

As Table 11 shows, $r_3$ is a negative value and $r_4$ is a positive value, so the second lens $L_2$ is a biconcave glass lens. Since $r_2$ is a positive value and $r_5$ is a negative value, the first lens $L_1$ is a lens where the object side face of this first lens $L_1$ is a convex surface facing the object side, and the third lens $L_3$ is a lens where the image side face of this third lens $L_3$ is a convex surface facing the image side. The junction type compound lens 14 has a positive refractive power.

In Embodiment 11, the optical length L with respect to the focal distance f=1.00 mm is sufficiently short, 1.529 mm, and the back focus bf is sufficiently long, 0.789 mm.

Figure 43:
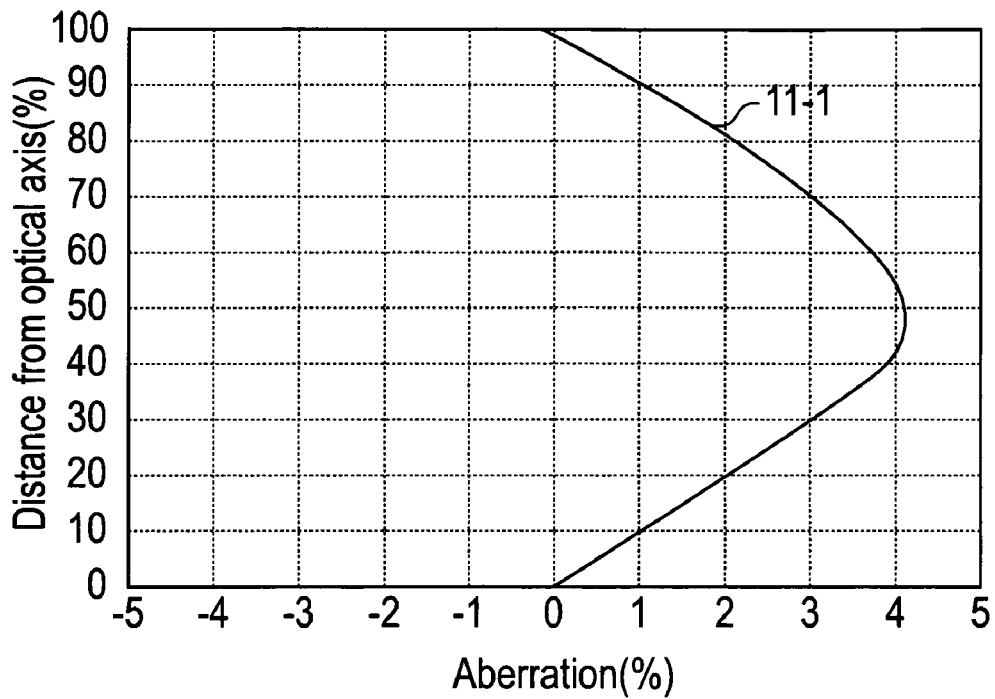
FIG. 43 is a diagram depicting the distortion aberration of the imaging lens of Embodiment 11.
Figure 44:
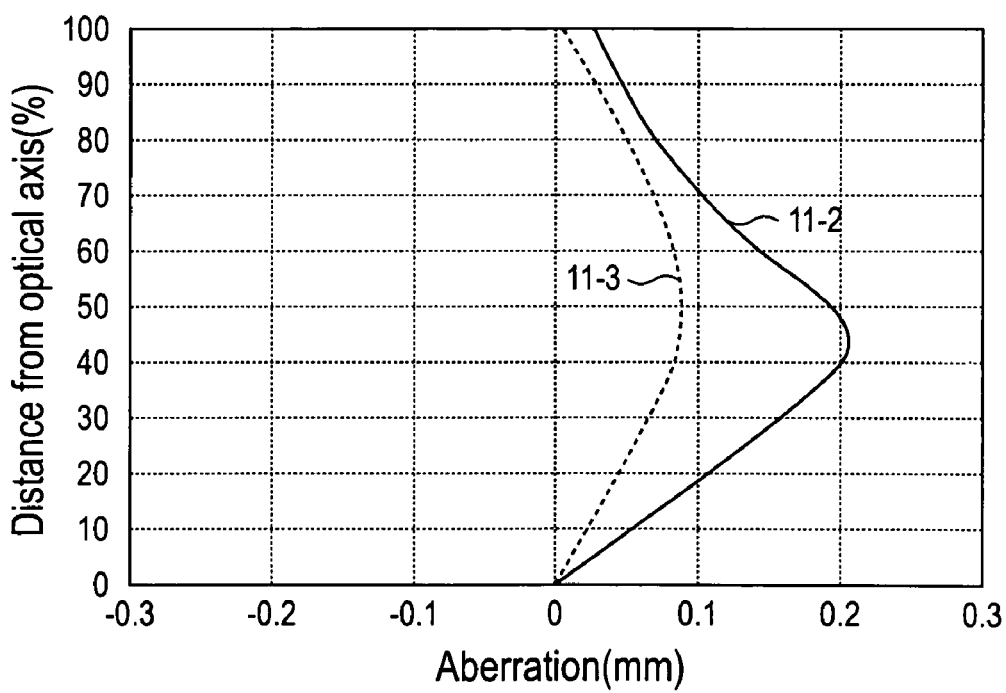
FIG. 44 is a diagram depicting the astigmatism aberration of the imaging lens of Embodiment 11.
Figure 45:
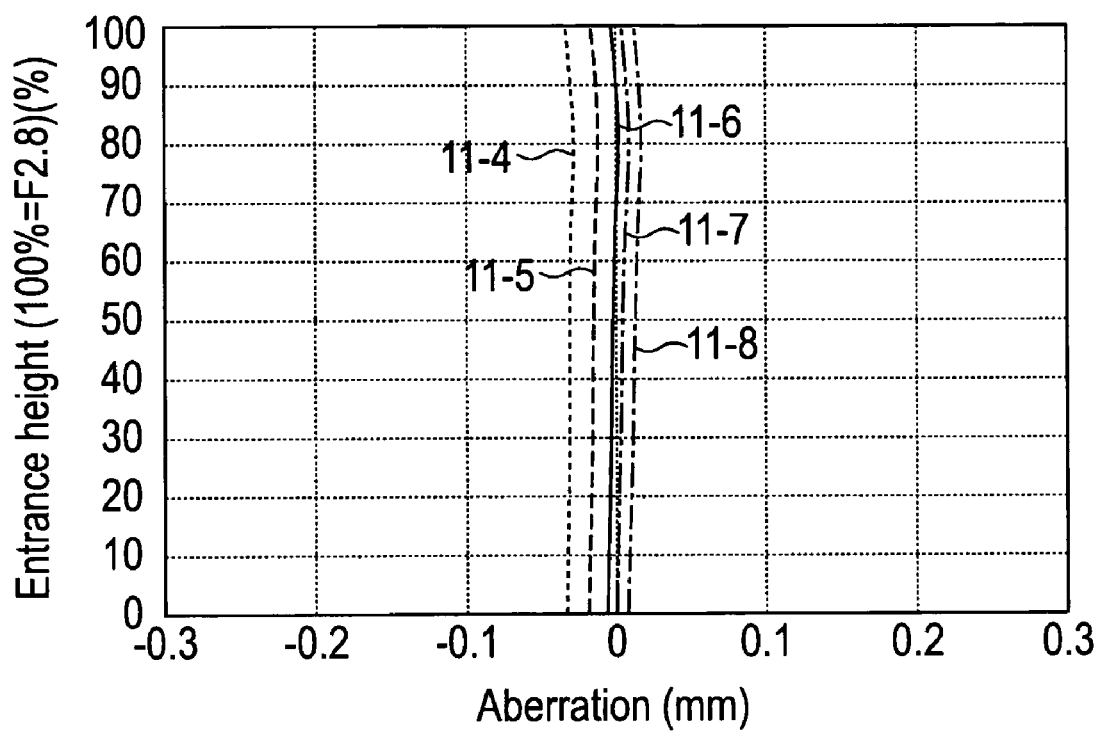
FIG. 45 is a diagram depicting the chromatic/spherical aberration of the imaging lens of Embodiment 11.

FIG. 43 shows a graph of the distortion aberration curve 11-1, FIG. 44 shows a graph of the astigmatism aberration curve (aberration curve 11-2 on the meridional surface and aberration curve 11-3 on the sagittal surface), and FIG. 45 shows a graph of a chromatic/spherical aberration curve (aberration curve 11-4 on g-line, aberration curve 11-5 on F-line, aberration curve 11-6 on e-line, aberration curve 11-7 on d-line and aberration curve 11-8 on C-line).

The ordinates of the aberration curves in FIG. 43 and FIG. 44 show the image height by a % of the distance from the optical axis. In FIG. 43 and FIG. 44, 100% corresponds to 0.676 mm. The ordinate of the aberration curve in FIG. 45 shows the entrance height h (F number), and the maximum thereof corresponds to 2.8. The abscissa of FIG. 43 shows the aberration (%), and the abscissas of FIG. 44 and FIG. 45 show the value of the aberration.

For the distortion aberration, the absolute value of the aberration is 4.1%, which is the maximum, at the position of image height 50% (image height 0.676 mm), and the absolute value of the aberration is within 4.1% in a range where the image height is 0.676 mm or less.

For the astigmatism aberration, the absolute value of the aberration on the meridional surface is 0.206 mm, which is the maximum, at the position of the image height 45% (image height 0.304 mm), and the absolute value of the aberration is within 0.206 mm in a range where the image height is 0.676 mm or less.

For the chromatic/spherical aberration, the absolute value of the aberration curve 11-4 on the g-line is 0.0336 mm, which is the maximum, at 100% of the entrance height h, and the absolute value of the aberration is within 0.0336 mm.

Therefore according to the imaging lens of Embodiment 11, good images are acquired.

Embodiment 12

In the lens system of Embodiment 12, the first lens $L_1$ and the third lens $L_3$ are formed of transparent high hardness silicon resin SMX-7852 (made by Fuji Polymer Industries Co., Ltd.), and the second lens $L_2$ is formed of low thermal expansion type transparent high hardness silicon resin Silplus® MDH (Nippon Steel Chemical Co., Ltd.).
(A) The refractive index $N_2$ of the first lens $L_1$ is $N_2$=1.51000.
(B) The refractive index $N_3$ of the second lens $L_2$ is $N_3$=1.51100.
(C) The refractive index $N_4$ of the third lens $L_3$ is $N_4$=1.51000.
(D) The Abbe number $v_2$ of the first lens $L_1$ is $v_2$=56.0.
(E) The Abbe number $v_3$ of the second lens $L_2$ is $v_3$=36.0.
(F) The Abbe number $v_4$ of the third lens $L_3$ is $v_4$=56.0.

Therefore $|N_3-N_2|=|N_3-N_4|=0.00100$, which satisfies the following Conditions (1) and (2). Also $|v_3-v_2|=|v_3-v_4|=20.0$, which satisfies the following Conditions (3) and (4).

Figure 46:
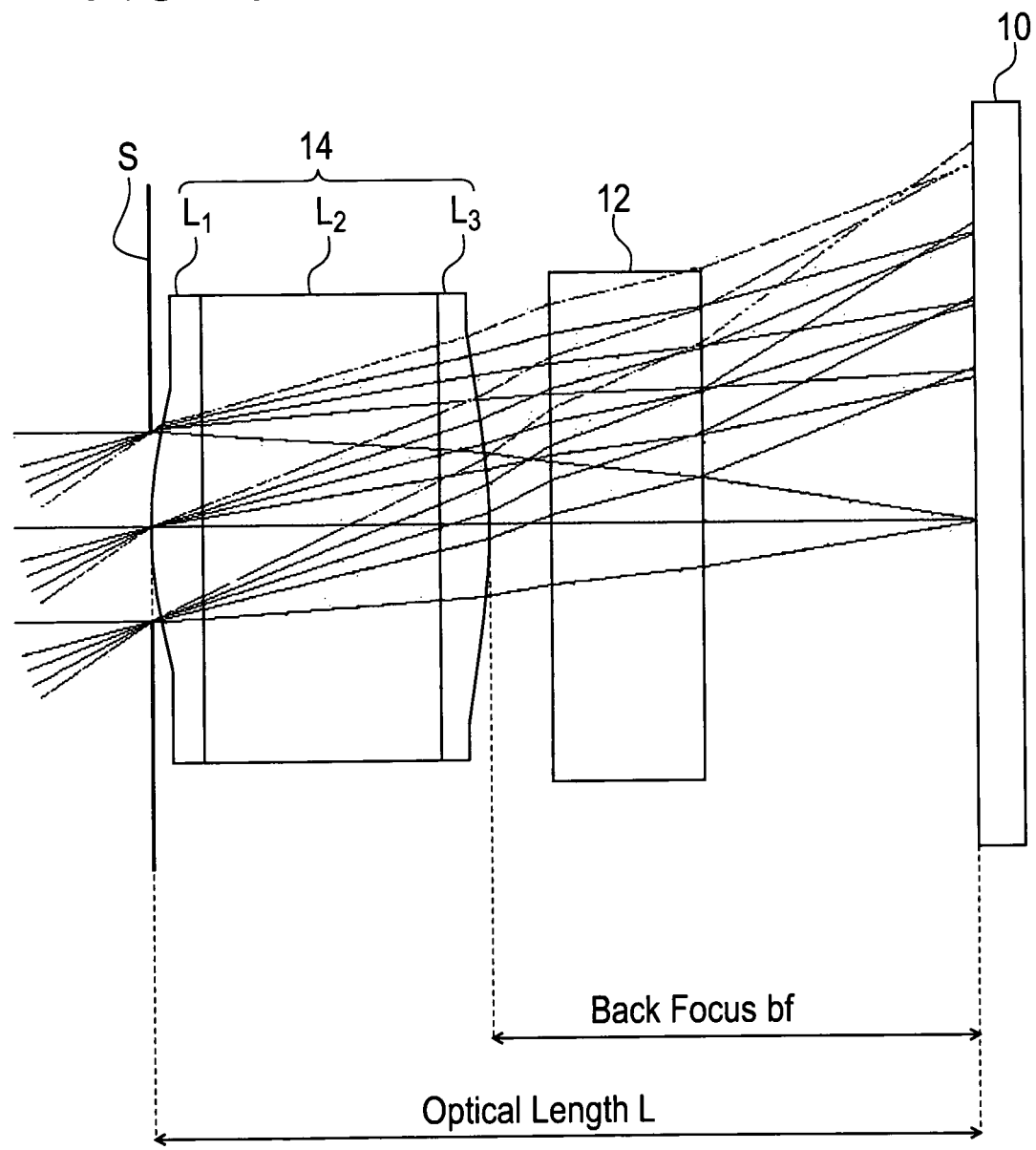
FIG. 46 is a cross-sectional view depicting an imaging lens according to Embodiment 12.

FIG. 46 shows a cross-sectional view of the imaging lens of Embodiment 12. As FIG. 46 shows, the aperture stop S is formed at a position of an intersection of the first surface (surface at the object side) of the first lens $L_1$ constituting the junction type compound lens 14 and the optical axis. The diaphragm surface is a plane, so $r_1=\infty$ is indicated in Table 12. The F number Fno is 2.8.

As Table 12 shows, $r_3=r_4=\infty$, so the second lens $L_2$ is an optical parallel plate. Since $r_2$ is a positive value and $r_5$ is a negative value, the first lens $L_1$ is a lens where the object side face of this first lens $L_1$ is a convex surface facing the object side, and the third lens $L_3$ is a lens where the image side face of this third lens $L_3$ is a convex surface facing the image side. The junction type compound lens 14 has a positive refractive power.

In Embodiment 12, the optical length L with respect to the focal distance f=1.00 mm, is sufficiently short, 1.511 mm, and the back focus bf is sufficiently long, 0.796 mm.

Figure 47:
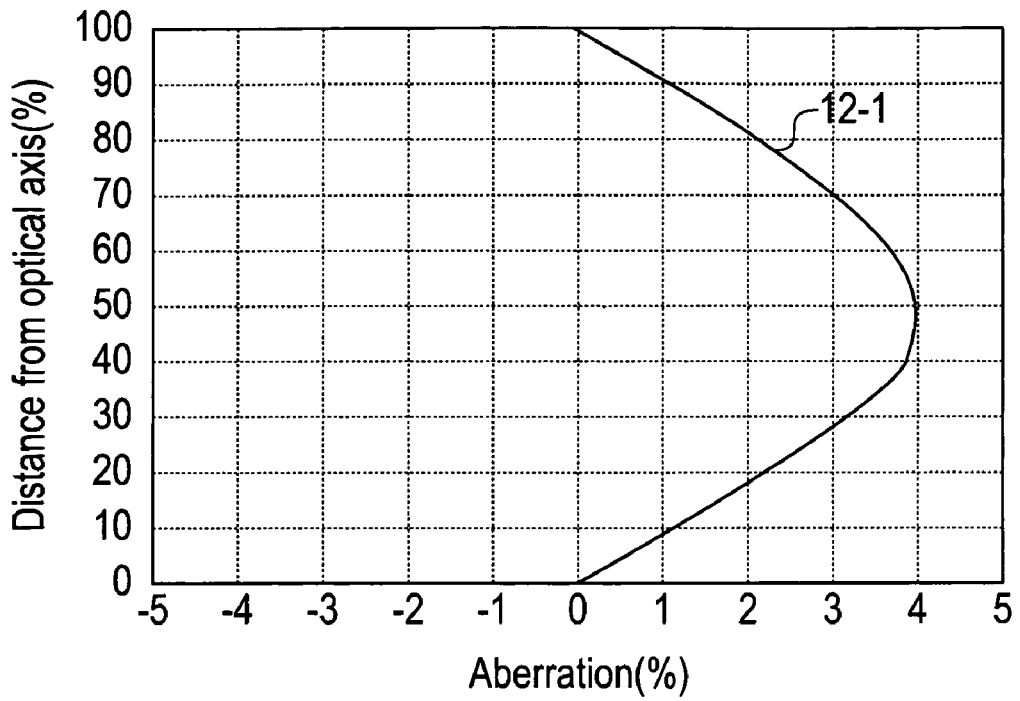
FIG. 47 is a diagram depicting the distortion aberration of the imaging lens of Embodiment 12.
Figure 48:
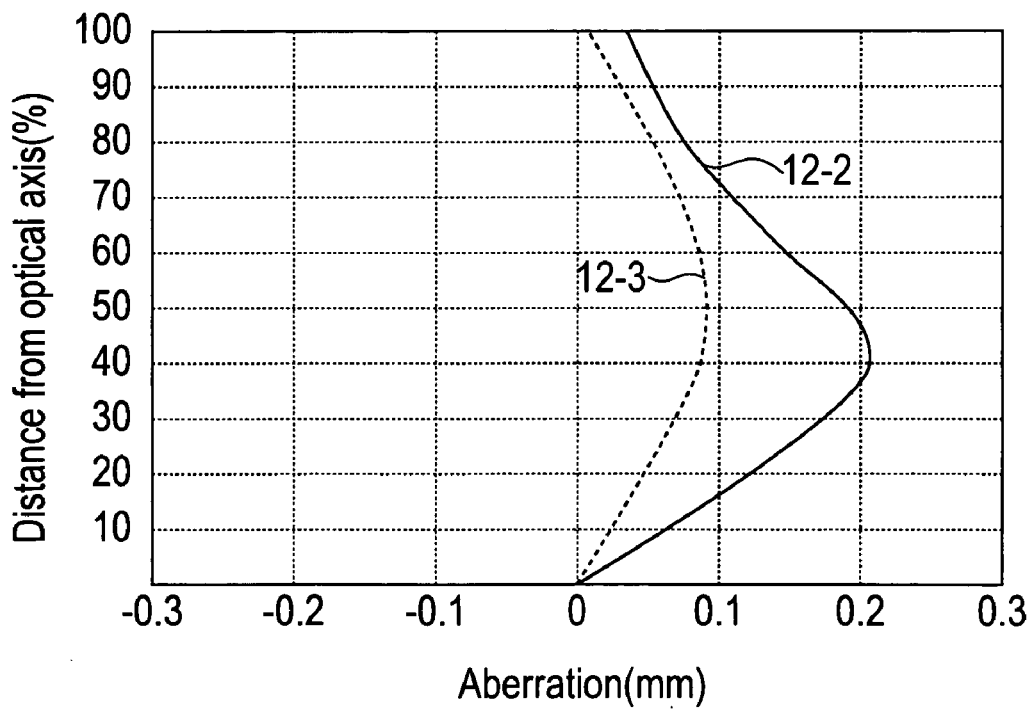
FIG. 48 is a diagram depicting the astigmatism aberration of the imaging lens of Embodiment 12.
Figure 49:
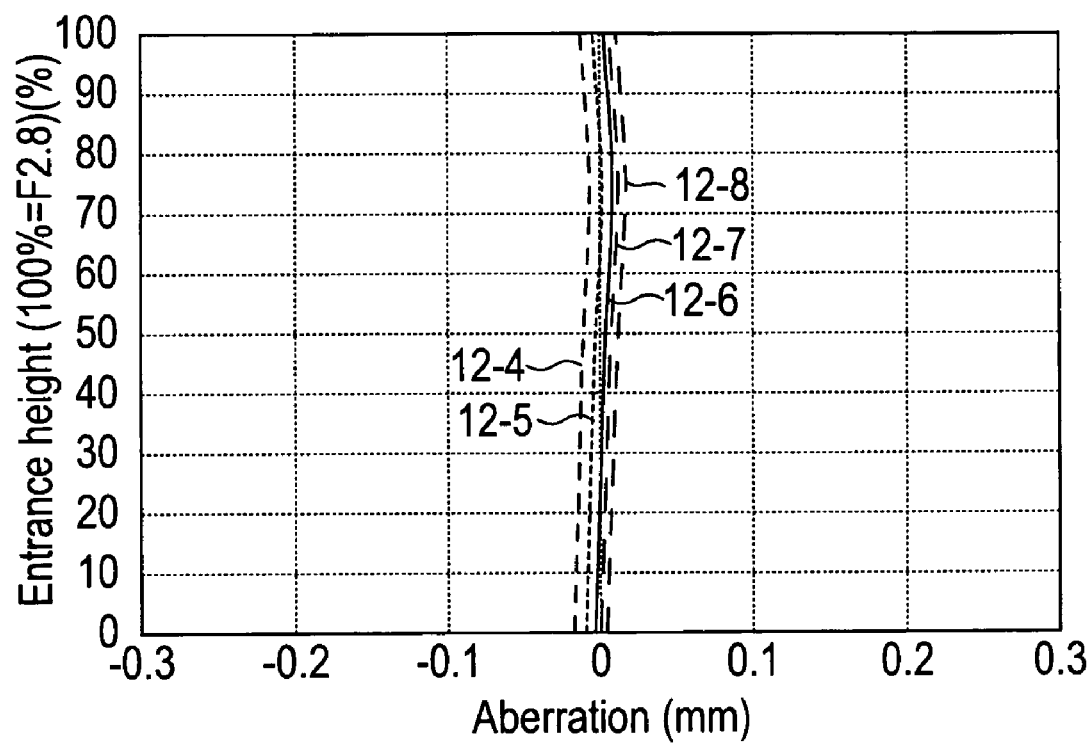
FIG. 49 is a diagram depicting the chromatic/spherical aberration of the imaging lens of Embodiment 12.

FIG. 47 shows a graph of the distortion aberration curve 12-1, FIG. 48 shows a graph of the astigmatism aberration curve (aberration curve 12-2 on the meridional surface and aberration curve 12-3 on the sagittal surface), and FIG. 49 shows a graph of a chromatic/spherical aberration curve (aberration curve 12-4 on g-line, aberration curve 12-5 on F-line, aberration curve 12-6 on e-line, aberration curve 12-7 on d-line and aberration curve 12-8 on C-line).

The ordinates of the aberration curves in FIG. 47 and FIG. 48 show the image height by a % of the distance from the optical axis. In FIG. 47 and FIG. 48, 100% corresponds to 0.676 mm. The ordinate of the aberration curve in FIG. 49 shows the entrance height h (F number), and the maximum thereof corresponds to 2.8. The abscissa of FIG. 47 shows the aberration (%), and the abscissa of FIG. 48 and FIG. 49 show the value of the aberration.

For the distortion aberration, the absolute value of an aberration is 3.9%, which is the maximum, at the position of the image height 50% (image height 0.338 mm), and the absolute value of the aberration is within 3.9% in a range where the image height is 0.676 mm or less.

For the astigmatism aberration, the absolute value of the aberration on the meridional surface is 0.2067 mm, which is the maximum, at the position of image height 40% (image height 0.270 mm), and the absolute value of the aberration is within 0.2067 mm in a range where the image height is 0.676 mm or less.

For the chromatic/spherical aberration, the absolute value of the aberration curve 12-4 on the g-line is 0.0173 mm, which is the maximum, at 0% of the entrance height h, and the absolute value of the aberration is within 0.0173 mm.

Therefore according to the imaging lens of Embodiment 12, good images are acquired. The difference of the imaging lens of Embodiment 12 from the above mentioned imaging lens of Embodiment 1 to Embodiment 11 is that the second lens $L_2$ is formed of a curable resin material, that is, transparent high hardness silicon resin. The junction type compound lens constituting the imaging lens of Embodiment 12 is formed by contacting a liquid type curable resin to the second lens formed of a curable resin, and solidifying, that is curing this curable resin, so that the first lens $L_1$ or the third lens $L_3$ is bonded to the second lens $L_2$ (direct bonding).

It is also possible that an optical parallel plate is formed by a curable resin material as the case of the second lens $L_2$ formed of optical glass, and the first lens $L_1$ or the third lens $L_3$, formed of a curable resin material, and this second lens $L_2$, which is an optical parallel plate, are indirectly bonded.

As the description on the imaging lenses according to Embodiment 1 to Embodiment 12 show, the problem to be solved by this invention is solved by designing each composing lens of the imaging lens so as to satisfy the above Expressions (1) to (4). In other words, an imaging lens where various aberrations are well corrected, sufficient back focus is acquired, and optical length is maintained short, can be acquired.

As described above, the imaging lens of the present invention is suitable not only for a lens for a camera built into a portable telephone, personal computer or digital camera, but also for a lens for a camera built into a personal digital assistant (PDA), a lens for a camera built into a toy having an image recognition function, and a lens for a camera built into monitoring, inspection or crime prevention equipment.

The invention claimed is:

1. An imaging lens, comprising an aperture stop and a junction type compound lens having a positive refractive power, characterized in that
   said aperture stop and said junction type compound lens are arranged in this sequence from an object side to an image side,
   said junction type compound lens comprises a first lens, a second lens and a third lens arranged in this sequence from said object side to said image side,
   said first lens and said third lens are formed of a curable resin material,
   said second lens is formed of a high softening temperature optical glass material,
   said first lens and said second lens are bonded with adhesive,
   said second lens and said third lens are bonded with adhesive, and
   following conditions (1) to (4) are satisfied:

$$0 \leq |N_3 - N_2| \leq 0.1 \quad (1)$$

$$0 \leq |N_3 - N_4| \leq 0.1 \quad (2)$$

$$0 \leq |\nu_3 - \nu_2| \leq 30.0 \quad (3)$$

$$0 \leq |\nu_3 - \nu_4| \leq 30.0 \quad (4)$$

where
  $N_2$: refractive index of said first lens
  $N_3$: refractive index of said second lens
  $N_4$: refractive index of said third lens
  $\nu_2$: Abbe number of said first lens
  $\nu_3$: Abbe number of said second lens
  $\nu_4$: Abbe number of said third lens.

2. The imaging lens according to claim 1, characterized in that
   said second lens is an optical parallel plate,
   said first lens is a plano-convex lens where an object side face of said first lens is a convex surface facing said object side, and
   said third lens is a plano-convex lens where an image side face of said third lens is a convex surface facing said image side.

3. The imaging lens according to claim 1, characterized in that
   said second lens is an optical parallel plate,
   said first lens is a piano-concave lens where an object side face of said first lens is a concave surface facing said object side, and
   said third lens is a piano-convex lens where an image side face of said third lens is a convex surface facing said image side.

4. The imaging lens according to claim 1, characterized in that
   said second lens is a biconvex glass lens,
   said first lens is a lens where an object side face of said first lens is a convex surface facing said object side, and
   said third lens is a lens where an image side face of said third lens is a convex surface facing said image side.

5. The imaging lens according to claim 1, characterized in that
   said second lens is a biconvex glass lens,
   said second lens is a lens where an object side face of said first lens is a concave surface facing said object side, and
   said third lens is a lens where an image side face of said third lens is a convex surface facing said image side.

6. The imaging lens according to claim 1, characterized in that
   said second lens is a biconcave glass lens,
   said first lens is a lens where an object side face of said first lens is a convex surface facing said object side, and
   said third lens is a lens where an image side face of said third lens is a convex surface facing said image side.

7. The imaging lens according to claim 1, characterized in that
   said second lens is a biconcave glass lens,
   said first lens is a lens where an object side face of said first lens is a concave surface facing said object side, and
   said third lens is a lens where an image side face of said third lens is a convex surface facing said image side.

8. The imaging lens according to claim 1, characterized in that said object side face of said first lens and said image side face of said third lens are aspherical.

9. The imaging lens according to claim 1, characterized in that at least one surface of said second lens is coated.

10. The imaging lens according to claim 1, characterized in that said curable resin material is a transparent high hardness silicon resin.

11. An imaging lens, comprising an aperture stop and a junction type compound lens having a positive refractive power, characterized in that said aperture stop and said junction type compound lens are arranged in this sequence from an object side to an image side, said junction type compound lens comprises a first lens, a second lens and a third lens arranged in this sequence from said object side to said image side, said first lens, said second lens and said third lens are formed of a curable resin material, said first lens and said second lens are directly bonded, said second lens and said third lens are directly bonded, and following conditions (1) to (4) are satisfied:

$$0 \leq |N_3 - N_2| \leq 0.1 \quad (1)$$

$$0 \leq |N_3 - N_4| \leq 0.1 \quad (2)$$

$$0 \leq |v_3 - v_2| \leq 30.0 \quad (3)$$

$$0 \leq |v_3 - v_4| \leq 30.0 \quad (4)$$

where $N_2$: refractive index of said first lens
$N_3$: refractive index of said second lens
$N_4$: refractive index of said third lens
$v_2$: Abbe number of said first lens
$v_3$: Abbe number of said second lens
$v_4$: Abbe number of said third lens.

12. The imaging lens according to claim 11, characterized in that said second lens is an optical parallel plate, said first lens is a piano-convex lens where an object side face of said first lens is a convex surface facing said object side, and said third lens is a piano-convex lens where an image side face of said third lens is a convex surface facing said image side.

13. The imaging lens according to claim 11, characterized in that said object side face of said first lens and said image side face of said third lens are aspherical.

14. The imaging lens according to claim 11, characterized in that said curable resin material is a transparent high hardness silicon resin.

15. An imaging lens, comprising an aperture stop and a junction type compound lens having a positive refractive index, characterized in that said aperture stop and said junction type compound lens are arranged in this sequence from an object side to an image side, said junction type compound lens comprises a first lens, a second lens and a third lens arranged in this sequence from said object side to said image side, said first lens, said second lens and said third lens are formed of a curable resin material, said first lens and said second lens are bonded with adhesive, said second lens and said third lens are bonded with adhesive, and following conditions (1) to (4) are satisfied:

$$0 \leq |N_3 - N_2| \leq 0.1 \quad (1)$$

$$0 \leq |N_3 - N_4| \leq 0.1 \quad (2)$$

$$0 \leq |v_3 - v_2| \leq 30.0 \quad (3)$$

$$0 \leq |v_3 - v_4| \leq 30.0 \quad (4)$$

where $N_2$: refractive index of said first lens
$N_3$: refractive index of said second lens
$N_4$: refractive index of said third lens
$v_2$: Abbe number of the said lens
$v_3$: Abbe number of said second lens
$v_4$: Abbe number of said third lens.

16. The imaging lens according to claim 15, characterized in that said second lens is an optical parallel plate, said first lens is a piano-convex lens where an object side face of said first lens is a convex surface facing said object side, and said third lens is a piano-convex lens where an image side face of said third lens is a convex surface facing said image side.

17. The imaging lens according to claim 15, characterized in that said object side face of said first lens and said image side face of said third lens are aspherical.

18. The imaging lens according to claim 15, characterized in that at least one surface of said second lens is coated.

19. The imaging lens according to claim 15, characterized in that said curable resin material is a transparent high hardness silicon resin.

* * * * *

UNITED STATES PATENT AND TRADEMARK OFFICE
CERTIFICATE OF CORRECTION

PATENT NO. : 7,830,619 B2  
APPLICATION NO. : 12/083983  
DATED : November 9, 2010  
INVENTOR(S) : Satoshi Do Page 1 of 1

It is certified that error appears in the above-identified patent and that said Letters Patent is hereby corrected as shown below:

In the Claims:

In Claim 3, column 36, line 24, replace "piano-concave" with --plano-concave--; and column 36, line 27, replace "piano-convex" with --plano-convex--.

In Claim 12, column 37, line 32, replace "piano-convex" with --plano-convex--; and column 37, line 35, replace "piano-convex" with --plano-convex--.

In Claim 16, column 38, line 31, replace "piano-convex" with --plano-convex--; and column 38, line 34, replace "piano-convex" with --plano-convex--.

Signed and Sealed this
Twenty-eighth Day of December, 2010

David J. Kappos
*Director of the United States Patent and Trademark Office*